(12) United States Patent
Watabe et al.

(10) Patent No.: US 11,766,659 B2
(45) Date of Patent: Sep. 26, 2023

(54) METHOD FOR PRODUCING WATER-ABSORBENT RESIN POWDER, AND DRYING DEVICE AND DRYING METHOD FOR PARTICULATE HYDROUS GEL

(71) Applicant: NIPPON SHOKUBAI CO., LTD., Osaka (JP)

(72) Inventors: Hiroyasu Watabe, Himeji (JP); Mai Sato, Himeji (JP); Ryota Wakabayashi, Himeji (JP); Yoshihiro Shobo, Himeji (JP); Shin-ya Katsube, Himeji (JP); Motohiro Imura, Himeji (JP); Koji Honda, Himeji (JP); Shin-ichi Fujino, Himeji (JP); Kunihiko Ishizaki, Himeji (JP); Tokio Shuto, Suita (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 1080 days.

(21) Appl. No.: 16/349,758

(22) PCT Filed: Nov. 16, 2017

(86) PCT No.: PCT/JP2017/041371
§ 371 (c)(1),
(2) Date: May 14, 2019

(87) PCT Pub. No.: WO2018/092863
PCT Pub. Date: May 24, 2018

(65) Prior Publication Data
US 2019/0329220 A1    Oct. 31, 2019

(30) Foreign Application Priority Data

Nov. 16, 2016  (JP) ............................... 2016-223654
Sep. 26, 2017  (JP) ............................... 2017-184283

(51) Int. Cl.
| | | |
|---|---|---|
| *B01J 20/26* | (2006.01) | |
| *B01J 13/00* | (2006.01) | |
| *B01J 20/28* | (2006.01) | |
| *B01J 20/30* | (2006.01) | |
| *C08F 220/06* | (2006.01) | |
| *F26B 3/10* | (2006.01) | |
| *F26B 17/10* | (2006.01) | |
| *F26B 1/00* | (2006.01) | |
| *F26B 17/00* | (2006.01) | |
| *B01J 2/12* | (2006.01) | |

(52) U.S. Cl.
CPC ......... *B01J 20/267* (2013.01); *B01J 13/0065* (2013.01); *B01J 13/0069* (2013.01); *B01J 20/28004* (2013.01); *B01J 20/28016* (2013.01); *B01J 20/3021* (2013.01); *B01J 20/3078* (2013.01); *B01J 20/3085* (2013.01); *C08F 220/06* (2013.01); *F26B 1/005* (2013.01); *F26B 3/10* (2013.01); *F26B 17/00* (2013.01); *F26B 17/106* (2013.01); *B01J 2/12* (2013.01); *C08F 2800/20* (2013.01); *C08F 2810/20* (2013.01)

(58) Field of Classification Search
CPC ...... B01J 20/26; B01J 20/267; B01J 13/0065; B01J 13/0069; B01J 20/28004; B01J 20/28016; B01J 20/3021; B01J 20/3078; B01J 20/3085; B01J 2/12; C08F 220/06; C08F 2800/20; C08F 2810/20; F26B 1/005; F26B 3/10; F26B 17/00; F26B 17/106
USPC ......................................................... 34/595
See application file for complete search history.

(56) References Cited

U.S. PATENT DOCUMENTS

| | | |
|---|---|---|
| 4,497,930 A | 2/1985 | Yamasaki et al. |
| 4,893,999 A | 1/1990 | Chmelir et al. |
| 5,005,771 A | 4/1991 | Pieh et al. |
| 5,380,808 A | 1/1995 | Sumiya et al. |
| 6,241,928 B1 | 6/2001 | Hatsuda et al. |
| 6,710,141 B1 | 3/2004 | Heide et al. |
| 6,987,151 B2 | 1/2006 | Gartner et al. |
| 7,638,570 B2 | 12/2009 | Torii et al. |
| 9,751,110 B2 | 9/2017 | Stueven et al. |
| 2005/0215734 A1 | 9/2005 | Dairoku et al. |
| 2007/0041796 A1 | 2/2007 | Irie et al. |
| 2008/0161522 A1 | 7/2008 | Riegel et al. |
| 2008/0214749 A1 | 9/2008 | Weismantel et al. |

(Continued)

FOREIGN PATENT DOCUMENTS

| | | |
|---|---|---|
| CN | 202204256 U | 4/2012 |
| EP | 0289333 A2 | 11/1988 |

(Continued)

OTHER PUBLICATIONS

Modem Superabsorbent Polymer Technology (1998), Edited by Fredric L. Buchholz et al., WILEY-VCH, Copyright © 1998 by John Wiley & Sons, Inc., pp. 69-103.

*Primary Examiner* — Edward M Johnson
(74) *Attorney, Agent, or Firm* — Dickinson Wright PLLC

(57) ABSTRACT

The production method includes a drying step of drying a particulate crosslinked hydrogel polymer obtained by polymerizing a monomer, which is a material of a water-absorbent resin, using a heating device to obtain dried particles. The heating device includes: a rotary container that contains the particulate crosslinked hydrogel polymer therein and rotates; and a plurality of heating tubes that are located within the rotary container, extend in an axial direction of the rotary container, and rotate together with the rotary container. A gel temperature of the particulate crosslinked hydrogel polymer to be subjected to the drying step, the gel temperature being measured by a contact thermometer, is not lower than 50° C.

19 Claims, 12 Drawing Sheets

(56) References Cited

U.S. PATENT DOCUMENTS

| | | |
|---|---|---|
| 2008/0287631 A1 | 11/2008 | Nitschke |
| 2009/0060660 A1 | 3/2009 | Funk et al. |
| 2009/0266747 A1 | 10/2009 | Stueven et al. |
| 2010/0249320 A1 | 9/2010 | Matsumoto et al. |
| 2011/0006140 A1 | 1/2011 | Ishizaki et al. |
| 2011/0009590 A1 | 1/2011 | Matsumoto et al. |
| 2011/0015351 A1 | 1/2011 | Nogi et al. |
| 2011/0204288 A1 | 8/2011 | Funk et al. |
| 2012/0172536 A1 | 7/2012 | Nogi et al. |
| 2012/0220733 A1 | 8/2012 | Machida et al. |
| 2012/0220745 A1 | 8/2012 | Machida et al. |
| 2012/0289671 A1 | 11/2012 | Takaai et al. |
| 2013/0026412 A1 | 1/2013 | Machida et al. |
| 2013/0066019 A1 | 3/2013 | Okuda et al. |
| 2013/0123435 A1 | 5/2013 | Okuda et al. |
| 2013/0174436 A1 | 7/2013 | Kataoka et al. |
| 2014/0066584 A1 | 3/2014 | Peterson et al. |
| 2014/0377538 A1 | 12/2014 | Vorholt et al. |
| 2015/0315343 A1 | 11/2015 | Voll et al. |
| 2015/0322188 A1 | 11/2015 | Bauer et al. |
| 2016/0030979 A1 | 2/2016 | Possemiers et al. |
| 2016/0039950 A1 | 2/2016 | Kotake et al. |
| 2016/0279602 A1 | 9/2016 | Nagasawa et al. |
| 2016/0279605 A1 | 9/2016 | Grünewald et al. |
| 2017/0014801 A1 | 1/2017 | Ikeuchi et al. |
| 2017/0282146 A1 | 10/2017 | Maeda et al. |
| 2018/0298132 A1 | 10/2018 | Yorino et al. |
| 2019/0201868 A1 | 7/2019 | Wakabayashi et al. |

FOREIGN PATENT DOCUMENTS

| | | | |
|---|---|---|---|
| EP | 0450923 | A2 | 10/1991 |
| EP | 0574248 | A2 | 12/1993 |
| EP | 0948997 | A2 | 10/1999 |
| EP | 1130045 | A2 | 9/2001 |
| EP | 1367081 | A1 | 12/2003 |
| EP | 1800740 | A2 | 6/2007 |
| EP | 3153805 | A1 | 4/2017 |
| JP | H 8-134134 | A | 5/1996 |
| JP | H 11-292919 | A | 10/1999 |
| JP | 2003-012812 | A | 1/2003 |
| JP | 2005-247931 | A | 9/2005 |
| JP | 2007-071415 | A | 3/2007 |
| JP | 2012-041439 | A | 3/2012 |
| JP | 2016-216713 | A | 12/2016 |
| KR | 10-2015-0141425 | A | 12/2015 |
| WO | WO 2006/100300 | A1 | 9/2006 |
| WO | WO 2006/103227 | A1 | 10/2006 |
| WO | WO 2007/057350 | A1 | 5/2007 |
| WO | WO 2007/104673 | A2 | 9/2007 |
| WO | WO 2008/037672 | A1 | 4/2008 |
| WO | WO 2008/037675 | A1 | 4/2008 |
| WO | WO 2009/028568 | | 3/2009 |
| WO | WO 2009/113673 | | 9/2009 |
| WO | WO 2009/113678 | | 9/2009 |
| WO | WO 2009/113679 | | 9/2009 |
| WO | WO 2011/034146 | | 3/2011 |
| WO | WO 2011/034147 | | 3/2011 |
| WO | WO 2011/090129 | | 7/2011 |
| WO | WO 2011/104152 | A1 | 9/2011 |
| WO | WO 2011/115216 | | 9/2011 |
| WO | WO 2011/115221 | | 9/2011 |
| WO | WO 2011/126079 | | 10/2011 |
| WO | WO 2013/104479 | A1 | 7/2013 |
| WO | WO 2013/146699 | | 10/2013 |
| WO | WO 2014/033083 | A1 | 3/2014 |
| WO | WO 2014/044780 | A1 | 3/2014 |
| WO | WO 2014/141764 | | 9/2014 |
| WO | WO 2014/154522 | A1 | 10/2014 |
| WO | WO 2015/072536 | A1 | 5/2015 |
| WO | WO 2015/074966 | A1 | 5/2015 |
| WO | WO 2015/129917 | | 9/2015 |
| WO | 2016088433 | A1 | 6/2016 |
| WO | WO 2016/128337 | A1 | 8/2016 |
| WO | WO 2016/204302 | | 12/2016 |
| WO | WO 2017/221911 | A1 | 12/2017 |

METHOD FOR PRODUCING WATER-ABSORBENT RESIN POWDER, AND DRYING DEVICE AND DRYING METHOD FOR PARTICULATE HYDROUS GEL

TECHNICAL FIELD

The present invention relates to methods for producing water-absorbent resin powder, and drying devices and drying methods for a particulate hydrous gel. More specifically, the present invention relates to: methods for producing water-absorbent resin powder in which a production process is simplified and made compact and the amount of water-absorbent resin fine powder generated in the production process is reduced, as compared to those in a conventional method for producing a water-absorbent resins and drying devices and drying methods (particularly, drying start methods) for a particulate crosslinked hydrogel polymer.

BACKGROUND ART

A water-absorbent resin (SAP/Super Absorbent Polymer) is a water-swellable and water-insoluble polymer gelling agent, and is frequently used in various fields of absorbent articles such as disposable diapers and sanitary napkins, water retention agents for agricultural and horticultural use, water stopping materials for industrial use, and the like.

For the water-absorbent resin, various monomers and hydrophilic polymers are used as the raw materials thereof, and the most industrially produced is, from the viewpoint of fluid retention performance, a polyacrylic acid (salt)-based water-absorbent resin in which acrylic acid and/or a salt thereof is used.

With improvement of performance of disposable diapers, which are a main application of the water-absorbent resin, the water-absorbent resin is required to have various functions (improved physical properties). Specifically, the water-absorbent resin is required to have various physical properties such as gel strength, water-soluble content, moisture content, water absorption speed, liquid permeability, particle size distribution, urine resistance, antibacterial property, damage resistance, powder fluidity, deodorization property, anti-coloring property, low dust, and low residual monomer, as well as fluid retention capacity under no load and fluid retention capacity under load which are basic physical properties.

Such a water-absorbent resin can be made into various forms such as sheet form, fiber form, film form, and the like, but are generally often made into powder form or particle form. Regarding a water-absorbent resin in powder form or particle form, it is known that the fluid retention performance, the handleability, and the feeling in use vary depending on the particle diameter, the particle size distribution, or the like thereof. Thus, a water-absorbent resin in powder form or particle form which has an appropriately controlled particle diameter or particle size distribution is desired, in particular, in application to sanitary articles such as disposable diapers and the like, from the viewpoint of fluid retention capacity under load and liquid permeability, water-absorbent resin powder including a small amount of fine powder (fine particles having a particle diameter less than 100 μm or less than 150 μm, particularly, fine particles having a particle diameter less than 150 μm) is considered preferable. In addition, the water-absorbent resin powder is generally subjected to surface-crosslinking treatment in order to improve fluid retention capacity under load and other absorption characteristics.

Examples of a main method for producing the water-absorbent resin in powder form or particle form include an aqueous solution polymerization method and a reverse phase suspension polymerization method. In particular, in the aqueous solution polymerization method, as illustrated in FIG. 8, normally, many production steps, such as a polymerization step of performing aqueous solution polymerization of a water-soluble ethylenic unsaturated monomer, a gel-grinding (fine granulation) step of grinding a hydrogel polymer obtained through, the polymerization, a drying step of drying the ground gel, a grinding step of grinding the dried material, a classification step of adjusting the particle size of the ground material within an appropriate particle size range, a mixing step of mixing a surface-crosslinking agent into the classified water-absorbent resin powder, and a heating step of heating the mixture to cause a surface-crosslinking reaction, are required for finally obtaining a water-absorbent resin in particle form, and the production process is complicated (Non-Patent Literature 1 and Patent Literature 1 to 4). Furthermore, in the production process, normally, the water-absorbent resin as a material is dried by hot air in the drying step such that the temperature thereof becomes high. Then, the water-absorbent resin is cooled and then subjected to the grinding step. Thereafter, the temperature of the water-absorbent resin becomes high again in the heat treatment step, and the water-absorbent resin finally becomes a product at normal temperature. In consideration of this fact, there is a lot of waste in terms of energy. Moreover, in the drying step, the grinding step, etc., fine powder may be generated or a surface crosslinked structure may be destroyed due to mechanical damage, so that the physical properties of the obtained water-absorbent resin are decreased in some cases.

Meanwhile, in the reverse phase suspension polymerization method, a polymerization reaction is carried out in a state where a water-soluble ethylenic unsaturated monomer aqueous solution is dispersed into suspended particles in a hydrophobic organic solvent. Thus, in the production process, a gel-grinding step during or after polymerization is generally unnecessary, but the amount of the hydrophobic organic solvent used for dissolution of a surfactant, appropriate dispersion of the monomer aqueous solution, the polymerization reaction, azeotropic dehydration, and solvent evaporation is relatively large, and the energy required for long time heating or cooling of the hydrophobic organic solvent (particularly, azeotropic dehydration in a drying step, and evaporation to dryness of a dispersion solvent after the drying) is relatively great. Furthermore, there is a problem of safety of a residual organic solvent remaining in the water-absorbent resin, and the load on the environment due to the used organic solvent is also increased (Patent Literature 5 and 6). Moreover, a relatively large amount of the surfactant is required for dispersing a hydrous gel in the hydrophobic organic solvent, which is disadvantageous in cost. In addition, in this case, a large amount of the surfactant remaining in the water-absorbent resin after drying may reduce the surface tension of the water-absorbent resin, so that, for example, a decrease in performance such as an increase in amount of return from a disposable diaper may occur, or a problem of coloring of the water-absorbent resin may occur.

In the case of aqueous solution polymerization or reverse phase suspension polymerization, fine powder is also generated due to process damage in steps such as a surface crosslinking step after the drying step, and a transport step, in addition to the polymerization step and the grinding step (Patent Literature 7 and 8). When fine powder is generated due to process damage in the surface-crosslinking step or a step subsequent thereto, destruction of the surface cross-linked structure also occurs, so that the physical properties of the water-absorbent resin are also decreased. The amount of fine powder generated in a conventional production process reaches about 10% by weight to several tens of percentages by weight (for example, 20 to 30% by weight) of the total quantity of production. Thus, for the purpose of reducing fine powder and improving physical properties, a method for increasing the number of sieves for classification, a method for providing a guide to each sieve, a method for exactly controlling particle sizes by increasing the number of times of grinding and classification, a method for improving processing capacity by increasing the sizes of devices, etc., have been proposed (Patent Literature 9 to 16).

However, even when fine powder is able to be properly removed by these methods, the production process for a water-absorbent resin is still complicated or the size of the production, equipment is increased. The complication of the production process or the size increase of the production apparatus not only causes an increase in the cost but also may increase the frequency (probability) of equipment trouble, which may cause a decrease in productivity or a decrease in physical properties.

Disposal of the removed fine powder is disadvantageous in cost. Thus, the fine powder is recycled to a step before the classification step, particularly, in a step before the drying step, and further in the polymerization step, the gel-grinding step, and the drying step. However, the fine powder is likely to aggregate, and thus it is difficult to handle the fine powder. In addition, by adding a fine powder recycling step, the production process (equipment) for a water-absorbent resin is further complicated or increased in size. Moreover, the load on the polymerization step or the drying step in which the fine powder is recycled is increased, and thus an increase in amount of the fine powder collected may be accompanied with a decrease in productivity or a decrease in performance of the obtained water-absorbent resin.

A main factor for generation of fine powder is a grinding step for adjusting the dried water-absorbent resin into a target product particle size. For example, a hydrogel polymer obtained through aqueous solution polymerization has high adhesiveness and aggregability and low fluidity, and thus ventilation drying (drying without stirring) of the hydrogel polymer is performed in a drying step. A continuous through-flow band drying machine 100 illustrated in FIG. 7 is generally used heavily due to high processing capacity and stable production thereof (Non-Patent Literature 1 and Patent Literature 17 to 22). However, in the continuous through-flow band drying machine 100, a hydrogel polymer 104 is layered over a drying belt 102 (generally, with a gel thickness of several centimeters to several tens of centimeters), and dried while being moved in the direction indicated by arrows 108 in FIG. 7, whereby, after the drying, a continuous block-shaped dried polymer 110 having a width of several meters (corresponding to the width of the belt 102) and a thickness of several centimeters to several tens of centimeters is obtained. In order to grind the black-shaped dried polymer 110 into a target product particle size, a large equipment is required. This grinding is a main factor for generating a large amount of fine powder.

Furthermore, as a problem other than generation of fine powder in the continuous through-flow band drying machine 100, there is a problem that air flows in the up-down direction as indicated by arrows 106 in FIG. 7 through the hydrogel polymer 104 layered over the belt 102, and thus the drying speed differs in the thickness direction of the hydrous gel 104. In addition, uneven airflow occurs depending on a location, and thus the dried state of the hydrous gel 104 becomes uniform between upper and lower or left and right portions thereof, so that a problem of a decrease in physical properties or occurrence of undried material is also likely to arise. Moreover, there are problems such as a decrease in drying efficiency due to gaps generated at both ends of the band drying machine 100 by gel shrinkage during drying (Patent Literature 20), a decrease in yield due to scattering or falling of dried material during hot air drying (Patent Literature 17 to 19), falling or scattering of dried material from a perforated metal or a metal mesh used as the drying belt 102 or clogging of the perforated metal, or the metal mesh, difficulty in separating dried material from the drying belt 102 at a drying machine outlet, trouble in grinding the separated material (Patent Literature 22 and 23), and the like. In the above Patent Literature, etc., means for solving the problems in the case of using the through-flow band drying machine 100 have been proposed. However, the means complicates the production process, and the exhibited effects are still insufficient.

As drying methods other than ventilation drying of a water-absorbent resin, a method for performing stirring drying on a hydrogel polymer (Patent Literature 22 to 28 and 31) and a method for performing drying with a fluidized bed (Patent Literature 29 and 31) have been proposed. In addition, in contrast to the technique to surface-crosslink a dried water-absorbent resin as disclosed in Non-Patent Literature 1 and Patent Literature 1 to 4 and 7, a technique to carry out post-crosslinking at the stage of hydrous gel (Patent Literature 37 to 41) has been proposed, and a technique to carry out post-crosslinking simultaneously with drying (Patent Literature 38 and 39) has been also proposed.

However, since the hydrogel polymer has high adhesiveness and aggregability and low fluidity, addition of a large amount of a gel fluidizer (surfactant) during stirring drying is required, which is disadvantageous in cost. In this case, the remaining gel fluidizer (surfactant) may deteriorate the performance of the water-absorbent resin. In addition, great stirring force is required for stirring the hydrous gel, and, dried material may be deteriorated by mechanical damage caused by the stirring force. Furthermore, regarding stirring drying or fluidized bed drying, drying on a small scale such as a laboratory scale, particularly, batch drying, is possible. However, continuous drying over a long period of time through stirring drying is difficult since a problem of adhesion of a hydrous gel to a device inner surface or aggregation of hydrous gels arises in continuous operation over a long period of time. Moreover, in a fluidized bed drying machine, a large volume of air is required for fluidizing a hydrous gel, and there is a further problem that the fluidized bed drying machine cannot be used for a hydrous gel (for example, a hydrous gel having a high solid content rate) other than a specific hydrous gel having high fluidity. In addition, it is also necessary to treat waste gas discharged from the drying machine (for example, Patent Literature 30). Therefore, in a through-flow band drying machine or a fluidized bed drying machine (particularly, a fluidized bed drying machine) in which a large volume of gas is used for drying, a large-size waste gas treating equipment is required, so that such a drying machine is disadvantageous in energy and equipment.

For the above reasons, as industrial drying means for a water-absorbent resin, continuous through-flow band drying having excellent continuous operability is generally used. However, in ventilation drying with a through-flow band drying machine or the like, unevenness in drying is likely to occur, and undried material that occurs becomes an obstacle in a subsequent step (particularly, the grinding step or the classification step). Therefore, in order to inhibit occurrence of undried material, a hydrous gel generally needs to be excessively dried in ventilation drying. For that reason, there is a problem that the size of the drying machine is increased more than necessary or dried material is deteriorated or colored due to excessive drying. Therefore, methods for removing undried material (Patent Literature 31 to 33) have also been proposed. However, these methods complicate the production process.

For the above water-absorbent resin, in addition to improvement of production efficiency and providing a solution to the problem of fine powder generation, a reduction in residual monomer and improvement in other physical properties are also desired (Patent Literature 34). In addition, the water absorption speed of the water-absorbent resin depends on the specific surface area thereof, and thus foaming polymerization and a technique to finely grind and dry a hydrous gel and then granulate the hydrous gel have also been proposed (Patent Literature 36 to 38) as means for improvement in water absorption speed. However, foaming polymerization or making the hydrous gel into fine particles before drying for improvement in water absorption speed may be accompanied by an increase in residual monomer or fine powder generation due to process damage. Furthermore, in a method for finely grinding a hydrous gel, problems due to a through-flow band drying machine (falling or scattering of dried material from a drying belt, clogging of the belt) tend to arise more significantly.

CITATION LIST

Non-Patent Literature

Non-Patent Literature 1: Modern Superabsorbents Polymer Chemistry (1998), p 69-103

Patent Literature

Patent Literature 1: EP1130045A2
Patent Literature 2: WO2009/113678
Patent Literature 3: WO2009/113679
Patent Literature 4: WO2009/113673
Patent Literature 5: WO2013/146699
Patent Literature 6: WO2014/141764
Patent Literature 7: EP1800740A1
Patent Literature 8: WO2007/104673
Patent Literature 9: WO2008/037675
Patent Literature 10: WO2008/037672
Patent Literature 11: WO2009/113673
Patent Literature 12: WO2011/034147
Patent Literature 13: WO2011/034146
Patent Literature 14: WO2011/115221
Patent Literature 15: WO2011/115216
Patent Literature 16: WO2014/154522
Patent Literature 17: WO2006/100300
Patent Literature 18: WO2011/090129
Patent Literature 19: WO2015/074966
Patent Literature 20: WO2011/104152
Patent Literature 21: WO2016/128337
Patent Literature 22: WO2014/044790
Patent Literature 23: WO2013/104479
Patent Literature 22: JPH8-134134
Patent Literature 23: JP200071415
Patent Literature 24: JP2005-247931
Patent Literature 25: JP2033-012812
Patent Literature 26: U.S. Pat. No. 5,005,771
Patent Literature 26: JP2016-216713
Patent Literature 28: PCT/JP2017/022605 (international application date: Jun. 20, 2017)
Patent Literature 29: WO2009/028566
Patent Literature 30: WO2015/072536
Patent Literature 31: EP0940997A2
Patent Literature 32: WO2014/033083
Patent Literature 33: WO2007/057350
Patent Literature 34: EP0289333A2
Patent Literature 35: WO2016/204302A
Patent Literature 36: WO2011/126079A
Patent Literature 37: EP0574249A2
Patent Literature 38: U.S. Pat. No. 4,497,930
Patent Literature 39: U.S. Pat. No. 5,380,508
Patent Literature 40: EP1367081A1
Patent Literature 41: JP2012-041439

SUMMARY OF THE INVENTION

Problems to be Solved by the Invention

As described above, various studies have been made for a drying method for a water absorbent resin in a hydrous state and a surface-crosslinking method in which a surface-crosslinking agent is added to a water-absorbent resin in a hydrous state and then a heating treatment is performed. However, with some conventional heating devices or drying devices, fine powder may be generated and adversely affect the physical properties of the obtained water-absorbing agent. For example, in the case of the aforementioned band drying machine, it is necessary to grind again, aggregates generated after drying, and 20 to 30% of fine powder may be generated at that time. Drying conditions and heating conditions for reducing fine powder have been also studied but are not fully satisfactory. As described above, a method for producing high-quality water absorbent resin powder including a small amount of fine powder has not been found yet.

An object of the present invention is to provide a method for producing water-absorbent resin powder in which the amount of fine powder generated in a production process is small and a decrease in physical properties due to fine powder is inhibited, and a drying device and a drying method (particularly, a drying start method) for a particulate hydrous gel. Furthermore, another object of the present invention is to provide a method for producing water-absorbent resin powder in which a production process is simplified and made compact.

Solution to the Problems

As a result of through research, the present inventors have found that, by using a heating device having a specific structure as a drying device under a predetermined temperature condition, aggregation or adhesion during drying is inhibited, and also mechanical damage in a drying step or a surface-crosslinking step is reduced and the amount of fine powder is reduced, whereby the present inventors have completed the present invention. In the present specification, when a heating device is used as a drying device, the heating device is sometimes referred to as a drying device. Regardless of the name, a heating device and a drying device having a specific structure described in the present specification belong to the technical scope of the present invention.

Specifically, the present invention is directed to a method for producing water-absorbent resin powder, wherein, in a drying step of drying a particulate crosslinked hydrogel polymer, a heating device including: a rotary container that contains the particulate crosslinked hydrogel polymer therein and rotates; and a plurality of heating tubes that are located within the rotary container, extend in an axial direction of the rotary container, and rotate together with the rotary container, is used as a drying device, and a gel temperature of the particulate crosslinked hydrogel polymer to be subjected to the drying step is not lower than 50° C.

The present invention is further directed to a drying device for a particulate crosslinked hydrogel polymer obtained from a monomer that is a material of a water-absorbent resin, the drying device including: a rotary container that contains the particulate crosslinked hydrogel polymer therein and rotates; a plurality of heating tubes that are located within the rotary container, extend in an axial direction of the rotary container, and rotate together with the rotary container; and a means for introducing and discharging a gas into and from the rotary container, wherein a number of heating tubes is not less than five, the heating tubes are not in contact with an inner peripheral surface of the rotary container in the axial direction, and a heating means or a thermal insulating means is provided on an outer peripheral surface of the rotary container.

The present invention is also directed to a drying method for drying a particulate crosslinked hydrogel polymer obtained from a monomer, which is a material of a water-absorbent resin, by using the aforementioned drying device, the drying method including introducing a gas as a heat medium into the rotary container, wherein a gel temperature of the particulate crosslinked hydrogel polymer to be put into the drying device is not lower than 50° C., and a temperature of the inner surface of the rotary container is not lower than 150° C.

The present invention is further directed to a production equipment for water-absorbent resin powder, the production equipment including a drying device. The production equipment includes: a polymerization device for obtaining a crosslinked hydrogel polymer from a monomer that is a material of a water-absorbent resin; and a gel grinding device for grinding the crosslinked hydrogel polymer to obtain a particulate crosslinked hydrogel polymer, wherein the drying device serves to dry the particulate crosslinked hydrogel polymer to obtain dried particles, and the drying device includes a rotary container that contains the particulate crosslinked hydrogel therein and rotates, and a plurality of heating tubes that are located within the rotary container and extend in an axial direction of the rotary container.

Advantageous Effects of the Invention

With the production method, the drying method, and the drying device according to the present invention, mechanical damage in the drying step is little, and a decrease in physical properties due to generation of fine powder and destruction of surface-crosslink is inhibited. In addition, due to a reduction in the amount of fine powder, cost and time that are conventionally required for collecting and recycling fine powder are reduced, so that the production efficiency improves. With the production method and the production equipment according to the present invention, as compared to a conventional production method, a subsequent production process can be made compact or simplified, and water-absorbent resin powder having comparable fluid retention performance can be efficiently produced.

DESCRIPTION OF EMBODIMENTS

Figure 1:
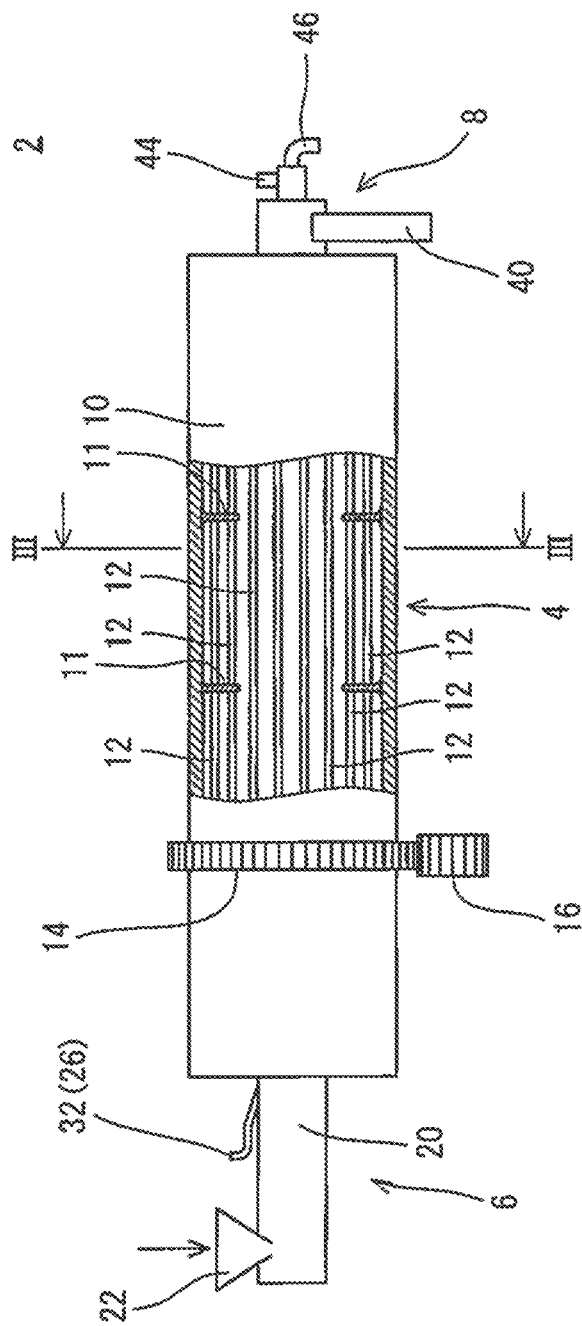
FIG. 1 is a partially cutaway side view showing an example of a drying device (rotary heating device with heating tubes) used in the production method according to the present invention.

The following will describe in detail the present invention. However, the scope of the present invention is not limited to the following description, and the present invention may be carried out by making modifications as appropriate without impairing the gist of the present invention, in addition to the following examples. Moreover, the present invention is not limited to the following embodiments, and various modifications may be made within the scope indicated by the claims. Another embodiment achieved by combining, as appropriate, each technical means disclosed in a plurality of embodiments is also included within the technical scope of the present invention.

[1] Definition of Terms

[1-1] "Water-Absorbent Resin"

The term "water-absorbent resin" in the present invention refers to a water-swellable and water-insoluble polymer gelling agent that satisfies the following physical properties. That is, "water-absorbent resin" refers to a polymer gelling agent whose CRC (centrifuge retention capacity) defined by ERT441.2-02 as water swellability is not less than 5 g/g and whose Ext (water-soluble content) defined by ERT470.2-02 as water insolubility is not greater than 50% by mass.

The water-absorbent resin can be designed as appropriate in accordance with the application and/or purpose thereof, and is not particularly limited but is preferably a hydrophilic crosslinked polymer obtained by crosslinking and polymerizing an unsaturated monomer having a carboxyl group. In addition, the water-absorbent resin is not limited to a resin entirely composed of a crosslinked polymer, and may be a composition containing an additive and the like as long as each of the above physical properties (CRC, Ext) satisfies the above numerical range.

The term "water-absorbent resin" in the present invention may be a water-absorbent resin that is surface-crosslinked (also referred to post-crosslinked, secondarily crosslinked), or may, be a water-absorbent resin that is not surface-crosslinked. In the present invention, a water-absorbent resin that has undergone a predetermined surface-crosslinking treatment is sometimes referred to as a surface-crosslinked (post-crosslinked) water-absorbent resin or water-absorbing agent. In addition, a water-absorbent resin or water-absorbing agent adjusted to a predetermined moisture content and particle size is referred to as water-absorbent resin powder.

[1-2] "Poly Methacrylic Acid (Salt)"

The term "poly(meth)acrylic acid (salt)" in the present invention refers to a poly(meth)acrylic acid and/or a salt thereof, and means a crosslinked polymer that contains a repeating unit of (meth)acrylic acid and/or a salt thereof (hereinafter, also referred to as a "(meth)acrylic acid (salt)") as a main component and that contains a graft component as an optional component.

The term "main component" means that the used amount (contained amount) of the (meth)acrylic acid (salt) with respect to the entire monomer to be used in polymerization is preferably 50% by mole to 100% by mole, more preferably 70% by mole to 100% by mole, further preferably 90% by mole to 100% by mole, and particularly preferably substantially 100% by mole.

The term "poly(meth)acrylic acid salt" may be non-neutralized, but is preferably a partially neutralized or completely neutralized poly(meth)acrylic acid salt, more preferably a monovalent salt, further preferably an alkali metal salt or ammonium salt, particularly preferably alkali metal salt, and more particularly preferably a sodium salt.

[1-3] "EDANA" and "ERT"

The term "EDANA" is an abbreviation for the European Disposables and Nonwovens Associations. The term "ERT" is an abbreviation for EDANA Recommended Test Methods and is a European standard that defines measuring methods for water-absorbent resin. In the present invention, unless otherwise specified, physical properties of the water-absorbent resin are measured according to the ERT original text (revised in 2002).

[1-3-1] "CRC" (ERT441.2-02)

The term "CRC" is an abbreviation for Centrifuge Retention Capacity, and means the fluid retention capacity under no load (sometimes also referred to as "water absorption capacity") of the water-absorbent resin. Specifically, CRC refers to a fluid retention capacity (unit: g/g) measured after 0.2 g of the water-absorbent resin put in a bag made of a nonwoven fabric is immersed in a large excess of a 0.9% by mass sodium chloride aqueous solution for 30 minutes to be freely swollen and then, drained in a centrifuge (250 G) for 3 minutes. For a hydrous gel after polymerization, CRC is obtained by changing the measuring time to 24 hours and performing correction in terms of solid content in a method described later.

[1-3-2] "Ext." (ERT470.2-02)

The term "Ext" is an abbreviation for Extractables, and means the water-soluble content (water-soluble polymer amount in water-absorbent resin) of the water-absorbent resin. Specifically, Ext refers to the amount (unit: % by mass) of substances dissolved in 200 ml of a 0.9% by mass sodium chloride aqueous solution after 1.0 g of the water-absorbent resin is added to the aqueous solution and the aqueous solution is stirred at 500 rpm for 16 hours. For measuring the water-soluble content, pH titration is used. For a hydrous gel after polymerization, a water-soluble content is measured by using 5.0 g of the hydrous gel, changing the measuring time to 24 hours, and correcting the hydrous gel in terms of solid content.

[1-3-3] "Moisture Content" (ERT430.2-02)

The term "Moisture Content" means the moisture content, defined by a drying loss, of the water-absorbent resin. Specifically, the moisture content refers to a value (unit: % by mass) calculated from a drying loss when 4.0 g of the water-absorbent resin is dried at 105° C. for 3 hours. In the present invention, for a water-absorbent resin after drying, the moisture content is defined by a drying loss from 1.0 g of the water-absorbent resin at 180° C. for 3 hours, and for a hydrous gel before drying, the moisture content is defined by a drying loss from 2.0 g of the hydrous gel at 180° C. for 24 hours.

[1-3-4] "PSD" (ERT420.2-02)

The term "PSD" is an abbreviation for Particle Size Distribution, which means the particle size distribution of the water-absorbent resin measured by sieve classification. A mass-average particle diameter (D50) and the logarithmic standard deviation ($\sigma\zeta$) of the particle size distribution are measured by the same method as described in U.S. Pat. No. 7,638,570. In the present invention, the particle size distribution (PSD) of a hydrous gel is defined by sieve classification performed in a wet process by a method described later. Furthermore, the particle diameter ($\mu m$) of a hydrous gel in terms of solid content is defined by a later-described calculation method from the particle diameter ($\mu m$) of the hydrous gel and the solid content rate (%) thereof.

[1-3-5] "AAP" (ERT442.2-02)

The term "AAP" is an abbreviation for Absorption Against Pressure, and means the fluid retention capacity under load of the water-absorbent resin. Specifically, AAP refers to a fluid retention capacity (unite g/g) measured after 0.9 g of the water-absorbent resin is swollen in a, large excess of a 0.9% by mass sodium chloride aqueous solution for 1 hour under a load of 2.06 kPa (21 g/cm$^2$, 0.3 psi). The fluid retention capacity may be measured with the load condition changed to 4.83 kPa (49 g/cm, 0.7 psi). For a hydrous gel after polymerization, CRC is obtained by changing the measuring time to 24 hours and performing correction in terms of solid content in a method described later.

[1-4] Others

In the present specification, "X to Y" indicating a range means "not less than X and not greater than Y".

Unless otherwise noted, the mass unit "t (ton)" refers to "metric ton", and "ppm", refers to "ppm by mass" or "ppm by weight", Furthermore, "mass" and "weight", "part(s) by mass" and "part(s) by weight", and "% by mass" and "% by weight" are synonymous with each other. Moreover, " . . . acid (salt)" means " . . . acid and/or a salt thereof", and "(meth)acrylic" means "acrylic and/or methacrylic".

[2] Method for Producing Water-Absorbent Resin Powder

Figure 9:
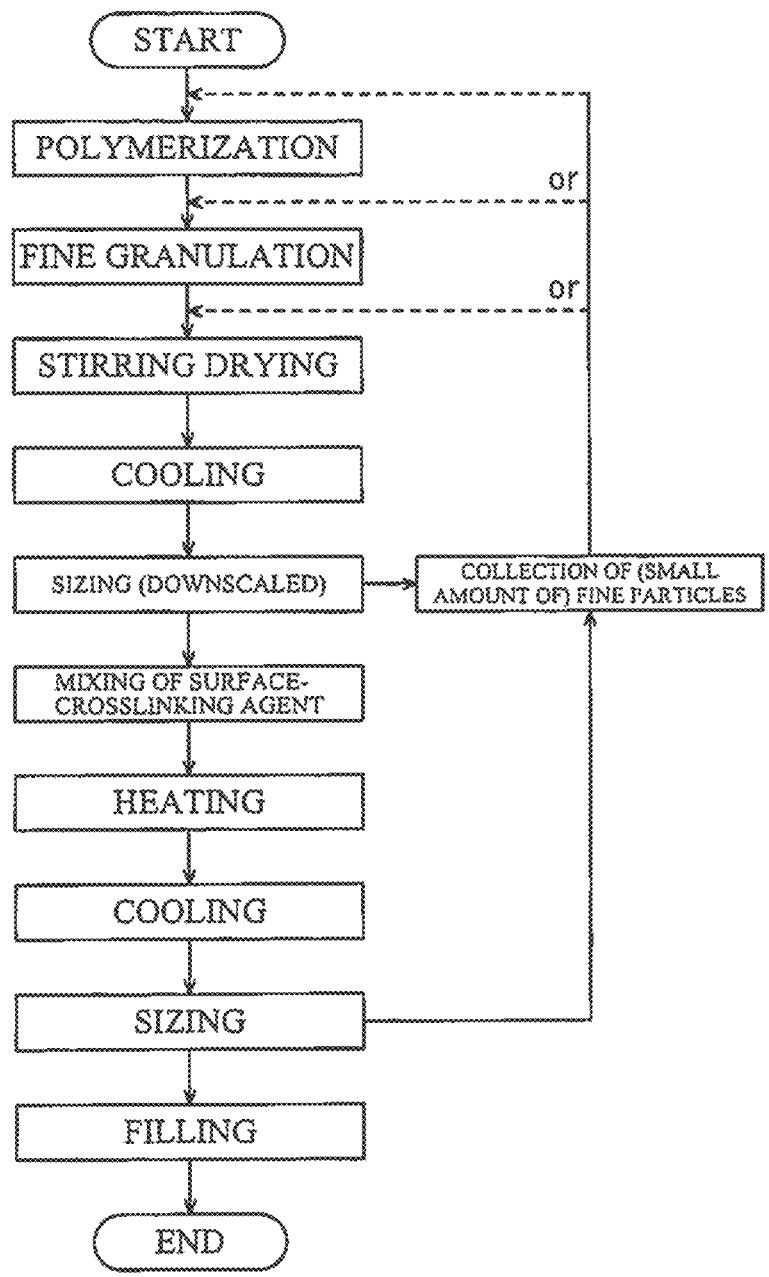
FIG. 9 is a flowchart showing a production process for a water-absorbent resin according to the present invention in which a grinding step, a classification step, and a fine powder collection step are made compact.
Figure 10:
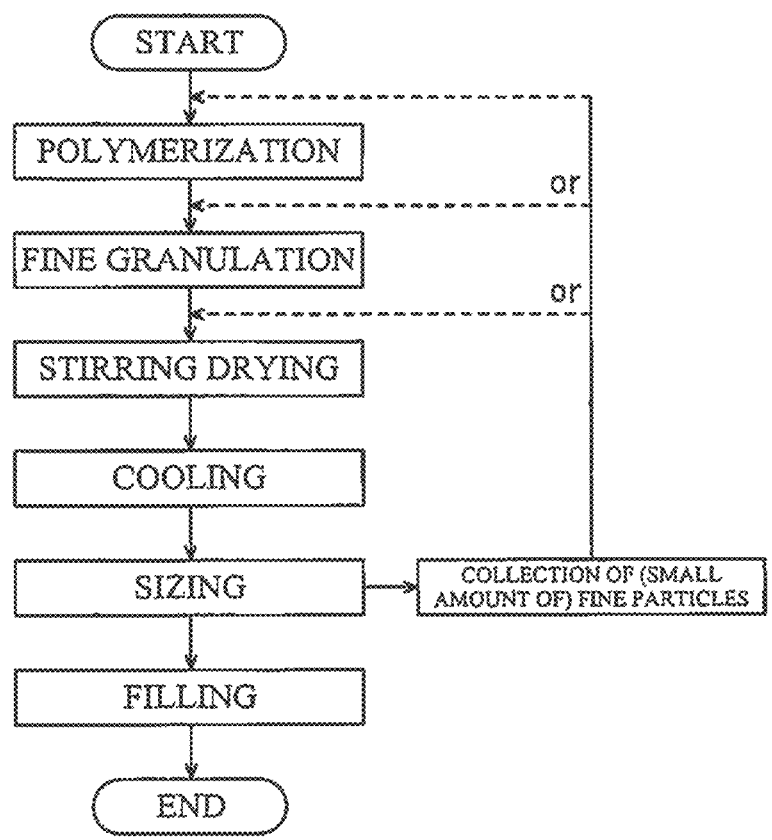
FIG. 10 is a flowchart showing a production process for a water-absorbent resin according to the present invention in which a drying step and a surface-crosslinking step are combined and further made compact.

The method for producing water-absorbent resin powder according to the present invention includes a drying step of drying a particulate crosslinked hydrogel polymer polymer obtained from a monomer, which is a material of a water-absorbent resin, by using a heating device. Preferably, this production method includes a polymerization step, a gel-crushing step (performed simultaneously with or separately from polymerization), a surface-crosslinking step (performed simultaneously with or separately from drying), a cooling step, and a sizing step (performed after drying and/or after surface-crosslinking). In addition, this production method preferably includes a step of preparing a monomer aqueous solution, a step of adding various additives, a fine powder removing step, and a fine powder recycling step. Furthermore, this production method can include various publicly known steps according to the purpose. As will be described later, in the production method of the present invention, at least a part of steps after the drying step can be made compact or omitted. Flow of the production process made compact is illustrated in FIGS. 9 and 10. FIGS. 9 and 10 will be described in detail later.

The following will describe each step in detail.

[2-1] Step of Preparing Monomer Aqueous Solution

This step is a step of preparing an aqueous solution that contains an acrylic acid (salt) as a main component (hereinafter, referred to as a "monomer aqueous solution"). A slurry liquid of the monomer can be also used as long as the fluid retention performance of the obtained water-absorbent resin is not decreased. In this section, for the sake of convenience, the monomer aqueous solution will be described.

The term "main component" means that the used amount (contained amount) of the acrylic acid (salt) with respect to the entire monomer (excluding an internal crosslinking agent) to be subjected to a polymerization reaction for a water-absorbent resin is normally not less than 50% by mole, preferably not less than 70% by mole, and more preferably not less than 90% by mole (the upper limit is 100% by mole).

(Monomer Other than Acrylic Acid)

A monomer other than acrylic acid only needs to be a compound that can be polymerized into a water-absorbent resin. Examples of such a monomer include: acid group-containing unsaturated monomers such as (meth)acrylic acid, maleic acid (anhydride), itaconic acid, cinnamic acid, vinylsulfonic acid, allyltoluene sulfonic acid, vinyltoluene sulfonic acid, styrene sulfonic acid, 2-(meth)acrylamide-2-methylpropane sulfonic acid, 2-(meth)acryloylethane sulfonic acid, 2-(meth)acryloylpropane sulfonic acid, and 2-hydroxyethyl(meth)acryloyl phosphate; amide group-containing unsaturated monomers such as (meth)acrylamide, N-ethyl(meth)acrylamide, and N,N dimethyl (meth)acrylamide; amino group-containing unsaturated monomers such as N,N-dimethylaminoethyl(meth)acrylate, N,N dimethylaminopropyl(meth)acrylate, and N,N-dimethylaminopropyl(meth)acrylamide; mercapto group-containing unsaturated monomers phenolic hydroxyl group-containing unsaturated monomers; lactam group-containing unsaturated monomers such as N-vinylpyrrolidone; and the like.

From the viewpoint of the fluid retention performance of the obtained water-absorbent resin, the monomer other than acrylic acid is an acid group-containing unsaturated monomer, more preferably methacrylic acid, maleic acid (anhydride), itaconic acid, and cinnamic acid, and further preferably methacrylic acid, (Polymerization Inhibitor)

The monomer to be used for polymerization preferably contains a small amount of a polymerization inhibitor from the viewpoint of stability of polymerization. A preferable polymerization inhibitor is p-methoxyphenol. The amount of the polymerization inhibitor contained in the monomer (particularly, acrylic acid and a salt thereof) is normally 1 to 250 ppm, preferably 10 to 160 ppm, and more preferably 20 to 80 ppm.

(Neutralized Salt)

In the case of using an acrylic acid and an acid group-containing unsaturated monomer having an acid group such as a carboxyl group or the like among the above monomers, a neutralized salt obtained by neutralizing a part or the entirety of the acid group can be used. In this case, a salt of the acid group-containing unsaturated monomer is preferably a salt with monovalent cations, more preferably at least one salt selected from an alkali metal salt, an ammonium salt, and an amine salt, further preferably an alkali metal salt, even further preferably at least one salt selected from a sodium salt, a lithium salt, and a potassium salt, and particularly preferably a sodium salt.

(Basic substance)

A neutralizer to be used for neutralizing the above acid group-containing unsaturated monomer is not particularly limited, but an inorganic salt such as sodium hydroxide, potassium hydroxide, sodium carbonate, and ammonium carbonate, a basic substance such as an amine-based organic compound having an amino group or an imino group, or the like is selected as appropriate and used as the neutralizer. As the neutralizer, two or more basic substances may be used in combination Unless otherwise specified, the monomer in the present invention is a concept including a neutralized salt thereof, (Neutralization Ratio)

From the viewpoint of fluid retention performance, the number of moles of the neutralized salt with respect to the total number of moles of the acid group-containing unsaturated monomer and the neutralized salt thereof (hereinafter, referred to as "neutralization ratio") is preferably not less than 40% by mole, more preferably 40% by mole to 80% by mole, further preferably 45% by mole to 78% by mole, and particularly preferably 50% by mole to 75% by mole.

Examples of the method for adjusting the neutralization ratio include: a method in which the acid group-containing unsaturated monomer and the neutralized salt thereof are mixed with each other; a method in which a publicly known neutralizer is added to the acid group-containing unsaturated monomer; a method in which a partially neutralized salt of the acid group-containing unsaturated monomer that is adjusted in advance to a predetermined neutralization ratio (i.e., a mixture of the acid group-containing unsaturated monomer and the neutralized salt thereof) is used; and the like. In addition, these methods may be combined.

The adjustment of the neutralization ratio may be performed before initiation of a polymerization reaction of the acid group-containing unsaturated monomer, may be performed during a polymerization reaction of the acid group-containing unsaturated monomer, or may be performed on a crosslinked hydrogel polymer obtained after end of the polymerization reaction of the acid group-containing unsaturated monomer. In addition, the neutralization ratio may be adjusted at any one stage selected from among before initiation of the polymerization reaction; during the polymerization reaction; and after end of the polymerization reaction, or the neutralization ratio may be adjusted at a plurality of stages among them. In application to absorbent articles such as disposable diapers and the like in which there is a possibility of direct contact with a human body, the neutralization ratio only needs to be adjusted preferably before initiation of the polymerization reaction and/or during the polymerization reaction, and more preferably before initiation of the polymerization reaction.

(Internal Crosslinking Agent)

In the method for producing the water-absorbent resin powder, an internal crosslinking agent is preferably used. By the internal crosslinking agent, the fluid retention performance of the obtained water-absorbent resin, the gel strength thereof at the time of fluid retention, and the like are adjusted.

The internal crosslinking agent only needs to have two or more unsaturated bonds or reactive functional groups within one molecule thereof. Examples of an internal crosslinking agent having a plurality of polymerizable unsaturated groups (that are polymerizable with the monomer) within the molecule thereof include N,N-methylene bis(meth)acrylamide, (poly)ethylene glycol di(meth)acrylate, (poly)propylene glycol di(meth)acrylate, trimethylol propane tri(meth)acrylate, glycerin (meth)acrylate, glycerin acrylate methacrylate, ethylene oxide-modified trimethylol propane tri(meth)acrylate, pentaerythritol hexa(meth)acrylate, triallyl cyanurate, triallyl isocyanurate, triallyl phosphate, and the like. Examples of an internal crosslinking agent having a plurality of reactive functional groups (that can react with a functional group (for example, a carboxy group) of the monomer) within the molecule thereof include triallylamine, polyallyloxy alkane, (poly) ethylene glycol diglycidyl ether, glycerol diglycidyl ether, ethylene glycol, polyethylene glycol, propylene glycol, glycerin, 1,4-butanediol, pentaerythritol, ethylenediamine, ethylene carbonate, propylene carbonate, polyethyleneimine, and the like (here, a cyclic carbonate such as ethylene carbonate and the like is a crosslinking agent that reacts with a carboxyl group, thereby further generating a functional group OH). Examples of an internal crosslinking agent having a polymerizable unsaturated group and a reactive functional group within the molecule thereof include glycidyl (meth)acrylate and the like. Two or more of them may be used in combination.

Among these internal crosslinking agents, from the viewpoint of the advantageous effects of the present invention, a compound having a plurality of polymerizable unsaturated groups within the molecule thereof is preferable, a compound having a (poly) alkylene structural unit within the molecule thereof is more preferable, a compound having a polyethylene glycol structural unit is further preferable, and an acrylate compound having a polyethylene glycol structural unit is particularly preferable. A hydrous gel obtained by using these internal crosslinking agents has low fluid retention capacity (low CRC) at the initial stage of drying, and has low adhesiveness. By drying the hydrous gel having low adhesiveness using a heating device (the heating device of the present invention), fusion or aggregation during drying can be reduced, and thus such drying is preferable. Furthermore, with the hydrous gel obtained by using these internal crosslinking agents, an effect that the fluid retention capacity (CRC) is easily improved is exhibited by drying using the heating device (the heating device of the present invention).

The used amount of the internal crosslinking agent is set as appropriate in accordance with the types of the monomer and the internal crosslinking agent and the like. From the viewpoint of the gel strength of the obtained water-absorbent resin, the used amount of the internal crosslinking agent with respect to the entire monomer is preferably not less than 0.001% by mole, more preferably not less than 0.085% by mole, and further preferably not less than 0.01% by mole. In addition, from the viewpoint of improvement of the fluid retention performance of the water-absorbent resin, the used amount of the internal crosslinking agent is preferably not greater than 5% by mole and more preferably not greater than 2% by mole. In a polymerization condition in which a self-crosslinking reaction of the monomer is effective, the internal crosslinking agent may not be used.

(Other Substances)

In the production method according to the present invention, substances (hereinafter, referred, to as "other substances") whose examples will be described below can be also added to the monomer aqueous solution as long as the objects of the present invention are achieved.

Specific examples of the other substances include chain transfer agents such as thiols, thiolic acids, secondary alcohols, amines, and hypophosphites; foaming agents such as carbonates, bicarbonates, azo compounds, and bubbles; chelating agents such as ethylene diamine tetra(methylene phosphinic acid) and metal salts thereof, ethylenediamine tetraacetic acid and metal salts thereof, and metal salts of diethylenetriamine pentaacetic acid; hydrophilic polymers such as polyacrylic acid (salt) and crosslinked products thereof (for example, water-absorbent resin fine powder to be recycled), starch, cellulose, starch-cellulose derivatives, and polyvinyl alcohol; and the like. The other substances may be used solely, or two or more of the other substances may be used in combination.

The used amount of the other substances is not particularly limited, but the amount of fine powder to be recycled as necessary with respect to the monomer is not greater than 30% by weight, and the total concentration of the other substances other than the fine powder with respect to the monomer is preferably not greater than 10% by mass, more preferably 0.001 to 5% by weight, and particularly preferably 0.01 to 1% by weight.

(Monomer Concentration in Monomer Aqueous Solution)

In this step, from the viewpoint of the physical properties and the productivity of the water-absorbent resin, the monomer concentration in a monomer composition (=total monomer amount/(total monomer amount+total polymerization solvent amount (normally, water))) is preferably 10% by mass to 90% by mass, more preferably 20% by mass to 00% by mass, further preferably 30% by mass to 70% by mass, and particularly preferably 40 to 60% by, weight. Hereinafter, this monomer concentration is sometimes referred to merely as "monomer concentration".

(Polymerization Initiator)

The polymerization initiator to be used in the present invention is selected as appropriate in accordance with the type of polymerization or the like, and thus is not particularly limited, but examples of the polymerization initiator include pyrolytic polymerization initiators, photolytic polymerization initiators, or a combination thereof; or redox polymerization initiators in which these polymerization initiators and the reducing agents that promote decomposition of these polymerization initiators are used in combination.

Specifically, one of the polymerization initiators described in U.S. Pat. No. 7,265,190, or two or more thereof are used. From the viewpoint of the handleability of the polymerization initiator and the physical properties of the water-absorbent resin, a peroxide or an azo compound is preferably used, a peroxide is more preferably used, and a persulfate is further preferably used.

The used amount of the polymerization initiator with respect to the monomer is preferably 0.001 to 1% by mole and more preferably 0.001 to 0.5% by mole. In addition, the used amount of the polymerization initiator With respect to the monomer is preferably 0,0001 to 0.02% by mole.

(Dissolved Oxygen Amount)

Oxygen dissolved in the monomer aqueous solution before polymerization is also preferably reduced by temperature increase or substitution with an inert gas. For example, the dissolved oxygen is reduced to preferably 5 ppm or less, more preferably 3 ppm or less, and particularly preferably 1 ppm or less.

Bubbles (particularly, the above inert gas, etc.) can be dispersed in the monomer aqueous solution. In this case, foaming polymerization occurs in the polymerization reaction.

[2-2] Polymerization Step

This step is a step of polymerizing the monomer aqueous solution to obtain a crosslinked hydrogel polymer (hereinafter, sometimes referred to as a "hydrous gel").

In addition to the method of carrying out a polymerization reaction by adding the polymerization initiator, there is a method of applying active energy rays such as radiation, electron rays, ultraviolet rays, and the like. Moreover, after the polymerization initiator is added, application of active energy rays may be used in combination.

(Type of Polymerization)

The type of polymerization is not particularly limited. From the viewpoint of fluid retention properties, ease of polymerization control, and the like, examples of the type of polymerization are preferably droplet polymerization in vapor phase, aqueous solution polymerization, and reverse phase suspension polymerization (droplet polymerization in the hydrophobic organic solvent is also included in examples of reverse phase suspension polymerization), more preferably aqueous solution polymerization and reverse phase suspension polymerization, and further preferably aqueous solution polymerization. Among them, continuous aqueous solution polymerization is particularly preferable, and any of continuous belt polymerization and continuous kneader polymerization is used. As specific examples of the type of polymerization, continuous belt polymerization is disclosed in U.S. Pat. Nos. 4,893,999 and 6,241,928, US Patent Application Publication No. 2005/215734, and the like, and continuous kneader polymerization is disclosed in U.S. Pat. Nos. 6,987,151 and 6,710,141, and the like. By adopting these continuous aqueous solution polymerizations, the production efficiency of the water-absorbent resin is improved.

Examples of preferable types of the above continuous aqueous solution polymerization include "high-temperature-initiation polymerization", "high-concentration polymerization", and the like. The term "high-temperature-initiation polymerization" refers to a type of polymerization in which polymerization is initiated when the temperature of the monomer aqueous solution is preferably not lower than 30° C., more preferably not lower than 35° C., further preferably not lower than 40° C., and particularly preferably not lower than 50° C. (the upper limit is the boiling point of the monomer aqueous solution). The term "thigh-concentration polymerization" refers to a type of polymerization in which polymerization is carried out when the monomer concentration is preferably not less than 30% by mass, more preferably not less than 35% by mass, further preferably not less than 40% by mass, and particularly preferably not less than 45% by mass (the upper limit is the saturation concentration). These types of polymerization can be used in combination.

In droplet polymerization in vapor phase, polymerization can be carried out in the air atmosphere. However, from the viewpoint of the color tone of the obtained water-absorbent resin, polymerization can be preferably carried out in an inert gas atmosphere such as nitrogen, argon, and the like. In this case, for example, the concentration of oxygen in vapor phase is preferably controlled to be not greater than 1% by volume.

(Polymerization Ratio)

The polymerization ratio of the crosslinked hydrogel polymer obtained in the polymerization step is preferably not less than 90% by mass, more, preferably not less than 95% by weight, further preferably not less than 98% by weight, and particularly preferably not less than 99% by weight, from the viewpoint of inhibition of aggregation during heating treatment of the particulate crosslinked hydrogel polymer obtained in the next grinding step or a reduction in the residual monomer in the obtained water absorbing agent. When the polymerization ratio is low, the hydrous gel during drying by a rotary heating device tends to aggregate or adhere thereto. The upper limit of the polymerization ratio is not particularly limited, but the polymerization ratio is ideally 100% by mass. For a high polymerization ratio, a long polymerization time or a strict polymerization condition is required, and a decrease in productivity or physical properties may be caused. Thus, the upper limit is sufficiently about 99.95% by weight, further about 99.9% by weight, and normally about 99.8% by weight. Typically, the upper limit is 98 to 99.99% by mass, and, further preferably within the above range. Although a technique in which, in order to improve the productivity, a hydrous gel having a polymerization ratio of not greater than 90% by mass is taken out from a polymerization device and dried is also known (for example, WO2006/10322), the present inventors have found that adjustment of the polymerization ratio is important for drying a particulate hydrous gel by a heating device.

[2-3] Gel-Crushing Step

This step is a step of grinding and finely granulating the crosslinked hydrogel polymer obtained in the polymerization step, simultaneously with and/or after polymerization, and is a step of grinding the crosslinked hydrogel polymer by a screw extruder such as a kneader, a meat chopper, and the like, or a device such as a cutter mill and the like, to obtain a particulate crosslinked hydrogel polymer (hereinafter, referred to as a "particulate hydrous gel"). A preferable particle diameter is within a range described later, and this step is performed such that the shape and the size of dried particles obtained in the drying step described later or surface-crosslinked dried particles obtained in the surface-crosslinking step described later are close to a target product particle size.

In the case where the polymerization step is kneader polymerization, the polymerization step and the gel-crushing step are simultaneously performed. Regarding the conditions and the mode of gel-crushing other than the above, the method in Patent Literature 35 to 37, particularly, the contents disclosed in Patent Literature 36 (WO2011/126079), are preferably used in the present invention, and are preferably used when drying (or surface crosslinking simultaneously with drying) a particulate hydrous gel having a small particle diameter in the production method according to the present invention. Although Patent Literature 35 to 37 disclose ventilation drying (particularly, Patent Literature 36 discloses through-flow band drying) as a drying method, the present invention solves the above problem that is not disclosed in Patent Literature 35 to 37, by using a specific drying device that is not disclosed in Patent Literature 35 to 37, (Gel-Crushing Energy)

Gel-crushing energy (GGE), which is described in Patent Literature 36, means mechanical energy, per unit weight (unit weight of a crosslinked hydrogel polymer), that is necessary for a gel-crushing device to grind the crosslinked hydrogel polymer, and is calculated by the following (formula 1) when the gel-crushing g device is driven by three-phase alternating current power.

Gel-crushing energy [J/g]=($3^{1/2}$×voltage×current× power factor×motor efficiency)/{weight of hydrous gel put into gel-crushing device for one second}　　　(formula 1)

The power factor and the motor efficiency are each a value that is specific to the gel-crushing device and changes depending on the operating condition of the gel grinding device or the like, and are each a value from 0 to 1. In the case where the gel-crushing device is driven by single-phase alternating current power, gel-crushing energy is calculated by changing $3^{1/2}$ in the above formula to 1. In the above (formula 1), the unit of the voltage is [V], the unit of the current is [A], and the unit of the weight of the hydrous gel is [g] For preferable gel-crushing energy (GGE) used in the present invention, the range in Patent Literature 36 can be used, but the preferable gel grinding energy (GGE) is not particularly limited.

(Gel Fluidizer)

In the production method according to the present invention, in the gel-crushing step, a gel fluidizer is preferably added to a hydrous gel or a particulate hydrous gel that is ground material thereof. The addition of the gel fluidizer is particularly effective in the case of treating the particulate hydrous gel in the later-described drying step and a later described heating treatment step during surface-crosslinking.

Specifically, from the viewpoint of industrial efficiency, the gel fluidizer is preferably added when a particulate hydrous gel having a diameter of not greater than 1 mm is handled. In particular, by adding the gel fluidizer before the drying step of the present invention, water-absorbing agent particles that have moderately aggregated are obtained.

The addition amount of the gel fluidizer is set as appropriate in accordance with the moisture content of the hydrous gel or the particulate hydrous gel or the type of the gel fluidizer. The addition amount with respect to the solid content of the hydrous gel is preferably 0.001% by mass to 0.5% by mass, more preferably 0.01% by mass to 0.3% by mass, and further preferably 0.02% by mass to 0.2% by mass.

Examples of the gel fluidizer include the anionic, cationic, nonionic, and amphoteric surfactants exemplified in Patent Literature 22 to 24, 26, and 28, anionic, cationic, nonionic, and amphoteric low-molecular weight or high-molecular-weight surfactants, polymer lubricants, and the like.

(Surfactant)

Specific examples of surfactants used as the gel fluidizer include (1) nonionic surfactants such as sucrose fatty acid esters, polyglycerin fatty acid esters, sorbitan fatty acid esters, polyoxyethylene sorbitan fatty acid esters, polyoxyethylene glycerin fatty acid esters, sorbitol fatty acid esters, polyoxyethylene sorbitol fatty acid esters, polyoxyethylene alkyl ethers, polyoxyethylene alkyl phenyl ethers, polyoxyethylene castor oil, polyoxyethylene hydrogenated castor oil, alkylallylformaldehyde-condensed polyoxyethylene ethers, polyoxyethylene polyoxypropylene block copolymers, polyoxyethylene polyoxypropyl alkyl ethers, polyethylene glycol fatty acid esters, alkyl glucosides, N-alkyl gluconamides, polyoxyethylene fatty acid amides, polyoxyethylene alkylamines, phosphates of polyoxyethylene alkyl ethers, phosphates of polyoxyethylene alkyl aryl ethers, and the like, (2) amphoteric surfactants including: alkyl dimethylamino acetic acid betaines such as caprylic dimethylamino acetic acid betaine, lauryl dimethylamino acetic acid betaine, myristyl dimethylamino acetic acid betaine, stearyl dimethylamino acetic acid betaine, and the like; alkylamide propyl betaines such as lauric acid amide propyl betaine, coconut oil fatty acid amide propyl betaine, palm kernel oil fatty acid amide propyl betaine, and the like; alkyl hydroxy, sulfobetaines such as lauryl hydroxy sulfobetaine and the like; alkyl carboxymethyl hydroxyethyl imidazolinium betaines such as 2-alkyl-N-carboxymethyl-hydroxyethyl imidazolinium betaine and the like; and the like, (3) anionic surfactants including alkyl amino monoalkali metal diacetates such as lauryl amino monosodium diacetate, lauryl amino potassium diacetate, myristyl amino sodium diacetate, and the like, and (4) cationic surfactants such as long-chain alkyl dimethylaminoethyl quaternary salts and the like. Two or more of these surfactants may be used in combination.

(Polymer Lubricant)

In the production method according to the present invention, a polymer lubricant whose examples will be described below can be added to the monomer aqueous solution or hydrous gel as long as the objects of the present invention are achieved.

Specific examples of the polymer lubricant include maleic anhydride-modified polyethylene, maleic anhydride-modified polypropylene, maleic anhydride-modified ethylene-propylene copolymer, maleic anhydride-modified ethylene-propylene-diene terpolymer (EPDM), maleic anhydride-modified polybutadiene, maleic anhydride-ethylene copolymer, maleic anhydride-propylene copolymer, maleic anhydride-ethylene-propylene copolymer, maleic anhydride-butadiene copolymer, polyethylene, polypropylene, ethylene propylene copolymer, oxidized polyethylene, oxidized polypropylene, oxidized ethylene-propylene copolymer, ethylene-acrylic acid copolymer, ethyl cellulose, ethyl hydroxyethyl cellulose, polyalkylene oxides such as polyethylene glycol, and the like. The molecular weights (weight-average molecular weights) of these polymer lubricants are each selected as appropriate from the range of preferably 200 to 2 million and more preferably 400 to one million.

Two or more of these polymer lubricants may be used in combination.

As the gel fluidizer, these polymer lubricants and the above surfactants may be used in combination.

In the case where a surfactant and a polymer lubricant are used in combination, the total addition amount thereof is set as appropriate in accordance with the type of polymerization, the composition of the monomer aqueous solution, and the moisture content of the hydrous gel. The total addition amount is set as a concentration with respect to the monomer component in the case where the surfactant and the polymer lubricant are added to the monomer aqueous solution, is set as a concentration with respect to the solid content rate of the hydrous gel in the case where the surfactant and the polymer lubricant are added to the hydrous gel, and is set as the sum of the above in the case where the surfactant and the polymer lubricant are added to both.

The total addition amount of the surfactant and the polymer lubricant is preferably not greater than 1.0% by mass and more preferably not greater than 0.5% by mass, and is preferably not less than 0.05% by mass and particularly preferably not less than 0.1% by mass, (Surface Tension)

The type and the addition amount of the gel fluidizer are selected in consideration of the fluidity of a target particulate hydrous gel and the like. The type and the amount of the gel fluidizer with which the surface tension of a water-absorbent resin that is a final product is not excessively decreased, are preferable in view of the amount of return from the obtained water-absorbent resin in an absorbent article (diaper) during actual use, and the like. For example, the type and the amount of the gel fluidizer are selected such that the surface tension of the water-absorbent resin (the surface tension of a dispersion liquid obtained by dispersing the water-absorbent resin in a physiological saline solution) is preferably not less than 55 mN/m, more preferably not less than 60 mN/m, and further preferably not less than 65 mN/m. The surface tension is measured by the method described in WO2015/129917. Examples of the gel fluidizer that allows the surface tension to be set within this range include the betaine surfactants in Patent Literature 28.

[2-4] Drying Step

Figure 11:
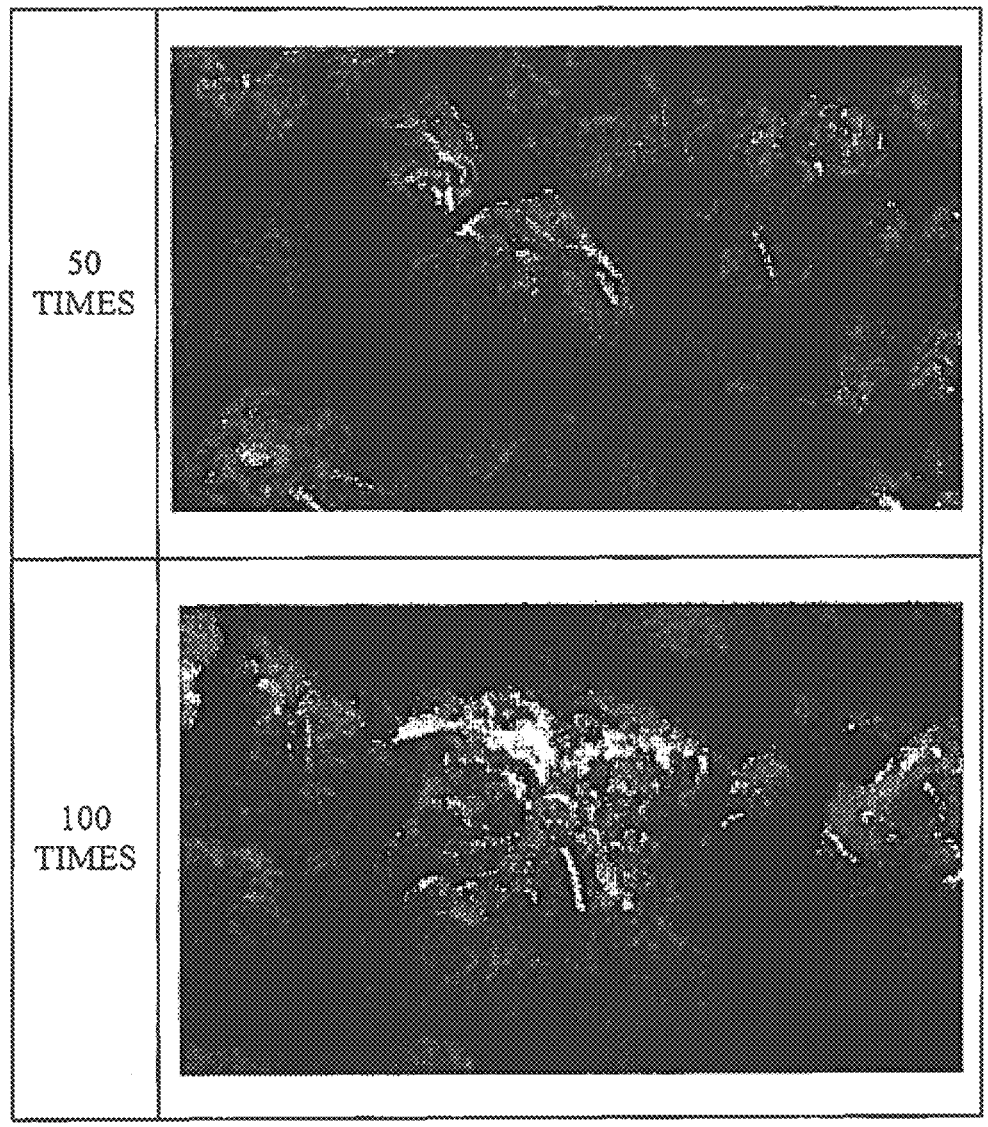
FIG. 11 shows electron micrographs of dried particles (granulated material) obtained by the production method according to the present invention.

This step is a step of drying a particulate hydrous gel (preferably containing the gel fluidizer) to a desired solid content rate, thereby obtaining dried particles, and preferably a step of drying the particulate hydrous gel and also granulating the particulate hydrous gel to obtain dried granulated particles. The particulate hydrous gel to be subjected to this step is not limited to matter obtained by gel grinding the hydrous gel obtained through the aforementioned aqueous solution polymerization, and may be obtained through reverse phase suspension polymerization, for example. In addition, the term "dried granulated particles" means particulate dried material formed by a plurality of water-absorbent resin particles physically or chemically adhering to each other, and can be confirmed from increase in average particle diameters before and after drying, an electron micrograph, or the like. For example, an example of an electron micrograph of the dried granulated particles obtained in the drying step of the production method according to the present invention is shown in FIG. 11. Hereinafter, the dried granulated particles is sometimes referred to as "granulated material". The "solid content rate" means a value calculated from a drying loss (a mass change when 1 g of a sample is dried at 180° C. for 3 hours).

In the present invention, the solid content rate of the dried particles that has undergone the drying step is preferably not less than 80% by mass, more preferably 85% by mass to 99.8% by mass, further preferably 90% by mass to 99.7% by mass, much more preferably 92% by mass to 99.5% by mass, particularly preferably 96% by mass to 99.5% by mass, and extremely preferably 98 to 99.5% by weight. When the solid content rate after drying is excessively high, drying for a long period of time is required, and also deterioration of physical properties or coloring may occur after drying. In addition, when the solid content, rate after drying is low, for example, a decrease in productivity in, the sizing step or a decrease in fluid retention capacity (CRC) may occur. Moreover, in the case of performing the later-described surface-crosslinking step after the drying step, physical properties are further improved by drying to the above solid content rate. Thus, the drying to the above solid content rate is preferable. The moisture content (=100−solid content rate) of the dried particles is obtained from the above solid content rate.

(Drying Device)

In the production method according to the present invention, a heating device is used as a drying device in the drying step instead of a ventilation drying machine that is conventionally used heavily (particularly, the through-flow band drying machines described in Non-Patent Literature 1 and Patent Literature 17 to 22, etc.). The heating device includes a rotary container that contains a particulate hydrous gel therein and rotates; and a plurality of heating tubes that are located within the rotary container, extend in the axial direction of the rotary container, and rotate together with the rotary container. In the specification of the present application, the heating device having this configuration is sometimes referred to as a "rotary heating device" or a "rotary heating device with heating tubes". More preferably, the heating device further includes another heating means on the outer peripheral surface of the rotary container. In the heating device, the particulate hydrous gel contained in the rotary container is stirred by rotation of the container and heated by contact with the plurality of heating tubes or heat conduction from the heating tubes. The inner surface of the rotary container is also heated by radiant heat of the plurality of heating tubes and the like, but the particulate hydrous gel is further heated, as necessary, by the heating means located on the outer peripheral surface of the rotary container. In the heating device, another stirring means such as a stirring blade and the like is also used as necessary. However, the particulate hydrous gel flows within the container mainly due to rotation of the rotary container containing the particulate hydrous gel and action of the plurality of heating tubes rotating together with the rotary container, and thus mechanical and thermal damage to the particulate hydrous gel, which is an object to be dried, is little. Accordingly, deterioration of physical properties and generation of fine powder in the drying step are inhibited. Furthermore, in the heating device, drying is performed by indirect heat, transfer from the heating tubes, and thus there is an advantage that no dried material scatters as in drying with hot air (a through-flow band drying machine or a through-flow heating type rotary kiln) and it is not necessary to treat a large volume of waste gas. Moreover, in the heating device, the object to be dried flows mainly due to rotation of the rotary container, thus great energy is not required for stirring a particulate hydrous gel having adhesiveness as in a continuous stirring drying machine that performs stirring with a stirring blade or the like, and there is also an advantage that a decrease in the physical properties of the water-absorbent resin after drying (for example, a decrease in water absorption speed, an increase in soluble component), fine powder generation, aggregation during drying, and the like are avoided.

Examples of the heating device used in the production method according to the present invention include rotary drying machines with steam tubes. Specific examples thereof include a steam tube dryer (manufactured by Kurimoto, Ltd.), a steam tube dryer (manufactured by Ube Machinery Corporation, Ltd.), a steam tube dryer (manufactured by Teukishima Kikai Co Ltd.), a steam tube dryer (manufactured by Mitsui Engineering & Shipbuilding Co. Ltd.), and the like.

Unless achievement of the objects of the present invention is disturbed, the heating device may include another stirring means for causing an object to be dried to flow (for example, a scraping plate on the inner surface of the rotary container) and/or another heating means. From the viewpoint of drying efficiency and reduction in thermal damage to the water-absorbent resin, the other heating means is preferably a heating means by direct heat transfer achieved by convection heat transfer and/or by indirect heat transfer achieved by heat conduction from a heating surface (a contact surface with a particulate hydrous gel, a heat source portion), which is heated by a heat medium, of the heating device. The heating means is more preferably of a through-flow heating type in the case of direct heat transfer and of an outer wall heating type in the case of indirect heat transfer.

As long as the objects of the present invention are achieved, the number of rotary heating devices that can be used in the drying step may be only one, or may be two or more. A plurality of rotary heating devices having different specifications may be used in combination. In addition, a rotary heating device and another drying device that is not classified as a rotary heating device may be used in combination. At least one rotary heating device is preferably included. In this case, the type and the number of drying devices to be combined are not limited.

Examples of the other drying device that is not classified as the drying device used in the production method according to the present invention (that is, a rotary heating device) include a single-shaft or twin-shaft disc drying machine, a single-shaft or twin-shaft paddle drying machine, a rotary dryer, a rotary kiln, and the like. specifically, as a continuous stirring drying machine, stirring type drying devices, such as Solidair (manufactured by HOSOKAWA MICRON CORPORATION), a CD dryer (manufactured by Kurimoto, Ltd.), a paddle dryer (manufactured by NARA MACHINERY CO., LTD.), a rotary kiln (manufactured by Kurimoto, Ltd.), a rotary dryer (manufactured by OKAWARA MFG. CO., LTD.), and the like, can be used.

In the case of using a plurality of heating devices, timing of switching of the devices can be determined with the solid content rate or the remaining solvent amount of obtained dried particles as an index. For example, in the case of using the solid content rate as an index, examples of the drying mode include a mode in which the object to be dried is dried by the heating device at the first stage until the solid content rate reaches about 70% by mass, and then the object to be dried is dried by the heating device at the second stage until the solid content rate reaches a desired solid content rate, a mode in which the object to be dried is further dried by the heating device at the second stage until the solid content rate reaches about 85% by mass, and then the object to be dried is dried by the heating device at the third stage until the solid content rate reaches a desired solid content rate, and the like. In addition, in the case of using the remaining organic solvent amount as an index for timing of switching when drying a particulate hydrous gel obtained through reverse phase suspension polymerization (including liquid phase droplet polymerization), examples of the drying mode include a mode in which, when the remaining organic solvent has been reduced to preferably 10000 ppm, more preferably 5000 ppm in terms of dry weight by the heating device at the first stage, the particulate hydrous gel is dried by the heating device at the second stage until the remaining solvent amount reaches a desired amount. In the case where a rotary heating device and another drying device are combined, a mode in which the rotary heating device is used at a stage in which the solid content is low or the remaining solvent amount is large, is preferable.

In the production method according to the present invention, from the viewpoint of drying efficiency, the Froude number ($Fr=\omega^2*r/g$) of the rotary heating device is set as appropriate on the basis of the device size or the drying processing amount (the drying amount per hour), but is within a range of preferably 0.001 to 1, more preferably 0.005 to 0.5, further preferably 0.01 to 0.3; and particularly preferably 0.02 to 0.2. The Froude number Fr is the ratio of centrifugal acceleration $\omega^2*r$ applied to an object to be dried stirred within the rotary container, relative to gravitational acceleration g ($\Omega$ is the angular velocity of a rotator (rad/sec), r is a representative radius of the rotator (m)).

The rotation speed of the rotary container is set as appropriate on the basis of the device size or the drying processing amount (the drying amount per hour), but is preferably 1 rpm to 250 rpm, more preferably, 1 rpm to 100 rpm, and further preferably 2 rpm to 50 rpm. In addition, the maximum peripheral speed of the rotary container is not particularly limited, but is preferably 0.05 m/s to 10 m/s, more preferably 0.1 m/s to 8 m/s, and further preferably 0.15 m/s to 5 m/s.

The heating device can also have a function to bring the device interior into a pressurized state, a normal pressure state, or a reduced pressure state. In the case of bringing the device interior into a pressurized state, the device interior is adjusted, for example, by increasing the amount of a carrier gas to be introduced into the heating device. The degree of pressurization with respect to the atmospheric pressure is preferably slight pressurization of greater than 0 kPa and not greater than 0.01 kPa. In the case of bringing the device interior into a reduced pressure state, the device interior is adjusted, for example, by changing the amount of exhaust gas (steam generated during drying and the introduced carrier gas) sucked from the heating device. The degree of pressure reduction with respect to the atmospheric pressure is slight pressure reduction of preferably greater than 0 kPa and not greater than 5 kPa, more preferably greater than 0 kPa and not greater than 2 kPa, and further preferably 0.01 kPa to 0.5 kPa. By setting the degree of pressure reduction within the above range, steam generated during drying can be efficiently removed without taking an excessive amount of heat within the heating device, and thus the drying efficiency improves. In addition, aggregation and agglomeration of the particulate hydrous gel in the drying step can be reduced. The term "degree of pressurization with respect to the atmospheric pressure" and the term "degree of pressure reduction with respect to the atmospheric pressure" mean differential pressures with respect to the atmospheric pressure and are represented as the absolute values of differences from the atmospheric pressure. For example, when the atmospheric pressure is the standard atmospheric pressure (101.3 kPa) and the degree of pressure reduction with respect to the atmospheric pressure is 10 kPa, the actual air pressure is 91.3 kPa.

The heating device can also have a function to introduce a gas into the device (preferably a means for introducing and discharging the gas). Examples of the means for introducing and discharging the gas include a gas introduction port and a gas discharge port. The positions at which the gas introduction port and the gas discharge port are provided are not limited, but the gas introduction port and the gas discharge port are preferably provided at the to-be-dried object inlet side and outlet side of the heating device, and may be provided with a gas introduction mechanism and a gas discharge mechanism as necessary. The gas is not particularly limited, but examples thereof include air, dry air, nitrogen, steam, mixed gases thereof, and the like. The gas serves as a carrier gas and promotes drying by discharging steam generated during drying, from the device. Moreover, in the case of using a heated gas, the gas also serves as a heat medium and further promotes drying. Preferably, nitrogen, steam, mixed gases thereof with air, and the like are used. In the case of using a mixed gas containing steam (hereinafter, also referred to as a high-humidity mixed gas), the device interior is brought into a low oxygen state, and oxidation or degradation during drying is inhibited. As a result, performance improvement and reduced coloring of the water-absorbent resin can be achieved. Furthermore, aggregation and agglomeration of the particulate hydrous gel during drying can be inhibited, and thus the use of the mixed gas containing steam is preferable.

The amount of the gas to be introduced, with respect to the processing amount per unit time (kg/hr) of the water-absorbent resin (in terms of hydrous gel solid content), is normally 0.05 $Nm^3/kg$ to 20 $Nm^3/kg$, but is preferably 001 $Nm^3/kg$ to 10 $Nm^3/kg$, more preferably 0.1 $Nm^3/kg$ to 5 $Nm^3/kg$, further preferably 0.2 $Nm^3/kg$ to 2.5 $Nm^3/kg$, and particularly preferably 0.2 $Nm^3/kg$ to 1 $Nm^5/kg$.

In the present invention, by introducing the gas into the heating device through one location or a plurality of locations, the dew point of the atmosphere within the heating device can be adjusted. In other words, the dew point can be adjusted as appropriate in accordance with the moisture content of the particulate hydrous gel to be put into the heating device. The dew point is measured at the point of discharge from the heating device, and is preferably not lower than 60° C., more preferably not lower than 65° C., and further preferably not lower than 70° C., The upper limit of the dew point is not particularly limited, but the dew point is preferably not higher than 100° C. By setting the dew point within the above range, for example, the dried state is improved and the residual monomer is reduced, so that the performance of the obtained water-absorbent resin improves.

The movement direction of the gas in the heating device may be a parallel or counter flow direction with respect to the movement direction of the particulate hydrous gel, which is an object to be dried, or may be a mixture thereof.

The drying temperature in each heating device is adjusted on the basis of the temperature of a heat medium to be used. For example, in the case where the aforementioned gas (hot air) is introduced into these heating devices (particulate hydrous gel-containing portions), the gas serves as a heat medium for direct heat transfer. From the viewpoint of drying efficiency by direct heat transfer, the temperature of the heat medium (gas) is preferably not lower than 100° C. (not lower than 0.1013 MPa when the heat medium is steam), more preferably not lower than 120° C., and further preferably not lower than 150° C.

In the case where the aforementioned heated gas (hot air) is introduced into the heating tubes of each heating device, a jacket provided on the outer surface of each heating device, or the like, the gas serves as a heat medium for indirect heat transfer. From the viewpoint of drying efficiency by indirect heat transfer, the temperature of the heat medium (gas) is preferably not lower than 150° C. (not lower than about 0.49 MPa as saturation pressure when the heat medium is steam), more preferably not lower than 160° C. (not lower than 0.62 MPa in the same case), further preferably not lower than 170° C. (not lower than 0.79 MPa in the same case), and particularly preferably not lower than 100° C. (not lower than 1.0 MPa in the same case). It has been found that, when the temperature of the heat medium is not higher than 100° C. in the case of direct heat transfer or is lower than 160° C. and particularly lower than 150° C. in the case of indirect heat transfer, adhesion or aggregation of the particulate hydrous gel is likely to occur. In the case of indirect heat transfer, a heat medium in liquid form such as oil may be used as a heat medium other than gas, but steam is preferable.

From the viewpoint of degradation or coloring of the water-absorbent resin and the performance of the water-absorbing agent, in both cases of direct heat transfer and indirect heat transfer, the drying temperature is preferably not higher than 300° C. (about 8.6 MPa when the heat medium is steam), more preferably not higher than 280° C. (about 6.4 MPa in the same case), and further preferably not higher than 250° C. (about 4.0 MPa in the same case). The temperature may be constant, or may be changed as appropriate during drying. The drying time is preferably 10 minutes to 120 minutes, more preferably 20 minutes to 90 minutes, and further preferably 20 minutes to 60 minutes. The filling rate in the heating device (the filled volume ($m^3$) of the object to be dried with respect to the inner volume ($m^3$) of the heating device) is selected as appropriate, but is selected as appropriate from a range of preferably 5 to 95%, more preferably 6 to 50%, and further preferably 10 to 40%, from the viewpoint of drying efficiency.

Figure 2:
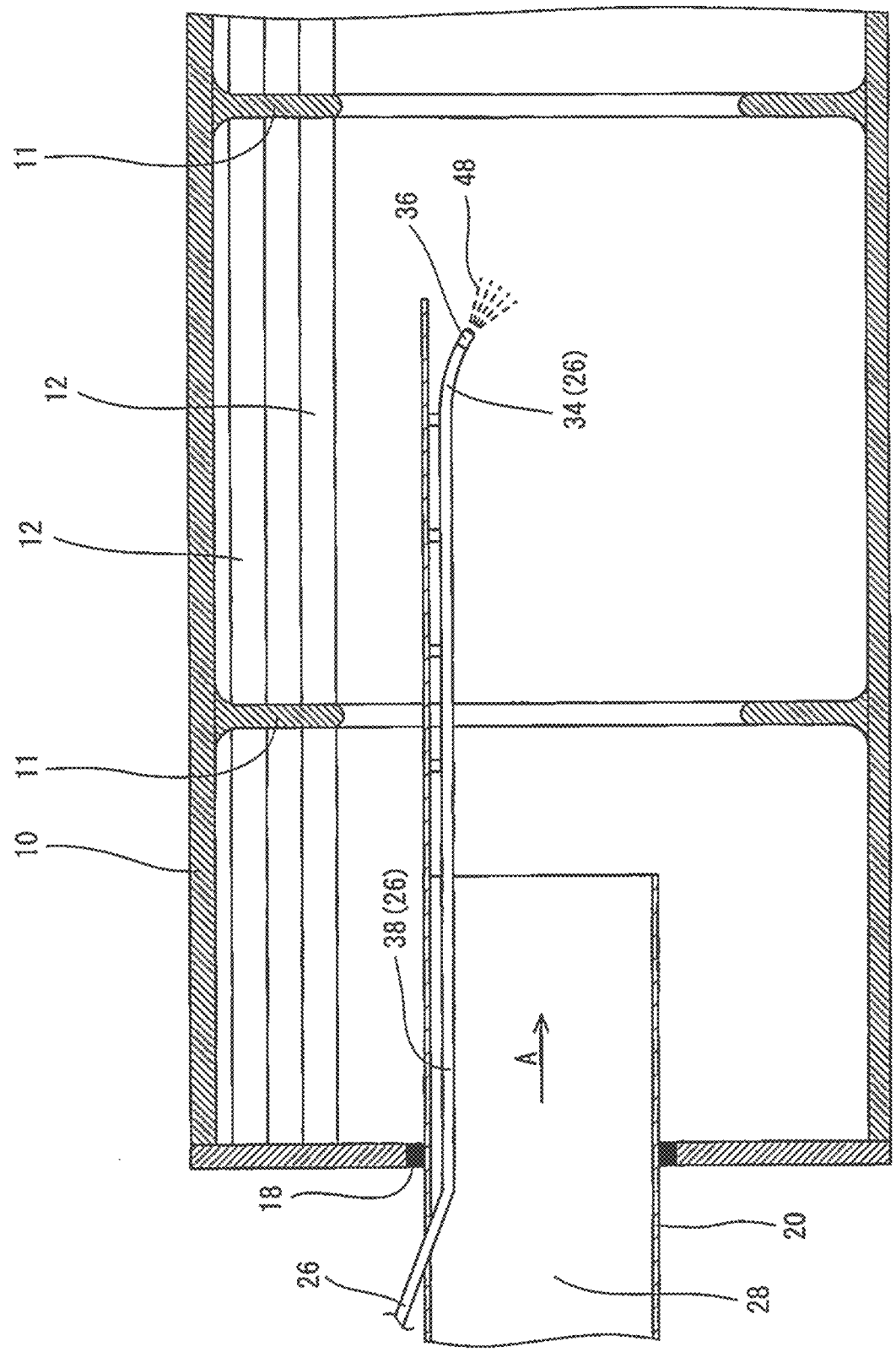
FIG. 2 is an enlarged cross-sectional view showing a part of the heating device in FIG. 1.

FIGS. 1 and 2 show an example of a rotary heating device 2 with heating tubes. The following will describe a basic configuration, and a use method of the heating device 2 with reference to FIGS. 1 and 2.

As shown, the heating device 2 has a main portion 4, an input portion 6, and a takeout portion 8. The main portion 4 has a rotary container 10, multiple heating tubes 12, a first gear 14, a second gear 16, and a packing 18. The rotary container 10 generally has a cylindrical shape. The right-left direction in FIG. 1 is the axial direction of the rotary container 10. A plurality of obstructive walls 11 are provided on the inner wall of the rotary container 10 so as to be spaced apart from each other in the axial direction. Each of the obstructive walls 11 extends along the inner peripheral surface of the rotary container 10.

The multiple heating tubes 12 are housed within the rotary container 10. Each of the heating tubes 12 extends in the axial direction of the rotary container 10 and penetrates both ends of the rotary container 10. As will be described later, none of the multiple heating tubes 12 is in contact with the inner peripheral surface of the rotary container 10 in the axial direction.

In FIG. 2, for the convenience of explanation, merely some of the heating tubes 12 are shown. The first gear 14 is fixed to the outer peripheral surface of the rotary container 10. The second gear 16 is in mesh with the first gear 14. In FIG. 2, for the convenience of explanation, the first gear 14 and the second gear 16 are not shown. The packing 18 is located between the rotary container 10 and the input portion 6.

The input portion 6 has a main tube 20, a hopper 22, and a pipe 26. As shown in FIG. 2, the main tube 20 is open within the rotary container 10. The interior of the main tube 20 is referred to as an inner space 28. The hopper 22 has a shape in which the inner dimension thereof gradually decreases from the upper side toward the lower side. The lower end of the hopper 22 is fixed to the main tube 20.

Although not shown, the hopper 22 communicates with the inner space 20. As is obvious when referring to FIGS. 1 and 2 together, one end 32 of the pipe 26 is exposed from the main tube 20, and another end 34 thereof reaches the interior of the rotary container 10. The pipe 26 has a nozzle 36 at the other end 34. An intermediate portion 38 of the pipe 26 is housed in the inner space 28.

The takeout portion 8 has a takeout port 40, a steam inlet 44, and a drain 46. The steam inlet 44 communicates with the multiple heating tubes 12. The drain 46 also communicates with the multiple heating tubes 12.

Figure 3:
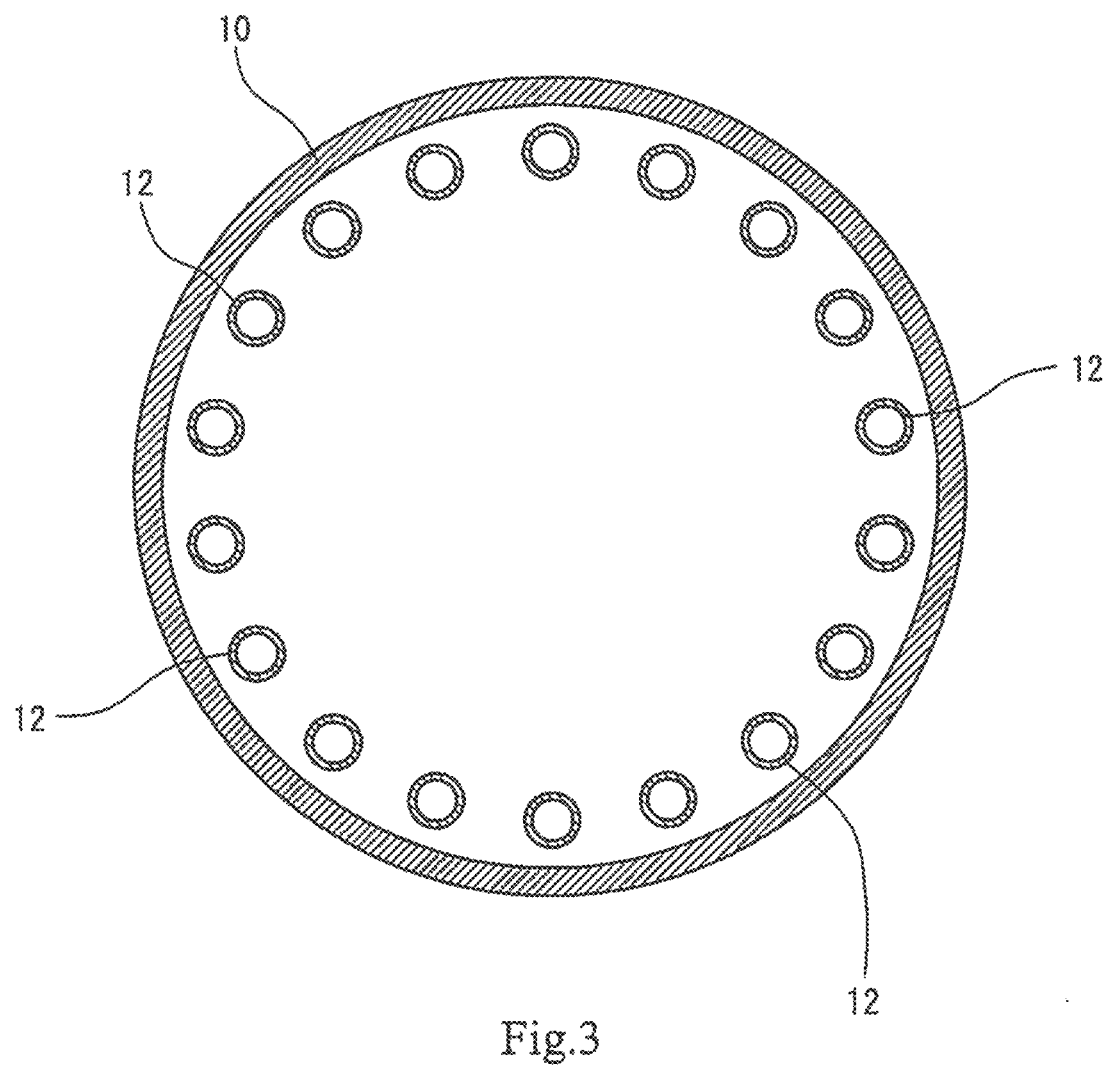
FIG. 3 is a cross-sectional view of the heating device taken along a line in FIG. 1.

FIG. 3 is a cross-sectional view of the heating device 2 taken along a line III-III in FIG. 1. As shown, the heating device 2 of this embodiment has 18 heating tubes 12. These heating tubes 12 are arranged on a concentric circle centered on the rotation axis of the rotary container 10, so as to be spaced apart from each other. When the inner radius (radius) of the rotary container 10 is denoted by R and the length in the axial direction of the rotary container 10 is denoted by L, the inner peripheral surface area of the rotary container 10 is 2 nRL. Meanwhile, when the outer radius (radius) of each heating tube 12 is denoted by r and the length in the axial direction of each heating tube 12 is denoted by l, the total area of the outer peripheral surfaces of the 18 heating tubes 12 is 36 nrl. The outer radius r of each heating tube 12 is sufficiently small with respect to the inner radius R of the rotary container 10, and the length 1 in the axial direction of each heating tube 12 and the length L in the axial direction of the rotary container 10 are normally approximate to each other. Therefore, the heat transfer area of the 18 heating tubes 12 is larger than the inner peripheral surface area of the rotary container 10. With the heating device 2, it is possible to perform efficient drying since the 18 heating tubes 12 have a heat transfer surface wider than the inner peripheral surface area of the rotary container 10.

For allowing the drying step to be performed by the heating device 2, steam is introduced through the steam inlet 44 toward the heating tubes 12. The temperature within the rotary container 10 is increased by the steam. A part of the steam is cooled by heat exchange. The cooled steam turns to water and is discharged through the drain 46. The temperature within the rotary container 10 is controlled by continuously introducing steam through the steam inlet 44 so as to make up for the steam that has turned to water and been discharged.

A gas is introduced into the rotary container 10. The gas fills the interior of the rotary container 10. Excess gas is discharged from the rotary container 10.

The second gear 16 is rotated by a drive means (for example, a motor) that is not shown. By the rotation of the second gear 16, the first gear 14 rotates, and the rotary container 10 further rotates. The multiple heating tubes 12 also rotate together with the rotary container 10. The input portion 6 is cut off from the rotary container 10 by the packing 18. Thus, even when the rotary container 10 rotates, the input portion 6 does not rotate. Similarly, even when the rotary container 10 rotates, the takeout portion 8 does not rotate.

After the temperature of the atmosphere in the rotary container 10 reaches a predetermined temperature, a particulate hydrous gel is put into the hopper 22. The particulate hydrous gel advances in the inner space 28 toward the direction indicated by an arrow A in FIG. 2. The particulate hydrous gel is introduced into the rotary container 10. The particulate hydrous gel is stirred by rotation of the rotary container 10 and action of the plurality of heating tubes 12 rotating together with the rotary container 10. Furthermore, the particulate hydrous gel is heated by heat exchange with steam passing through the heating tubes 12.

Although not shown, the heating device 2 is provided with an inclination in the axial direction from one end thereof toward the other end thereof. In the heating device 2, a downward inclination is provided from the input portion G toward the takeout portion 8. Due to the inclination and rotation of the rotary container 10, the particulate hydrous gel gradually advances within the rotary container 10 in the rightward direction in FIG. 2, that is, from the input portion 6 toward the takeout portion 8.

The particulate hydrous gel is further heated by heat exchange with the steam passing through the multiple heating tubes 12, while advancing toward the takeout portion 8. By the heating and the stirring by the heating device 2, the particulate hydrous gel is adjusted to a predetermined moisture content, and dried particles is obtained. Alternatively, a plurality of particulate hydrous gels or dried particles aggregate, and granulated material is obtained.

In the advancement direction of the particulate hydrous gel that advances within the rotary container 10 toward the takeout portion 8, the obstructive walls 11 are present. The obstructive walls 11 obstruct advancement of the particulate hydrous gel having a high moisture content. The particulate hydrous gel having the moisture content reduced by heating advances beyond the obstructive walls 11. By the obstructive walls 11, mixing of particulate hydrous gels having different moisture contents within the rotary container 10 is avoided, so that piston flowability improves. Accordingly, high-quality dried particles adjusted to a predetermined moisture content is obtained. The dried particles is taken out through the takeout port 40.

As described above, none of the multiple heating tubes 12 is in contact with the inner peripheral surface of the rotary container 10 in the axial direction. As shown in FIG. 3, the heating tubes 12 are not in contact with the inner peripheral surface of the rotary container 10, and are provided near the inner peripheral surface of the rotary container 10 (at positions outward by preferably 50 to 99% and more preferably 60 to 95% of the radius of the rotary container 10) when being seen from the center (rotation axis) of the rotary container 10. The plurality of heating tubes 12 and the particulate hydrous gel efficiently contact with each other. The particulate hydrous gel is stirred not only by rotation of the rotary container 10 but also by rotation of the heating tubes 12 that are synchronous with the rotation of the rotary container 10, and is heated by indirect heat transfer from the heating tubes 12 at the same time, whereby drying of the particulate hydrous gel proceeds. The rotary container 10 may have another heating mechanism, but the inner surface of the rotary container 10 is heated by radiant heat from the heating tubes 12 or heat transferred from the particulate hydrous gel to be dried, or also a heated gas in the case of introducing this gas.

In the drying device according to the present invention, a heat medium having the aforementioned temperature (preferably not lower than 150° C.) is preferably introduced into the heating tubes 12. From the viewpoint of reduction in adhesion during drying, the inner surface of the rotary container 10 (which is a cylindrical portion in the case of a cylindrical container and is the inner surface in the axial direction of the rotary container 10) and a portion near the inner surface are more preferably also heated to a predetermined temperature by radiant heat from the heating tubes 12, or by a heated gas in some cases. The temperature of the inner surface of the rotary container 10 is preferably not lower than 150° C., more preferably not lower than 160° C., further preferably not lower than 170° C., and particularly preferably not lower than 180° C., The upper limit of the temperature of the inner surface of the rotary container 10 is normally equal to the temperature of the heating tubes 12. The temperature of the inner surface of the rotary container 10 is measured, for example, by one or more contact thermometers provided to the rotary heating device 2 for material temperature measurement. Preferably, the contact thermometers are provided near the inner surface of the rotary container 10 and the heating tubes 12 and at positions where the contact thermometers are not directly in contact with the heating tubes 12 and the rotary container 10. Accordingly, the temperature of the inner surface of the rotary container 10 (and the portion near the inner surface) before the particulate hydrous gel is put into the rotary container 10, and the material temperature after the particulate hydrous gel is put into the rotary container 10 can be measured as appropriate.

Furthermore, also in the case of introducing a gas into the rotary container 10, the inner surface of the rotary container 10 is heated to the aforementioned temperature mainly by radiant heat from the heating tubes 12. From this viewpoint, the temperature of the gas is preferably not lower than 100° C. and more preferably not lower than 120° C., The temperature of the inner surface of the rotary container 10 is preferably higher than the temperature of the gas by +10° C. or higher, further preferably +20° C. or higher, and particularly preferably +30° C. or higher.

Moreover, before the particulate hydrous gel is put into the rotary container 10, the temperature of the inner surface of the rotary container 10 is preferably heated to a temperature within the above range (preferably not lower than 150° C.). Accordingly, adhesion of the particulate hydrous gel to the inner surface of the rotary container 10 and the heating tubes 12 is reduced, and a reduction in drying efficiency caused by adhesion to the heating tubes 12 is also avoided. Thus, such heating is preferable. That is, in the drying method according to the present invention, before the particulate hydrous gel is put inside, at the start of drying, the inner surface of the rotary container 10 is preferably heated to the predetermined temperature or higher. More preferably, the heating tubes 12 and the inner surface of the rotary container 10 are heated to the aforementioned temperature or higher. The above phenomenon is observed during stirring drying of a particulate hydrous gel (particularly, a particulate hydrous gel having a high moisture content), and it is necessary to take into consideration the temperature of the inner surface of the rotary container 10 during drying of the particulate hydrous gel, particularly, at start of drying (Start-up). Meanwhile, for water-absorbent resin powder after drying or another material (inorganic powder or organic powder), it is possible to perform continuous drying without heating the inner surface of the rotary container 10 before an object to be dried is put inside. For example, in the case of additionally drying a water-absorbent resin after drying, it is not necessary to particularly take into consideration the temperature of the inner surface of the rotary container 10 before a material is put inside.

In the heating device 2, an additive 48 is preferably added to the particulate hydrous gel through the nozzle 36 of the pipe 26. The added additive 48 and the particulate hydrous gel are stirred by rotation of the rotary container 10.

The heating device 2 is configured such that the additive 48 is added to the particulate hydrous gel during heating and/or stirring at least once. The heating device 2 may be configured such that the additive 48 is added to an additive containing particulate hydrous gel during heating and/or stirring at least once.

The heating device 2 may be configured such that the additive 48 is continuously added through the nozzle 36 of the pipe 26, or may be configured such that the additive 48 is intermittently added a plurality of times. The heating device 2 may have a plurality of pipes 26 having different lengths. The plurality of pipes 26 allow the additive 48 to be added to the particulate hydrous gel at a plurality of locations that are different in the axial direction of the rotary container 10.

As long as the objects of the present invention are achieved, an adding means for adding the additive 48 to the particulate hydrous gel is not particularly limited. For example, publicly known adding means such as one or two or more orifices or nozzles and the like can be used. Specifically, examples of the adding means include: cylindrical nozzles such as a needle and the like; an orifice plate obtained by providing multiple holes in a plate; one-fluid sprays such as a swirl injection valve, a fine spray nozzle, a collision type injection valve, and the like; two-fluid sprays; multi-fluid sprays of three or more fluids; and spraying devices including centrifugal atomizers such as a rotary wheel and the like; and the like. The adding means may have a cooling mechanism, in the case where the thermal stability of the additive 48 is poor, alternation of the additive is inhibited by the cooling mechanism, and thus stable addition is achieved.

In the production method according to the present invention, the number, the arrangement, and the shapes of the obstructive walls 11 (also referred to as partition plates) included in the heating device 2, and the number of openings in each obstructive wall 11 are not particularly limited, and the shape of each obstructive wall 11 is selected as appropriate from a donut shape, a semi-donut shape, a ⅓ to ¹⁄₁₀ donut shape, a semi-circular shape (½ circle shape), a ⅓ to ¹⁄₁₀ circle shape, a crescent shape, and the like in accordance with a particulate hydrous gel to be supplied to the heating device 2 and the physical properties of dried particles to be obtained. Typically, obstructive walls 11 each having a donut shape can be used, but the obstructive walls 11 are not particularly limited thereto. The number of openings in each obstructive wall 11 only needs to be one or more. In the case where each obstructive wall 11 has a plurality of openings, the sizes of the openings may be the same or different from each other. A preferable opening ratio will be described later. The obstructive walls 11 may be provided so as to be perpendicular to a cross-section of the rotary container 10, or may be inclined relative thereto.

Figure 5:
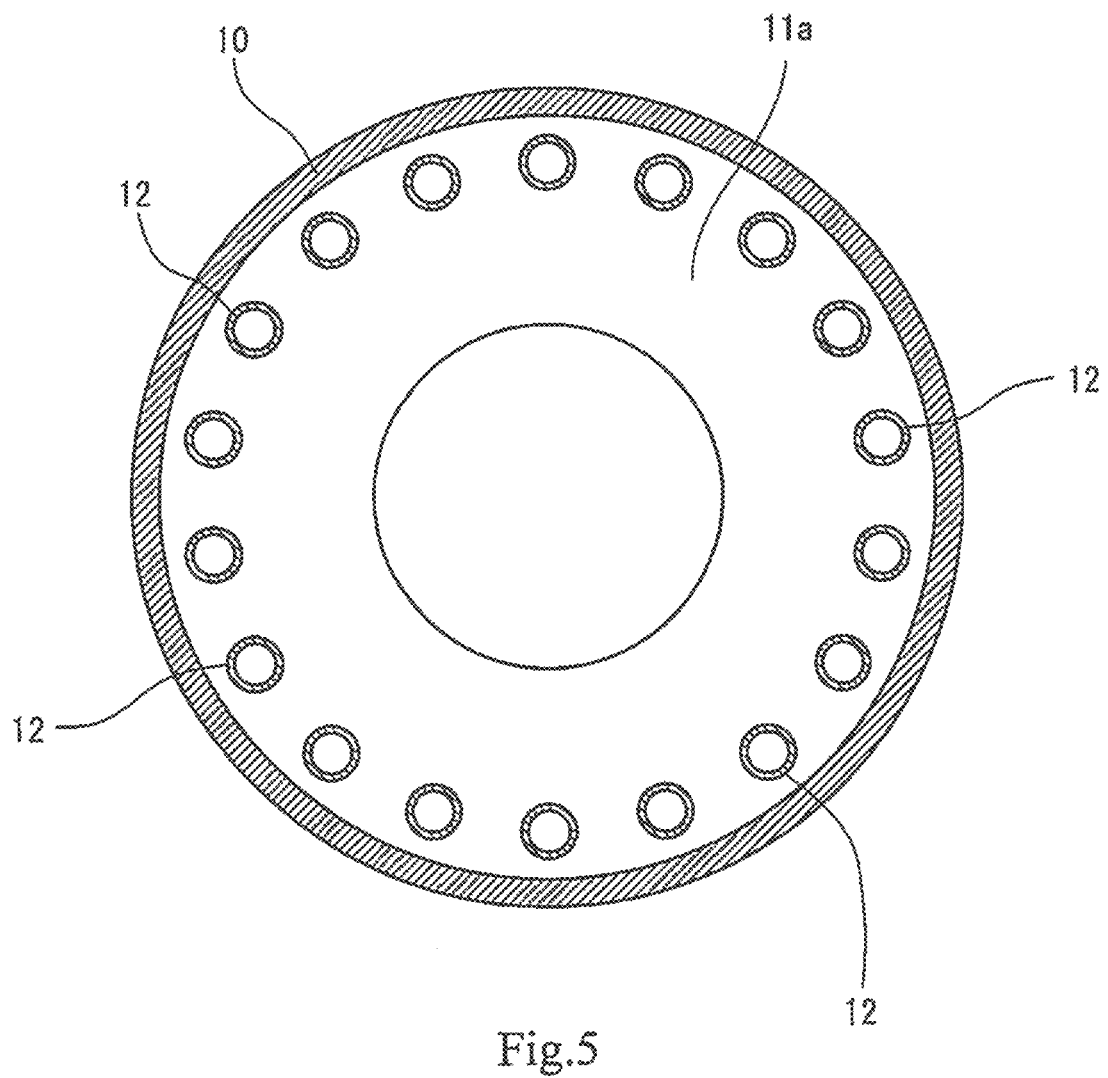
FIG. 5 shows an example of a shield having an opening (opening ratio: 20%) used in the drying device (rotary heating device with heating tubes) used in the production method according to the present invention.
Figure 6:
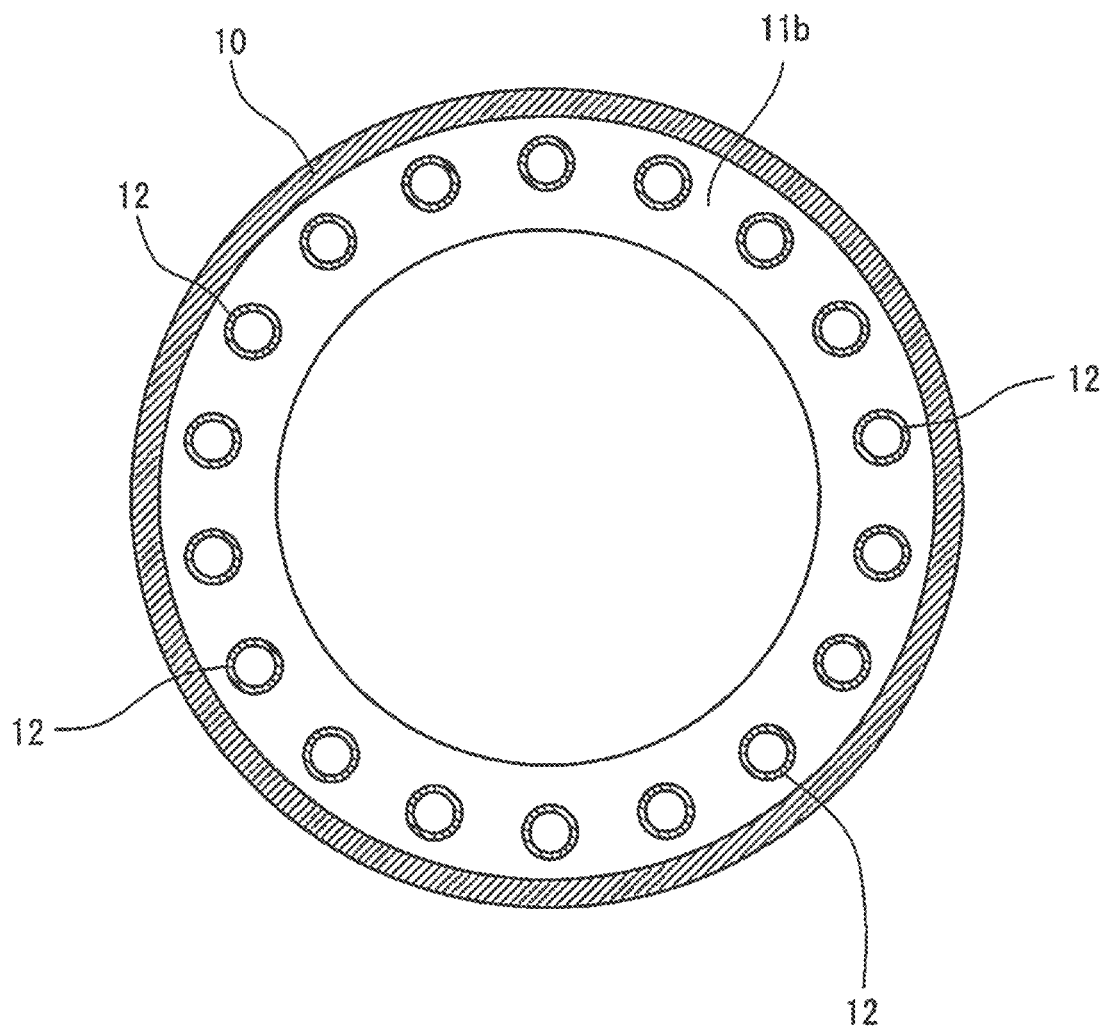
FIG. 6 shows an example of a shield having an opening (opening ratio: 50%) used in the drying device (rotary heating device with heating tubes) used in the production method according to the present invention.
Figure 7:
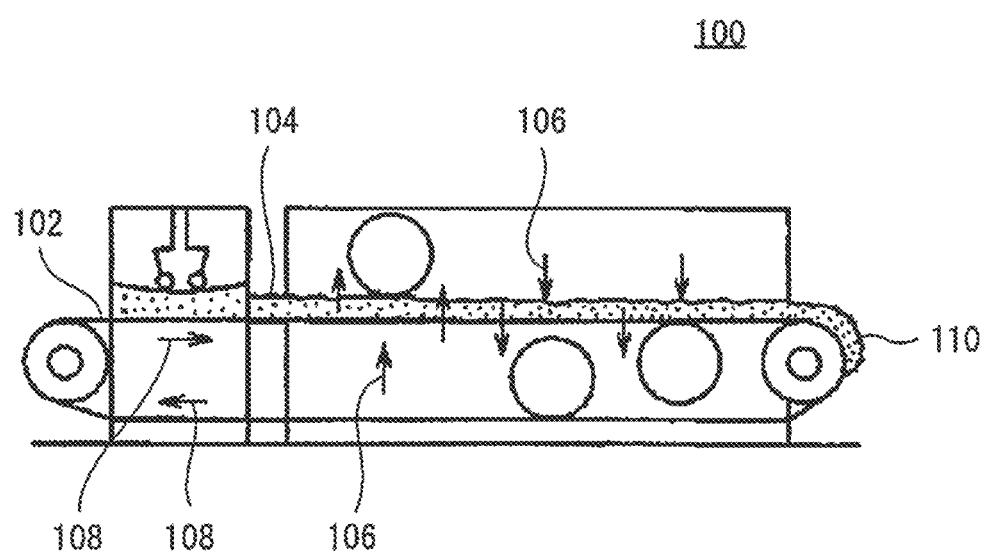
FIG. 7 is a cross-sectional view for explaining a through-flow band drying machine as conventional art.

The shapes of typical obstructive walls 11 are shown in FIGS. 5 and 6. An obstructive wall lie in FIG. 5 and an obstructive wall 11*b* in FIG. 6 are each a donut-shaped, partition plate that is provided so as to be orthogonal to the axial direction of the cylindrical rotary container 10 and has an opening in a substantially center portion.

The opening ratio of each obstructive wall 11 (the ratio of the opening in the obstructive wall 11 with respect to the cross-sectional area perpendicular to the axial direction of the rotary container 10) is determined as appropriate regardless of the shape of the obstructive wall 11, but is normally 1 to 90%, preferably 2 to 50%, more preferably 5 to 45%, and further preferably 10 to 40%, If the opening ratio is greater than the aforementioned range, the effect exhibited by the obstructive wall 11 is low. If the opening ratio is less than the aforementioned range, a discharge failure may occur. The opening ratio of the obstructive wall 11a in FIG. 5 is 20%, and the opening ratio of the obstructive wall 11b in FIG. 6 is 50%.

From the viewpoint of drying efficiency and piston flowability, the number (n) of obstructive walls 11 is at least one, preferably not less than two, and particularly preferably not less than three. The upper limit of the number of obstructive walls 11 depends on the size of the heating device 2, but the number of obstructive walls 11 is preferably not greater than 20 and more preferably not greater than 10.

The obstructive walls 11 provided in the rotary container 10 may be fixed or may be adjustable (movable), but the positions at which the obstructive walls 11 are provided are determined as appropriate on the basis of a target drying curve (temperature or solid content rate with respect to drying time). For example, an obstructive wall 11 exhibits a small effect in case that the obstructive wall 11 is provided at a place where the solid content rate of the particulate hydrous gel is low. Thus, one or more obstructive walls 11 is provided at a place where the solid content rate of the particulate hydrous gel is normally not less than 50% by mass, preferably not less than 60% by mass, more preferably not less than 70% by mass, and further preferably 80 to 95% by mass. For example, the interior of the rotary container 10 is divided into a gel region where the moisture content is high and a dry region where the moisture content is low, along the advancement direction of the particulate hydrous gel by provision of at least one obstructive wall 11, and further into an intermediate region therebetween by increasing the number of obstructive walls 11 when necessary. In addition, the interior of the rotary container 10 is divided into a remaining heat section, a fixed rate drying section (also referred to as a constant rate drying section), and a reduced rate drying section in accordance with the temperature of the object to be dried, and further into an intermediate section therebetween by increasing the number of obstructive walls 11 when necessary. Accordingly, more efficient drying can be performed, and surface-crosslinking that is carried out simultaneously with drying as necessary can be also efficiently carried out.

(Heating)

Figure 4:
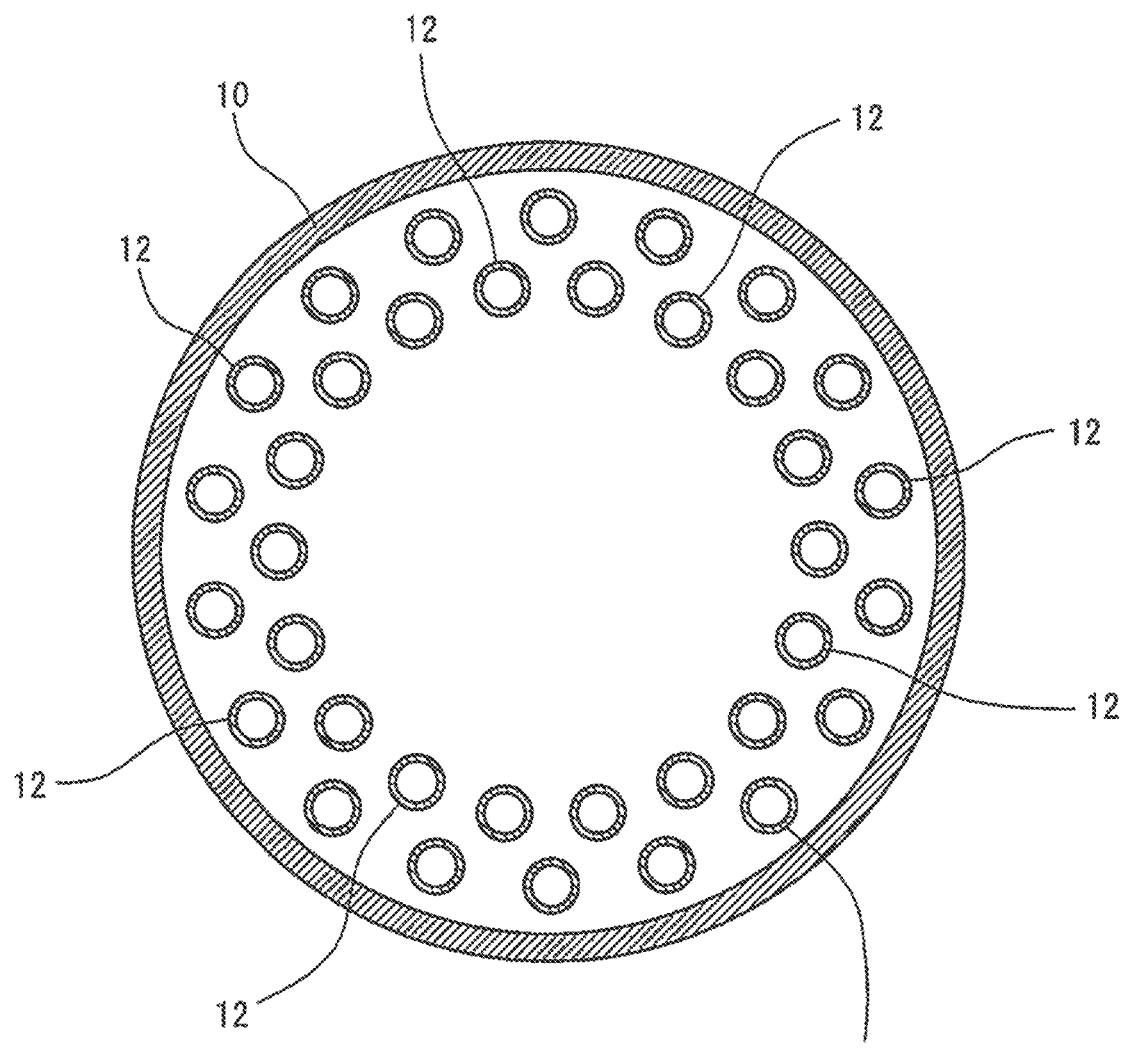
FIG. 4 is a cross-sectional view for explaining a drying device (rotary heating device with heating tubes in two layers) used in the production method according to the present invention.

In the production method according to the present invention, the arrangement of the heating tubes 12 included in the heating device 2 is not particularly limited, and is set as appropriate in accordance with the amount of a water-absorbing agent to be produced. As shown in FIG. 3, the plurality of heating tubes 12 may be arranged on the circumference of a circle centered on the rotation axis of the rotary container 10, so as to be spaced apart from each other, or may be arranged on two or more (multiple) concentric circles centered on the rotation axis of the rotary container 10, so as to be spaced apart from each other, as shown in FIG. 4. In addition, the plurality of heating tubes 12 may be arranged radially from the rotation axis of the rotary container 10 toward the outer side in the radial direction so as to be spaced apart from each other. In the case of arranging the plurality of heating tubes 12 in multiple layers along a circumference, the number of layers is selected in accordance with the purpose, but the heating tubes 12 are arranged preferably in 2 to 10 layers, more preferably in 2 to 8 layers, and further preferably in 2 to 5 layers. When the heating tubes 12 are arranged in multiple layers, a wider heat transfer surface is provided, and thus it is possible to perform more efficient drying of a particulate hydrous gel.

In the production method according to the present invention, the number and the radii (diameters) of the heating tubes 12 included in the heating device 2 are also not particularly limited. From the viewpoint of drying efficiency, the number of the heating tubes 12 is determined as appropriate on the basis of the size or the processing amount of the heating device 2, but is preferably not less than 5, more preferably not less than 10, much more preferably not less than 15, further preferably not less than 20, and particularly preferably not less than 100. The upper limit of the number of the heating tubes 12 is not particularly limited, but 2000 or less and further 1000 or less are selected as appropriate. The area of a heating surface that is in contact with a material in indirect heating is increased by the multiple heating tubes 12, which is preferable.

In the production method according to the present invention, for efficiently transferring heat from the heat medium to an object to be dried, a heating device having a large heat transfer area with respect to an internal capacity thereof is preferably used. The term "heat transfer area with respect to the internal capacity" means a ratio defined as (heat transfer area/effective capacity) (unit: $m^{-1}$). The efficiency of heat transfer improves when the ratio is a higher value. As a result, the rate of temperature rise of the object to be dried increases, thus the drying time becomes shortened, and the productivity improves. The ratio is set as appropriate on the basis of the specifications and the type of the heating device to be used, the shape of the object to be dried, and the like, but is preferably not less than 10 $m^{-1}$, more preferably not less than 12 $m^{-1}$, and further preferably not less than 15 $m^{-1}$. The effective capacity is the capacity of a drying chamber (that is, the rotary container 10) in which the object to be dried is to be contained, and the heat transfer area means the area of a heating surface that can provide heat to contents contained in the drying chamber. For example, in the case of the rotary heating device 2 with heating tubes, the sum of the areas of the outer surfaces of the plurality of heating tubes 12 and the area of the inner surface of the rotary container 10 is defined as the heat transfer area.

The heat medium is not particularly limited as long as the objects of the present invention are achieved. However, from the viewpoint of drying efficiency, in the case where the heat medium is steam, steam having a pressure within the above range (preferably not lower than 150° C. (not less than about 0.49 MPa)) is preferably passed through the plurality of heating tubes 12. Here, the vapor pressures of the steam passed through the respective heating tubes 12 may be equal or may be different from each other, but is normally equal. In the case where the vapor pressures are different, the pressure is specified as the average thereof (for example, an average vapor pressure).

In the heating device 2, the inner surface of the rotary container 10 is heated by radiant heat from the heating tubes 12 or heat transfer from the object to be dried. From the viewpoint of preventing adhesion or aggregation of the particulate hydrous gel, the heating device 2 further includes, preferably, a heating means or a thermal insulating means, and more preferably a heating means, on the outer peripheral surface of the rotary container 10. An example of the thermal insulating means is a method in which a part or the entirety of the outer peripheral surface of the rotary container 10 (preferably not less than 50%, more preferably not less than 80%, and particularly preferably the entirety of the outer peripheral surface of the rotary container 10) is covered with a thermal insulator. In addition, examples of the heating means include an electric trace, a steam trace, a jacket heated by a heat medium, and the like. In the drying method according to the present invention, from the viewpoint of reduction in adhesion of a hydrous gel, not only the temperature of the heating tubes 12 but also control of the temperature of the inner surface of the rotary container 10 is important during drying of the particulate hydrous gel (particularly, at the start of drying, Start-up). The heating means or the thermal insulating means provided on the outer surface of the rotary container 10 is effective for control of the temperature of the inner surface of the rotary container 10.

(Quantity of Production)

In the production method according to the present invention, by using the heating device having a basic configuration shown in FIGS. 1 and 2 in the drying step, it is possible to perform continuous drying with the processing amount (kg/hr) per unit time in terms of solid content of a particulate crosslinked hydrogel polymer being not less than 7 kg/hr, preferably not less than 50 Kg/hr, more preferably not less than 100 Kg/hr, and particularly preferably not less than 500 Kg/hr. The continuous drying time is preferably not shorter than 12 hours, more preferably not shorter than 24 hours, further preferably not shorter than 240 hours, and particularly preferably not shorter than 1200 hours (Additive)

Examples of the additive 48 to be added to the particulate hydrous gel include not only the aforementioned gel fluidizer and polymer lubricant but also a surface-crosslinking agent described later. Unless the advantageous effects of the present invention are impaired, another additive 48 may be added to the particulate hydrous gel. By adding the surface-cross/inking agent before drying and further during drying, adhesion during drying can be also reduced, and a general surface-crosslinking effect (for example, improvement of fluid retention capacity under load) after drying is further exhibited. Thus, a surface-crosslinking step after drying can be also omitted, (Drying Device According to Present Invention)

The drying device and the drying method according to the present invention are as described above, but the drying device more preferably has the following structure in order to solve the problem of the present invention.

The drying device according to the present invention is a drying device for a particulate crosslinked hydrogel polymer obtained from a monomer that is a material of a water-absorbent resin, and is a rotary heating device including: a rotary container that contains the particulate crosslinked hydrogel polymer therein and rotates; a plurality of heating tubes that are located within the rotary container, extend in the axial direction of the rotary container, and rotate together with the rotary container; and a means for introducing and discharging a gas into and from the rotary container. In the drying device, the number of the heating tubes is not less than 5, the heating tubes are not in contact with the inner peripheral surface of the rotary container in the axial direction, and a heating means or a thermal insulating means is provided on the outer peripheral surface of the rotary container. The plurality of heating tubes are preferably arranged on a concentric circle or radially from the rotation axis of the rotary container toward the outer side in the radial direction so as to be spaced apart from each other. A preferable number and arrangement of the heating tubes are as described above.

In the drying device, the rotary container is more preferably inclined from one end thereof toward the other end thereof. In the drying device, at least one obstructive wall is further preferably provided within the rotary container. The opening ratio of each obstructive wall is preferably 1 to 90%. A preferable form of each obstructive wall is as described above.

In the drying device, the ratio (heat transfer area/effective capacity) is preferably not less than 10 m$^{-1}$. More preferable heat transfer area/effective capacity is as described above. The drying device preferably has, within the rotary container, one or more adding means for adding the additive to the particulate crosslinked hydrogel polymer contained in the rotary container. A preferable adding means is a spraying device. A preferable additive and a preferable number of adding means are as described above. In the drying device, the plurality of heating tubes are preferably arranged radially from the rotation axis of the rotary container toward the outer side in the radial direction so as to be spaced apart from each other. In addition, the plurality of heating tubes are preferably arranged on two or more concentric circles centered on the rotation axis of the rotary container, so as to be spaced apart from each other.

(Drying Method and Drying Start Method According to Present Invention)

The drying device and the drying method according to the present invention are as described above, but the drying method is more preferably as described below, in order to solve the problem of the present invention. The drying method can be used for not only continuous drying but also batch type drying (particularly, repeated batch type drying), and can, be also used for not only a particulate crosslinked hydrogel subjected to gel-crushing but also a particulate crosslinked hydrogel polymer of a water-absorbent resin obtained without gel crushing, typically, a particulate crosslinked hydrogel polymer of a water-absorbent resin obtained through reverse phase suspension polymerization, droplet polymerization in vapor phase, or spray polymerization.

In other words, in order to solve the problem of the present invention, the drying method according to the present invention can be used preferably for the following drying method, particularly, a drying start method (Start-up method for drying), for a particulate crosslinked hydrogel polymer.

In order to solve the problem of the present invention, the drying method (particularly, the drying start method) according to the present invention is preferably a drying method in which a particulate crosslinked hydrogel polymer obtained from a monomer that is a material of a water-absorbent resin is dried by using the aforementioned drying device, thereby obtaining dried particles. This drying method is a drying method, in which a gas is introduced as a heat medium into the rotary container, and the gel temperature of the particulate crosslinked hydrogel polymer to be put into the drying device is not lower than 50° C. and the temperature of the inner surface of the rotary container is not lower than 150° C., and is a drying start method.

In the present invention, the drying method means the entirety of drying (the start to the end of continuous or batch type drying, in repeated batch type drying, the start to the end of the drying), and the drying start method means the earliest period, that is, Start-up of drying. In continuous or batch type drying, it has been found that not only the temperature of the heating tubes but also the temperature of the inner peripheral surface of the rotary container that is not in contact with the heating tubes is important for continuous drying or repeated batch type drying.

In the drying method according to the present invention, by heating not only the heating tubes for drying the particulate hydrous gel by conductive heat transfer but also the inner surface of the rotary container to a predetermined temperature in advance, adhesion of the particulate hydrous gel to the inner surface of the rotary container or the heating tubes is reduced. Thus, it has been found that: it is not necessary to perform periodical removal of adhered material in a short period; and continuous operation over a long period of time (continuous drying, or, in the case of batch type drying, repeated drying after dried material is taken out is possible. Patent Literature 22 to 28 and 31 disclose stirring drying of a particulate hydrous gel but the stirring drying is not sufficient in a sense of continuous operation, and Patent Literature 22 to 28 and 31 do not state that not only the temperature of a heat medium (the temperature of heating tubes) but also the temperature of the inner surface of a drying machine is important for continuous operation.

In the drying method (further the drying start method), the temperature of the heating tubes and the inner surface of the rotary container are preferably increased to 150° C. or higher before the particulate crosslinked hydrogel polymer is put inside. The temperatures are preferably increased to 180° C. or higher. The temperatures are more preferably increased to 200° C. or higher. Preferably, a gas is introduced as a heat medium into the rotary container, and the temperature of the gas is lower than the temperature of the inner surface of the rotary container.

The drying method according to the present invention may be a batch type or may be a continuous type. In the case of a batch type, drying is repeatedly performed under the substantially same conditions, and the number of repeats is preferably not less than 5 times, more preferably not less than 10 times, and further preferably not less than 100 times. The drying method is more preferably a continuous type. Here, a repeat by a batch type refers to an operation in which, after discharge of dried particles, the next particulate hydrous gel is put into the drying device within a certain time including a time taken to put the particulate hydrous gel into the drying device (for example, within one hour, preferably within 10 minutes) and drying is performed. In addition, the same drying device can be used as a continuous drying machine by continuous input and continuous discharge of the object to be, dried (particulate hydrous gel), and even with the same drying device, batch type drying can be also performed by putting the object to be dried (particulate hydrous gel) into the drying device at once, and then discharging the object at once after a certain time.

The particulate crosslinked hydrogel polymer to be put into the drying device preferably contains a gel fluidizer. The mass-average particle diameter of the particulate crosslinked hydrogel polymer is preferably not greater than 800 μm, and more preferably within the aforementioned range.

The temperature of the gas to be introduced into the rotary container is preferably not less than 100° C., and more preferably within the aforementioned range.

Preferably, the drying device has an adding means within the rotary container, and an additive is added to the particulate crosslinked hydrogel polymer by using the adding means. The additive is preferably a surface-crosslinking agent. The surface crosslinking agent is preferably added to the particulate crosslinked hydrogel polymer having a moisture content of 1 to 50% by mass.

The difference between the pressure of the interior of the rotary container and the atmospheric pressure (the degree of pressure reduction) is preferably greater than 0 kPa and not greater than 5 kPa. The Froude number of the rotary container is preferably 0.001 to 1. The amount of the gas to be introduced into the rotary container with respect to the processing amount per unit time (kg/hr) in terms of solid content of the particulate crosslinked hydrogel polymer is preferably is 0.05 Nm$^3$/kg to 20 Nm$^3$/kg, and more preferably within the aforementioned range.

(Gel Temperature)

In the production method according to the present invention, the temperature of the particulate hydrous gel to be subjected to the drying step (hereinafter, referred to as gel temperature) is not lower than 50° C. The gel temperature is measured by the aforementioned contact thermometer provided to the heating device. Examples of the contact thermometer are thermocouples, platinum temperature-sensing elements, and bimetal thermometers, and are particularly thermocouples (for example, a K-type sheathed thermocouple). Typically, the gel temperature is measured at a center portion of a material layer (particulate hydrous gel or dried particles) (for example, at a position of about 5 cm in the case where the thickness of the material is 10 cm). From the viewpoint of the fluidity of the particulate hydrous gel within the heating device, the gel temperature is preferably not lower than 60° C., more preferably not lower than 70° C., further preferably not lower than 80° C., and particularly preferably not lower than 90° C. When the temperature is excessively high, coloring or performance decrease of the object to be dried is observed in some cases. Thus, the gel temperature is preferably not higher than 130° C., more preferably not higher than 110° C., and further preferably not higher than 105° C. The temperature may be adjusted by the temperature of the hydrous gel after polymerization (the temperature of the hydrous gel when the hydrous gel is discharged from the polymerization device) or by heating, temperature keeping, or reaction heat in each step after polymerization (for example, heat of neutralization after polymerization, grinding energy or heating during gel-crushing), and may be adjusted by a heating step provided additionally before the drying step. In the case where a gel fluidizer is added in the aforementioned gel-crushing step, the gel temperature is adjusted to a predetermined temperature before the drying step.

In a conventional through-flow band drying machine, it is not necessary to cause a particulate hydrous gel to flow within the drying machine, and dried material becomes unified into a block form on a belt and is mechanically separated from the belt. Thus, no difference in adhesion to the belt due to influence of the gel temperature is observed. In addition, Patent Literature 22 to 28 and 31, which disclose stirring drying machines, do not mention the influence of the gel temperature. The present inventors have focused on the fact that, in order to cause a particulate hydrous gel to flow, particularly, constantly flow, within a heating device, the gel temperature of the particulate hydrous gel when the particulate hydrous gel is put into the heating device is very important, and have achieved continuous drying of the particulate hydrous gel in the production method according to the present invention.

(Gel Moisture Content)

The moisture content of the particulate hydrous gel to be subjected to the drying step (hereinafter, referred to as gel moisture content) is obtained by a measurement method described in Examples below. From the viewpoint of the fluidity of the particulate hydrous gel, the gel moisture content is preferably not less than 25% by mass, more preferably not less than 30% by mass, further preferably not less than 35% by mass, even further preferably not less than 40% by mass, and particularly preferably not less than 43% by mass. Excessive high-concentration polymerization may decrease the physical properties of the water-absorbent resin. From the viewpoint of drying efficiency and absorption performance, the gel moisture content is preferably not greater than 75% by mass, more preferably not greater than 60% by mass, and particularly preferably not greater than 55% by mass.

(Particle Size of Particulate Hydrous Gel)

Regarding the mass-average particle diameter of the particulate hydrous gel before drying (hereinafter, referred to as gel particle diameter), the particle diameter after the drying step or a heat treatment step is preferably substantially equal to the particle diameter of a water-absorbing agent that is a final product. For example, a gel particle diameter d1 in the case of being used for a sanitary material for a disposable diaper or the like, in terms of solid content, is preferably not greater than 800 µm, more preferably not greater than 500 µm, further preferably 50 µm to 500 µm, even further preferably 100 µm to 400 µm, particularly preferably 100 to 300 µm, and extremely preferably 100 to 200 µm. By setting the gel particle diameter d1 within the above range, an advantage is obtained that the water absorption speed of obtained dried particles also improves and furthermore the fluidity of the particulate hydrous gel within the device improves, resulting in improvement of drying efficiency. That is, the drying step in the present invention is used for drying of a particulate hydrous gel having a small particle diameter, particularly, for drying and granulation thereof.

Regarding the particle size of the particulate hydrous gel, although depending on the moisture content, particles having a particle size within a range of not greater than 150 µm, in terms of solid content, are preferably not less than 10% by mass, more preferably not less than 25% by mass, and further preferably not less than 40% by mass. In addition, particles having a particle size within a range of less than 1100 µm, in terms of solid content, are preferably not less than 80% by mass, more preferably not less than 85% by mass, further preferably not less than 90% by mass, and particularly preferably not less than 95% by mass, and the upper limit thereof is 100% by mass. Furthermore, particles having a particle size within a range of less than 850 µm, in terms of solid content, are preferably within the above range.

From the viewpoint of improvement of water absorption speed and reduction of fine powder, a particulate hydrous gel having a gel particle diameter much smaller than that selected in the conventional art is preferably put inside at the time of drying, more preferably granulated while being dried, and further preferably granulated to a particle diameter within a later-described range. A conventional through-flow band drying machine has a problem that, when a particulate hydrous gel is put into the through-flow band drying machine, dried material falls from a perforated metal or a metal mesh, which is a drying belt, or the perforated metal or the metal mesh becomes clogged with the dried material. These problems are more significant in case of drying of a particulate hydrous gel having a small particle diameter. On the other hand, in the drying step in the present invention, occurrence of such problems is avoided even when a particulate hydrous gel having a small particle diameter is subjected to the drying step.

(Physical Properties of Particulate Hydrous Gel)

The CRC (centrifuge retention capacity) of the particulate hydrous gel before drying, in terms of dry weight, is preferably 5 g/g to 80 g/g, more preferably 10 g/g to 50 g/g, further preferably 15 g/g to 45 g/g, and particularly preferably 20 g/g to 40 g/g. The water-soluble content (Ext) of the particulate hydrous gel before drying, in terms of dry weight, is preferably not greater than 20% by mass, more preferably not greater than 15% by mass, further preferably not greater than 10% by mass, and particularly preferably not greater than 5% by mass. When the CRC or the soluble content of the particulate hydrous gel is high, aggregation or adhesion of the particulate hydrous gel may proceed due to stirring during drying. Therefore, the fluid retention capacity and the soluble content of the particulate hydrous gel before drying are preferably lower. For example, an embodiment, in which the soluble content and the fluid retention capacity of obtained dried particles are improved by putting a particulate hydrous gel having a relatively low fluid retention capacity and a low soluble content into a heating device and heating the particulate hydrous gel at a sufficiently high temperature (preferably not lower than 150° C., more preferably not lower than 180° C.) for a predetermined time (preferably, for 10 minutes or longer at a predetermined temperature), is preferable. An example of the method for increasing the fluid retention capacity and the soluble content by drying as described above is use of the internal crosslinking agent having a polyalkylene unit.

(Polymerization Ratio of Particulate Hydrous Gel)

The polymerization ratio of the particulate hydrous gel, before drying, that is subjected to the drying step, in terms of dry weight, is preferably not less than 90% by mass, more preferably not less than 95% by mass, further preferably 98 to 99.99% by mass, and ideally 100%. When the polymerization ratio is low, a problem of aggregation or adhesion arises during drying. Hitherto, for improving productivity, a technique to take out a product having a polymerization ratio not greater than 90% from a polymerization device and dry the product has been also known (for example, WO2006/103227). However, the present inventors have found that the polymerization ratio is important for drying a particulate hydrous gel by a rotary heating device.

(Physical Properties of Dried Particles)

The water-soluble content (Ext) of the dried particles obtained after drying is preferably larger than the water-soluble content of the particulate hydrous gel before drying. The crosslinking density of the hydrous gel (particularly, the type and the amount of the internal crosslinking agent), the conditions for heating drying, etc., are adjusted such that the water-soluble content of the dried particles obtained after drying, in terms of dry weight, is increased by preferably +0.5% by mass or greater, more preferably +1 to 20% by mass, and further preferably +2 to 10% by mass.

By increasing the Ext of the dried particles from that of the particulate hydrous gel, the fluid retention capacity after drying is improved. And also, adhesion or aggregation during drying can be prevented, and thus such, increasing is preferable. The water-soluble content of the obtained water-absorbent resin powder is preferably not greater than 50% by mass, more preferably not greater than 25% by mass, further preferably not greater than 20% by mass, and particularly preferably not greater than 15% by mass.

[2-5] Surface-Crosslinking Step

This step is a step of adding a surface-crosslinking agent that reacts with a functional group (particularly, a carboxyl group) of a water-absorbent resin (particularly, a carboxyl group), to the hydrous gel after polymerization or to dried material thereof and causing a crosslinking reaction. By the crosslinking reaction, the surfaces of water-absorbent resin particles are mainly initially crosslinked. Surface-crosslinking is also referred to as post-crosslinking or secondary crosslinking. In the production method according to the present invention, in this step, a surface-crosslinking agent is added to a particulate hydrous gel and/or dried particles (hereinafter, sometimes collectively referred to as a water-absorbent resin) and reaction is caused. This step has a surface-crosslinking agent adding step and a heat treatment step, and may have a cooling step after the heat treatment step as necessary.

[2-5-1] Surface-Crosslinking Agent Adding Step

This step is a step of adding a surface-crosslinking agent to a particulate hydrous gel and/or dried particles. The surface-crosslinking agent is added to a particulate hydrous gel before or during drying, or to dried particles after drying, and further to dried particles after sizing.

(Moisture Content of Water-Absorbent Resin)

The term "moisture content" of the water-absorbent resin is a value obtained by a measurement method described in Examples below. The "moisture content" of the water-absorbing agent is only different in measurement conditions and is the same in theoretical idea as the "moisture content" of the water-absorbent resin.

In the case where the dried particles obtained in the drying step is subjected to the surface crosslinking step, that is, in the case where the surface-crosslinking step is performed after the drying step, the solid content rate of the dried particles at the time of addition of the surface-crosslinking agent is within the above range for the solid content rate of the dried particles after drying, preferably not less than 80% by mass, more preferably 85% by mass to 99.8% by mass, further preferably 90% by mass to 99.7% by mass, even further preferably 92% by mass to 99.5% by mass, particularly preferably 96% by mass to 99.5% by mass, and extremely preferably 98 to 99.5% by mass.

Figure 8:
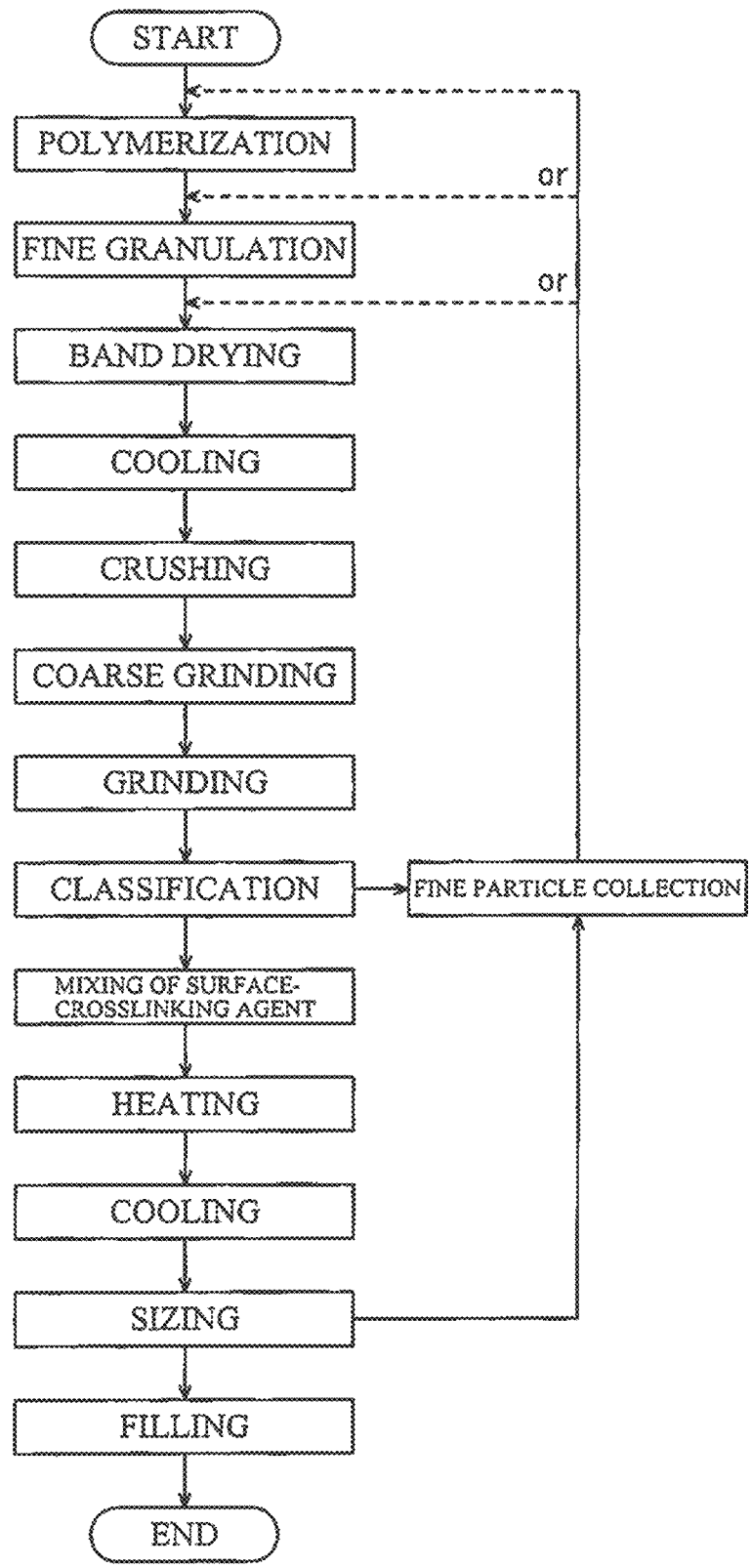
FIG. 8 is a flowchart showing a conventional and typical production process for a water-absorbent resin.

In the case where the particulate hydrous gel obtained in the gel-crushing step is subjected to the surface-crosslinking step during drying, the moisture content of the particulate hydrous gel at the time of addition of the surface-crosslinking agent is within a range of preferably 10 to 50% by mass, more preferably 15 to 45% by mass, and further preferably 20 to 40% by mass. By adding the surface-crosslinking agent within the range, excessive aggregation or adhesion during drying is reduced. Furthermore, an effect of improvement in the fluid retention capacity under load that is obtained by performing the surface-crosslinking step after the drying step is also exhibited when surface-crosslinking is carried out simultaneously with drying, and thus such surface-crosslinking is preferable. In the case of carrying out surface-crosslinking simultaneously with drying as described above, a surface-crosslinking step and a sizing step after a drying step that are required in a conventional production method (for example, FIG. 8) can be omitted, and thus the production process can be significantly simplified. Moreover, generation of fine Powder or destruction of a surface crosslinked structure caused by process damage to the water-absorbent resin in an additionally required, surface-crosslinking step or transport step, also does not substantially occur, and thus such surface-crosslinking is preferable.

The temperature of the water-absorbent resin to be subjected to the surface-crosslinking step after the drying step, that is, the temperature of the dried particles at the time of addition of the surface-crosslinking agent, is preferably 40 to 120° C. and more preferably 60 to 100° C. In the case of carrying out surface-crosslinking simultaneously with drying, the temperature of the water-absorbent resin during drying, that is, the temperature of the particulate hydrous gel at the time of addition of the surface-crosslinking agent, is within a range of preferably 70 to 150° C. and more preferably 80 to 130° C. The temperature is measured by a contact thermometer in the same manner as for the aforementioned gel temperature in the drying step. The temperature may be adjusted by a heating means or a thermal insulating means as necessary.

The advantageous effects of the present invention become more significant by subjecting a water-absorbent resin having a moisture content and a temperature within the above ranges to a later-described heat treatment step.

(Surface-Crosslinking Agent)

As the surface-crosslinking agent, a surface-crosslinking agent that can react with a plurality of functional groups of a water-absorbent resin (preferably, a plurality of carboxyl groups) is used, and a surface-crosslinking agent that can be covalently or ionically bound thereto and further can be covalently bound thereto is preferably used. Specific examples of the surface-crosslinking agent include: polyhydric alcohol compounds such as ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerin, polyglycerin, 2-butene-1,4-diol, 1,3-butanediol, 1,4-butanediol, 1,5-pentanedial, 1,6-hexanediol, 1,2-cyclohexanedimethanol, 1,2-cyclohexanol, trimethylolpropane, diethanolamine, triethanolamine, polyoxypropylene, oxyethylene-oxypropylene block copolymer, pentaerythritol, sorbitol, and the like; epoxy compounds such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol polyglycidyl ether, glycidol, sorbitol polyglycidyl ether, pentaerythritol polyglycidyl ether, trimethylolpropane polyglycidyl ether, neopentyl glycol diglycidyl ether, 1,6-hexanediol diglycidyl ether, and the like; polyvalent amine compounds such as ethylene diamine, diethylene triamine, triethylene tetramine, tetraethylene pentamine, pentaethylene hexamine, polyethyleneimine, and the like, and inorganic salts or organic salts thereof; polyvalent isocyanate compounds such as 2,4-tolylene diisocyanate, hexamethylene diisocyanate, and the like; aziridine compounds such as polyaziridine and the like; polyvalent oxazoline compounds such as 1,2-ethylenebisoxazoline, bisoxazoline, polyoxazoline, and the like; carbonic acid derivatives such as urea, thiourea, guanidine, dicyandiamide, 2-oxazolidinone, and the like; alkylene carbonate compounds such as 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxane-2-one, 4-methyl-1,3-dioxane-2-one, 4,6-dimethyl-1,3-dioxane-2-one, 1,3-dioxopan-2-one, and the like; haloepoxy compounds such as epichlorohydrin, epibromohydrin, α-methylepichlorohydrin, and the like, and polyvalent amine adducts thereof; oxetane compounds; silane coupling agents such as γ-glycidoxypropyltrimethoxysilane, γ-aminopropyltriethoxysilane, and the like; polyvalent metal compounds such as hydroxides, chlorides, sulfates, nitrates, carbonates, or the like of zinc, calcium, magnesium, aluminum, iron, zirconium, and the like; and the like. Two or more of them may be used in combination. Among the above surface-crosslinking agents, one or two or more surface-crosslinking agents selected from polyvalent metal ions, epoxy compounds, oxazoline compounds, and alkylene carbonate compounds are preferable in the case of carrying out surface-crosslinking after or during drying, and epoxy compounds are preferable in the case of carrying out surface-crosslinking during drying.

(Surface-Crosslinking Agent Solution)

The addition amount of the surface-crosslinking agent with respect to the solid content of the water-absorbent resin during or after drying is preferably not greater than 5% by mass, more preferably not greater than 3% by mass, and further preferably not greater than 2% by mass. The lower limit of the addition amount is preferably 0.001% by mass.

As the added form of the surface-crosslinking agent, the surface-crosslinking agent may be added as is. However, from the viewpoint of ease of addition, the surface-crosslinking agent is preferably dissolved in water or an organic solvent and added as a solution. The concentration of the solution is preferably not less than 1% by mass and more preferably not less than 2% by mass. The total amount of the solvent selected from water and an organic solvent, with respect to the solid content of the water-absorbent resin, is preferably 0 to 10% by mass, more preferably 0.1 to 8% by mass, and further preferably 0.5 to 5% by mass. In the case of using water and an organic solvent in combination, the water is preferably a main component.

In the case of adding the surface-crosslinking agent as an aqueous solution, the concentration of the aqueous solution can be adjusted in accordance with the moisture content of the water-absorbent resin at the time of contact with the surface-crosslinking agent, and thus addition of the surface-crosslinking agent as an aqueous solution is preferable. Specifically, an aqueous solution containing an amount of water required to set the moisture content of the water-absorbent resin to a desired value and an amount of the surface crosslinking agent required in accordance with the solid content of the water-absorbent resin, only needs to be prepared. In the case where a solution cannot be prepared since the solubility of the surface crosslinking agent in water is low, a hydrophilic solvent such as alcohol or the like is preferably added as appropriate to obtain a homogeneous solution.

(Number of Times of Addition of Surface-Crosslinking Agent)

The number of times of addition of the surface-crosslinking agent may be one or a plural number during or after drying. In the case of adding the surface-crosslinking agent two or more times, the water-absorbent resin that comes into contact with at least the surface-crosslinking agent at the first addition preferably has the above moisture content and temperature, and more preferably has the above moisture content and temperature at all points of contact.

[2-5-2] Heat Treatment Step

This step is a step of heating a water-absorbent resin containing a surface crosslinking agent, to obtain surface-crosslinked dried particles, preferably surface-cross/inked dried granulated particles.

(Surface-Crosslinking Temperature)

In this step, a water-absorbing agent is obtained by heating the water-absorbent resin containing the surface-crosslinking agent, to 100° C. or higher. A preferable maximum temperature depends on the type of the surface-crosslinking agent, but is 100 to 250° C., more preferably 120 to 230° C., and further preferably 150 to 210° C.

(Time)

The time of the heat treatment step only needs to be set as appropriate on the basis of the moisture content of the water-absorbent resin, the type of the surface-crosslinking agent, the thermal efficiency of the heating device, and the like. As a rough standard, heating only needs to be performed until the moisture content becomes 10% by mass or less, and the time is within a range of 10 to 120 minutes and preferably 30 to 90 minutes, (Heating Mode)

As long as the objects of the present invention are achieved, a heating device used in the surface-crosslinking step is not particularly limited. However, from the viewpoint that uneven heating is unlikely to occur, a device that is of a conductive heat transfer type by solid-solid contact and has a stirring mechanism (hereinafter, sometimes referred to as a stirring indirect heating type) is suitably used. In the case where surface-crosslinking is carried out simultaneously with drying, the above heating device is also used as the heating device in the surface-crosslinking step.

The stirring method and mode of the above stirring indirect heating type device are not particularly limited, but, in the case of carrying out surface-crosslinking after drying in the production method according to the present invention, examples of the device include: a mechanical stirring type heating device that stirs contents with a rotary shaft provided with a stirring blade such as an arm, a vane, a paddle, and the like; a high-speed shearing type heating device; and the like. In addition, these heating devices may be of a continuous type or may be of a batch type. Examples of these heating devices include a single-shaft or twin-shaft disc-type heating device, a single-shaft or twin-shaft paddle-type heating device, and the like. Moreover, in the case of carrying out surface-crosslinking simultaneously with drying in the production method according to the present invention, the continuous rotary drying machine described above for the drying step is also preferably used as the heating device in the heating treatment step.

In the case of adding the surface-crosslinking agent simultaneously with drying, in the aforementioned continuous rotary drying machine with heating tubes, the surface-crosslinking agent is added as the additive 48 to the particulate hydrous gel, and heating is performed, whereby it is possible to carry out the surface-crosslinking step. In this case, dried particles that is adjusted to a predetermined moisture content (solid content rate) and surface-crosslinked is obtained in a single step, and thus such a surface-crosslinking step is preferable.

Specifically, in the heating device 2, the particulate hydrous gel to which the surface-crosslinking agent has been added through the nozzle 36 of the pipe 26 is stirred by rotation of the rotary container 10 and action of the multiple heating tubes 12 rotating together with the rotary container 10. The particulate hydrous gel containing the surface-crosslinking agent is further heated by heat exchange with steam passing through the multiple heating tubes 12, while advancing toward the takeout port 8. By the heating and the stirring by the heating device 2, while the surface-crosslinking reaction proceeds, the particulate hydrous gel is adjusted to a predetermined moisture content, and preferably granulated.

In the advancement direction of the particulate hydrous gel that advances within the rotary container 10, the obstructive walls 11 are present. The obstructive walls 11 obstruct advancement of the particulate hydrous gel having a high moisture content and a low degree of surface-crosslinking. The particulate hydrous gel having a reduced moisture content and an increased degree of surface-crosslinking due to heating advances beyond the obstructive walls 11. By the obstructive walls 11, mixing of particulate hydrous gels having different moisture contents and different surface-crosslinked states is avoided within the rotary container 10. Accordingly, surface-crosslinking is achieved, and dried particles adjusted to a predetermined moisture content, or granulated material thereof, is obtained. The dried particles or the granulated material thereof is taken out through the takeout port 40.

[2-6] Cooling Step

Preferably, the production method according to the present invention has a cooling step for forcedly cooling the dried particles or the surface-crosslinked dried particles to adjust the dried particles or the surface-crosslinked dried particles to a predetermined temperature, after the aforementioned drying step or surface-crosslinking step and before a later-described sizing step. In the case where the surface-crosslinking step and the drying step are performed as a single step in the aforementioned heating device 2, in the rotary container 10, a surface-crosslinking treatment is appropriately performed, and the solid content rate or the moisture content of the dried particles or the surface-crosslinked dried particles is adjusted within a desired range, and then the cooling step is performed.

Specifically, with respect to a temperature t° C. of the dried particles after the drying step and/or the surface-crosslinked dried particles after the surface-crosslinking step, forced cooling is performed to preferably (t−20)° C. or lower, more preferably (t−30) ° C. or lower, and further preferably (t−40°) C. or lower. For example, in the case where the temperature t of the dried particles after the drying step and/or the surface-crosslinked dried particles after the surface-crosslinking step is 150 to 250° C., the dried particles or the surface-crosslinked dried particles is forcedly cooled to preferably 50 to 130° C., more preferably 60 to 100° C., and further preferably 65 to 90° C. before being subjected to the sizing step. By cooling to a temperature within this range, the workability at the time of crushing and the accuracy of classification in the sizing step are improved, so that the physical properties of obtained water-absorbent resin powder are improved.

(Cooling Method)

The method for cooling the dried particles or the surface-crosslinked dried particles in the cooling step is not particularly limited. A continuous cooling machine having a through-flow heat transfer type or conductive heat transfer type cooling means is preferably used.

The dried particles or the surface-crosslinked dried particles may be cooled in a state where the dried particles or the surface-crosslinked dried particles is left at rest, or may be being stirred. From the viewpoint of uniformly and immediately cooling the entirety of the dried particles or the surface-crosslinked dried particles, a material stirring type cooling machine is preferable, and a continuous material stirring type cooling machine is more preferable. A continuous cooling machine selected from a continuous stirring cooling machine, a continuous rotary cooling machine, and a fluidized bed cooling machine is particularly preferable. For example, a fluidized bed cooling machine that employs direct heat transfer is exemplified. Cooling with cold air by a continuous belt type cooling machine may be performed.

Preferably, a stirring device having a rotary shaft can be used for stirring cooling. For example, a mixer having a function to allow air current to flow to an object to be cooled and cool the object is widely used as a cooling machine. As long as the advantageous effects of the present invention are achieved, the direction of the air current is not particularly limited, and may be the down direction or may be the right-left direction, specific examples of such a cooling machine include devices that are used by causing air current to flow through a mixer having a horizontal rotary shaft and a container that rotates (a horizontal cylindrical type, an inclined cylindrical type, a V-shaped type, a double conical type, a cubic type, an S-shaped type, a continuous V-shaped type, etc.), a mixer having a horizontal rotary shaft and a fixed container (a ribbon type, a screw type, a conical screw type, a groove stirring type, a high speed flow type, a rotary disk type, a Muller type, a paddle type, a rotary type, a disk type, etc.), or the like. Preferably, a container fixed type cooling machine that has a rotary stirring blade for stirring water-absorbent resin powder that is an object to be cooled and allows air current to flow therein, is used. These cooling machines may be of a continuous type or may be of a batch type, but is preferably of a continuous type.

[2-7] Sizing Step

This step is a step of adjusting the particle size of the dried particles or the surface-crosslinked dried particles. By the sizing step, water-absorbent resin powder having a more positively controlled particle diameter or particle size distribution is obtained.

Preferably, the sizing step includes a crushing step and/or a classification step. The crushing step is a step of crushing the dried particles that loosely aggregates through the drying step or the heating treatment step, by using a crusher, to make the particle diameter thereof uniform. The classification step is a step of removing bulky particles and fine powder from the dried particles or the surface-crosslinked dried particles, or crushed material thereof, by using a classifier. A sizing step in which water absorbent resin powder having a controlled particle diameter and particle size distribution is obtained only through a crushing step is ideal.

As the crusher, a crusher that leads to less damage to the dried particles or the surface-crosslinked dried particles is preferable, and specific examples of the crusher include a roll granulator (MATSUBO Corporation), a granulator (Kurimoto, Ltd.), Roundel Mill (TOKUJU CORPORATION), and the like. As the classifier, a vibration type or oscillation type sieve classifier with a sieve mesh is used.

Figure 12:
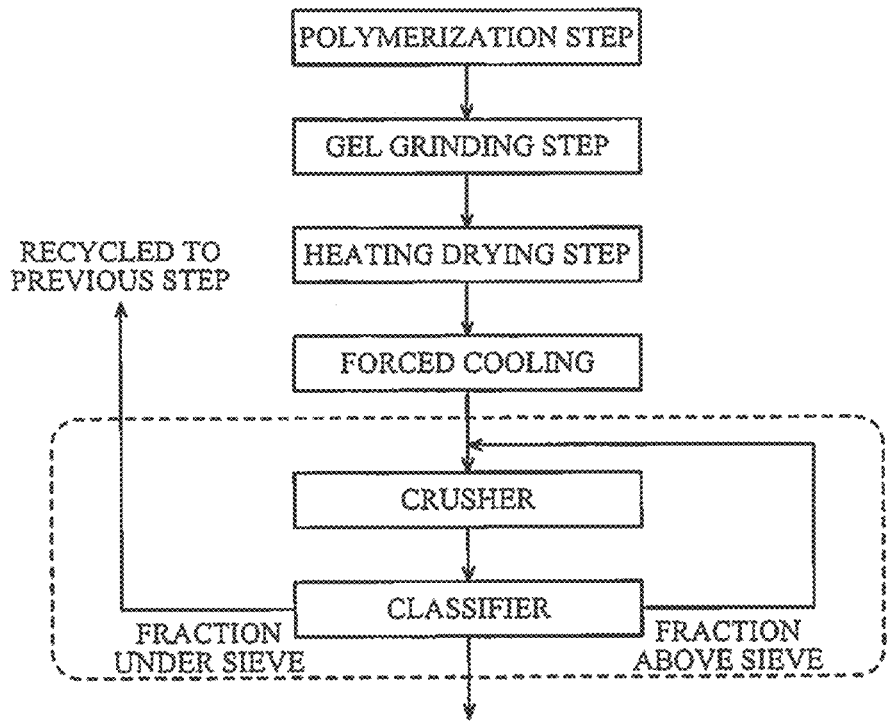
FIG. 12 is a flowchart showing an example of a sizing step in a preferred embodiment of the present invention.

FIG. 12 is a flowchart for explaining a sizing step A of a production method according to an embodiment of the present invention. The sizing step A has: a first crushing step of crushing dried particles or surface-crosslinked dried particles by using a crusher to obtain first crushed material; a first classification step of classifying the first crushed material by using a classifier to separate bulky particles contained in the first crushed material (shown as a fraction above a sieve in FIG. 12); and a step of putting the bulky particles into the first crushing step again. Preferably, in the first classification step, fine powder (shown as a fraction under the sieve in FIG. 12) is removed from the first crushed material.

Figure 13:
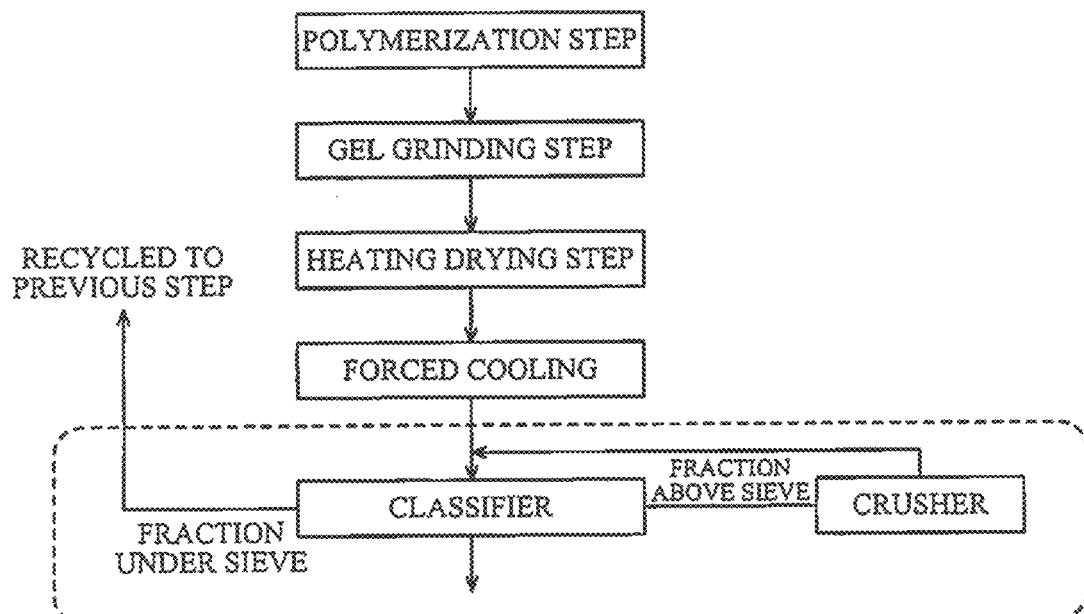
FIG. 13 is a flowchart showing another example of the sizing step in the preferred embodiment of the present invention.

FIG. 13 is a flowchart for explaining a sizing step B of a production method according to another embodiment of the present invention. The sizing step B has: a second classification step of classifying dried particles or surface-crosslinked dried particles by using a classifier to separate bulky particles contained in the dried particles or the surface-crosslinked dried particles (shown as a fraction above a sieve in FIG. 13); a second crushing step of crushing the bulky particles by using a crusher to obtain second crushed material; and a step of putting the second crushed material into the second classification step again. Preferably, in the second classification step, fine powder (shown as a fraction under the sieve in FIG. 13) is removed from the dried particles or the post-crosslinked dried particles.

The size of the bulky particles in the sizing step A and the sizing step B is set as appropriate in accordance with the particle diameter and the particle size of a water-absorbing, agent that is a final product. The particle diameter of the bulky particles (defined by sieve classification) is preferably not less than 2000 μm and more preferably not less than 850 μm.

(Particle Size of Dried Particles or Surface-Crosslinked Dried Particles)

From the viewpoint of reduction of fine powder, a mass-average particle diameter d2 of the dried particles or the surface-crosslinked dried Particles to be subjected to the sizing step is preferably not less than 200 µm, more preferably not less than 300 µm, further preferably not less than 400 µm, and not less than 500 µm. Prom the viewpoint of increasing the efficiency of the crushing step, the mass-average particle diameter d2 is preferably not greater than 2000 µm, further preferably not greater than 1500 µm, and preferably not greater than 1000 µm.

The ratio (d2/d1) of the mass-average particle diameter d2 of the dried particles or the surface-crosslinked, dried particles to the mass-average particle diameter d1 of the particulate crosslinked hydrogel polymer before drying is preferably 1.05 to 100, more preferably 1.1 to 10, and further preferably 1.2 to 5.

(Moisture Content of Surface-Crosslinked Dried Particles)

In the case where the surface-crosslinked dried particles is subjected to the sizing step, the moisture content of the surface-crosslinked dried particles is preferably within the moisture content range described above for the moisture content of the dried particles after drying.

(Particle Size of Water-Absorbent Resin Powder)

From the viewpoint of fluid retention performance, a mass-average particle diameter d3 of the water-absorbent resin powder obtained through the sizing step is preferably not less than 200 µm, more preferably 200 to 600 µm, further preferably 250 to 550 µm, and particularly preferably 300 to 500 µm.

The ratio (d3/d2) of the mass average particle diameter d3 of the water-absorbent resin powder to the mass-average particle diameter d2 of the dried particles or the surface-crosslinked dried particles is preferably 0.05 to 1.1, more preferably 0.1 to 0.9, further preferably 0.2 to 0.85, and particularly preferably 0.5 to 0.8. By decreasing the particle size to a size within these ranges, a water-absorbent resin having a further improved water absorption speed is obtained.

The ratio (d3/d1) of the mass-average particle diameter d3 of the water-absorbent resin powder to the mass-average particle diameter d1 of the particulate hydrous gel is preferably 0.5 to 100. Further preferably, the ratio exceeds 1, that is, the water-absorbent resin powder is granulated as compared to the particulate hydrous gel, even after undergoing crushing and the like in the sizing step. From this viewpoint, the ratio (d3/d1) is within a range of more preferably 1.01 to 50, further preferably 1.1 to 10, and particularly preferably 1.2 to 4.

From the viewpoint of the quality improvement of the obtained water-absorbing agent, water-absorbent resin powder in which water-absorbent resin particles having a particle diameter of 150 to 850 µm, the particle diameter being defined by sieve classification, are a main component, is preferable. The proportion of the water-absorbent resin particles having a particle diameter of 150 to 850 µm, in the water-absorbent resin powder, is preferably 90 to 100% by mass, more preferably 95 to 100% by mass, further preferably 97 to 100% by mass, and particularly preferably 99 to 100% by mass. Thus, the proportion of water-absorbent resin particles having a particle diameter of less than 150 µm and greater than 850 µm, the particle diameter being defined by sieve classification, is preferably not greater than 10% by mass, more preferably not greater than 5% by mass, further preferably not greater than 3% by mass, and particularly preferably not greater than 1% by mass.

(Fine Powder Recycling Step)

Preferably, the production method according to the present invention further has a fine powder recycling step. The term "fine powder recycling step" means a step of supplying the fine powder removed in the classification step, to any step without changing the fine powder or after granulating the fine powder. The fine powder recycling step is preferably a step of putting fine powder or fine powder-granulated material into a step prior to the drying step and reusing the fine powder or fine powder-granulated material therein. Examples of the step prior to the drying step include the monomer solution, before polymerization, that is prepared in the above polymerization step, the hydrous gel during polymerization, the grinding step for the hydrous gel after polymerization, the drying step for the particulate hydrous gel, and the like. To these steps, the fine powder may be added without changing the fine powder, or the fine powder may be added after being swollen into gel by water or granulated. In addition, together with the fine powder, water, a crosslinking agent, a binder (for example, a water-soluble polymer, a thermoplastic resin) other than water, a polymerization initiator, a reducing agent, a chelating agent, a color protecting agent, and the like may be added. For example, in the case of adding water, the water is preferably used in an amount of 1 to 1000% by mass with respect to the fine powder. In the case of adding another compound, the other compound is preferably used in an amount of 0.01 to 10% by mass with respect to the fine powder.

In the production method according to the present invention, the amount of fine powder is reduced, and thus labor saving can be also achieved in a fine powder removing step and a fine powder collection step. As compared to mere removal of fine powder, collection and recycle of removed, fine powder may cause a decrease in performance of a water-absorbent resin (for example, a decrease in fluid retention capacity, re-generation of fine powder during a step, etc.). However, according to the present invention, since the amount of fine powder is reduced, a decrease in performance caused by collection and recycle of fine powder is avoided, and the performance of the obtained water-absorbent resin improves. A preferable amount of fine powder collected is set as appropriate on the basis of a target particle size. In the case of producing water-absorbent resin powder having a small particle diameter, the amount of fine powder also tends to increase consequently, but the amount of fine powder is preferably less than 20% by mass, more preferably not greater than 15% by mass, further preferably not greater than 10% by mass, and particularly preferably not greater than 6% by mass, of the total quantity of production. In the production method according to the present invention the amount of fine powder is significantly reduced as compared to 20 to 30% by mass that is the amount of fine powder by a conventional production method.

[2-8] Swelling Step

Preferably, the production method further has a swelling step. The swelling step is a step of re-swelling the dried particles, the surface-crosslinked dried particles, or the water-absorbent resin powder by adding water thereto.

The amount of water to be added to the dried particles, the surface-crosslinked dried particles, or the water-absorbent resin powder is adjusted as appropriate in accordance with the moisture content of the dried particles, the surface-crosslinked dried particles, or the water-absorbent resin powder. By the addition of water, the solid content rate of the obtained water-absorbing agent can be adjusted, within a desired range. Preferably, after the drying and step before the sizing step, the dried particles or the surface-crosslinked dried particles is re-swollen and forcedly cooled simultaneously by adding water to the dried particles or the surface-crosslinked dried particles. Accordingly, the production efficiency of the water-absorbent resin powder further improves.

From the viewpoint of cooling efficiency and performance of the finally obtained water absorbent resin powder (water absorbing agent), the amount of water to be added or increased in the swelling step, in terms of solid content, is preferably 0.1 to 20% by mass, more preferably 0.5 to 10% by mass, and further preferably 2 to 8% by mass. In the re-swelling step, another additive may be added together with water. In addition, from the viewpoint of fluidity improvement or the like after re-swelling, the dried particles, the surface-crosslinked dried particles, or the water-absorbent resin powder may be heated at the time of re-swelling, or the added water may be partially removed by drying the dried particles, the surface-crosslinked dried particles, or the water-absorbent resin powder. The heating temperature during or after re swelling is within a range of preferably 50 to 150° C. and more preferably 60 to 120° C.

(Other Additives)

In the production method according to the present invention, other than the surface-crosslinking agent and the gel fluidizer that are optionally used, it is possible to further add inorganic fine particles, a dust inhibitor, a dried water-absorbent resin (fine powder), a liquid permeability improver, and the like as other additives before or after drying.

Specific examples of the inorganic fine particles include: mineral products such as talc, kaolin, fuller's earth, hydrotalcite, bentonite, activated clay, barite, natural asphaltum, strontium ore, ilmenite, pearlite, and the like; aluminum compounds such as aluminum sulfate tetradeca- to octadecahydrates (or anhydrates thereof), potassium aluminum sulfate dodecahydrate, aluminum sodium sulfate dodecahydrate, aluminum ammonium sulfate dodecahydrate, aluminum chloride, polyaluminum chloride, aluminum oxide, and the like; other polyvalent metal salts, polyvalent metal oxides, and polyvalent metal hydroxides such as calcium phosphate and the like; hydrophilic amorphous silicas; oxide complexes such as complexes of silicon oxide, aluminum oxide, and magnesium oxide, complexes of silicon oxide and aluminum oxide, complexes of silicon oxide and magnesium oxide, and the like; and the like. Two or more of them may be used in combination.

An example of the water-absorbent resin fine powder is particles that are generated in the production process for a water-absorbent resin and have a particle diameter less than 150 μm.

[2-9] Other Steps

In addition to the respective steps described above, the production method according to the present invention may include a grinding step, a classification step, a granulation step, a transport step, a storage step, a packing step, a keeping step, and the like as necessary,

[2-10] Preferred Embodiment

As described above, in the drying step of the production method of the present invention, dried particles or surface-crosslinked dried particles that has a particle size close to a target product particle size is obtained. Accordingly, at least a part of steps after the drying step can be made compact or omitted.

FIG. 9 is a flowchart of a production method in which the grinding step is omitted, and the classification step and the fine powder collection step in the sizing step are made compact. In the production method shown in FIG. 9, dried particles obtained after the drying step is forcedly cooled and adjusted to a predetermined particle size in the downscaled sizing step, and then the surface-crosslinking step is performed.

FIG. 10 is a flowchart of a production method obtained by making the production method shown in the flowchart of FIG. 9 further compact. In the production method shown in FIG. 10, in the drying step, surface-crosslinking is carried out simultaneously with drying. Surface-crosslinked dried particles obtained after the drying step is forcedly cooled and then adjusted to a predetermined particle size in the sizing step, whereby water-absorbent resin powder having excellent physical properties can be efficiently produced. Furthermore, in the production method according to the present invention, surface-crosslinked dried particles that has a particle size close to a target product particle size is obtained after the drying step in which surface crosslinking is carried out simultaneously with drying, and thus it is also possible to make the subsequent sizing step compact.

[3] Production Equipment for Water-Absorbent Resin Powder

The production method according to the present invention is carried out by a production equipment that includes a polymerization device, a gel-crushing device, and a drying device. Preferably, the production equipment further includes a cooling device. The production equipment may include another heating device, a mixing device, a drying device, a grinding device, a classifying device, a sizing device, and the like. Preferably, the production equipment has a transport means, and the respective devices are connected to each other by the transport means.

In the polymerization device, a polymerization step of obtaining a crosslinked hydrogel polymer from a monomer that is a material of a water-absorbent resin is performed. Preferably, in the polymerization device, a polymerization step of obtaining a crosslinked hydrogel polymer from a monomer that is a material of a water-absorbent resin is performed. In the gel-crushing device, a gel-crushing step of grinding the crosslinked hydrogel polymer to obtain a particulate crosslinked hydrogel polymer is performed, in the drying device, a drying step of drying the particulate crosslinked hydrogel polymer to obtain dried particles is performed. In the drying device, a surface-crosslinking step for obtaining surface-crosslinked dried particles is performed as necessary. Preferably, in the cooling device, a cooling step of forcedly cooling the dried particles or the surface-crosslinked dried particles is performed.

In the production equipment, the drying device is a rotary heating device including a rotary container that contains the particulate crosslinked hydrogel polymer therein and rotates; and a plurality of heating tubes that are located within the rotary container, extend in the axial direction of the rotary container, and rotate together with the rotary container. Preferably, the drying device has a means for introducing and discharging a gas into and from the rotary container. Preferably, the drying device has a rotary container that is inclined from one end thereof toward the other end thereof. Preferably, at least one obstructive wall is provided within the rotary container. Preferably, the plurality of heating tubes are arranged radially from the rotation axis of the rotary container toward the outer side in the radial direction so as to be spaced apart from each other. In addition, preferably, the plurality of heating tubes are arranged on two or more concentric circles centered on the rotation axis of the rotary container, so as to be spaced apart from each other. Preferably, the drying device has a heating means or a thermal insulating means on the outer peripheral surface of the rotary container.

According to another aspect, the present invention is a production method for water-absorbent resin powder, including the aforementioned drying method. Preferably, the production method further includes a polymerization step of polymerizing a monomer aqueous solution containing a monomer, which is a material of a water-absorbent resin, to obtain a crosslinked hydrogel polymer, and a gel-crushing step of grinding the crosslinked hydrogel polymer to obtain a particulate crosslinked hydrogel polymer. Preferably, the production method has a cooling step of cooling dried particles obtained by drying the particulate crosslinked hydrogel polymer by the aforementioned drying method.

[4] Physical Properties of Water-Absorbent Resin Powder as Product

Regarding the water-absorbent resin powder (particularly, the surface-crosslinked water-absorbent resin powder is also referred to as a water-absorbing agent) obtained by the production method according to the present invention, in the case where the water-absorbent resin powder or the water-absorbing agent is used for absorbent articles, particularly, for disposable diapers, among physical properties described below in (4-1) to (4-5), at least one, preferably two or more, more preferably three or more, and further preferably all the physical properties are desirably controlled within desired ranges. When none of the physical properties described below satisfy the ranges described below, the advantageous effects of the present invention are not sufficiently achieved, and sufficient performance may not be exerted particularly in so-called high-concentration disposable diapers in which the amount of the water-absorbing agent used per paper diaper is large.

[4-1] CRC (Centrifuge Retention Capacity)

The CRC (centrifuge retention capacity) of the water-absorbent resin powder (water-absorbing agent) of the present invention is normally not less than 5 g/g, preferably not less than 15 g/g, and more preferably not less than 25 g/g. The upper limit thereof is not particularly limited, and a higher CRC is preferable. However, from the viewpoint of balance with the other physical properties, the CRC is preferably not greater than 70 g/g, more preferably not greater than 50 g/g, and further preferably not greater than 40 g/g.

When the above CRC is less than 5 g/g, the amount of absorption is small, and the water-absorbent resin is not suitable as an absorbent body for absorbent articles such as disposable diapers. In addition, when the above CRC exceeds 70 g/g, the speed at which body fluids such as urine, blood, and the like are absorbed decreases, and thus the water-absorbent resin is not suitable for use for high water absorption speed-type disposable diapers and the like. The CRC can be controlled by changing the types and the amounts of the internal crosslinking agent, a surface-crosslinking agent, and the like.

[4-2] Ext (Water-Soluble Content)

The Ext (water-soluble content) is normally not greater than 50% by mass, preferably not greater than 35% by mass, more preferably not greater than 25% by mass, and further preferably not greater than 15% by mass. The lower limit thereof is not particularly limited, but is preferably 0% by mass and more preferably about 0.1% by mass. In the present invention, "about . . . " means that an error of ±5% is included with respect to a measurement value.

When the above Ext exceeds 50% by mass, the water-absorbent resin may have low gel strength and inferior liquid permeability. Furthermore, since the Re-Wet increases, the water-absorbent resin is not suitable as an absorbent body for absorbent articles such as disposable diapers. The Ext can be controlled by changing the types and the amounts of the internal crosslinking agent and the like.

[4-3] Moisture Content

The moisture content of the water-absorbent resin powder (water-absorbing agent) is preferably greater than 0% by mass and not greater than 20% by mass, more preferably 1% by mass to 15% by mass, further preferably 2% by mass to 13% by mass, and particularly preferably 2% by mass to 10% by mass.

By making the moisture content within the above range, a water-absorbing agent having excellent powder characteristics (e.g., fluidity, transportability, damage resistance, etc.) is obtained.

[4-4] Particle Size

The mass-average particle diameter (D50) of the water-absorbent resin powder (water-absorbing agent) is preferably 200 µm to 700 µm, more preferably 250 µm to 600 µm, further preferably 250 µm to 500 µm, and particularly preferably 300 µm to 450 µm. In addition, the proportion of the particles having a particle diameter of less than 150 µm is preferably not greater than 20% by mass, more preferably not greater than 10% by mass, and further preferably not greater than 5% by mass. Moreover, the proportion of the particles having a particle diameter of not less than 850 µm is preferably not greater than 20% by mass, more preferably not greater than 15% by mass, and further preferably not greater than 10% by mass. In other words, the water-absorbing agent contains preferably 80% by mass or greater, more preferably 85% by mass or greater, and further preferably 90% by mass or greater of particles having a particle diameter less than 850 µm. The logarithmic standard deviation ($\sigma\zeta$) of the particle size distribution is preferably 0.20 to 0.50, more preferably 0.25 to 0.40, and further preferably 0.27 to 0.35.

[4-5] AAP (Fluid Retention Capacity Under Load)

The AAP (fluid retention capacity under load) of the water-absorbent resin (water-absorbing agent) is preferably not less than 15 g/g, more preferably not less than 20 g/g, further preferably not less than 22 g/g, particularly preferably not less than 23 g/g, and most preferably not less than 24 g/g. The upper limit thereof is not particularly limited, but the AAP is preferably not greater than 30 g/g.

When the above AAP is less than 15 g/g, the amount of liquid return when pressure is applied to the absorbent body (sometimes referred to as "Re-Wet") increases, and thus the water-absorbent resin is not suitable as an absorbent body for absorbent articles such as disposable diapers. The AAP can be controlled by adjustment of the particle size, change of the surface-crosslinking agent, and the like.

[5] Application of Water-Absorbent Resin Powder (Water-Absorbing Agent)

Application of the water-absorbent resin powder (water-absorbing agent) is not particularly limited, and preferable examples thereof include application as an absorbent body for absorbent articles such as disposable diapers, sanitary napkins, incontinence pads, and the like. In particular, the water-absorbent resin can be used as an absorbent body for high-concentration disposable diapers for which odor, coloring, and the like derived from the raw material are problems. Furthermore, since the water-absorbing agent has excellent absorption time and a controlled particle size distribution, when the water-absorbing agent is used in an upper layer of the absorbent body, significant effects can be expected.

In addition, as the raw material of the absorbent body, an absorbent material such as pulp fibers and the like can be used together with the water-absorbing agent. In this case, the amount of the water-absorbing agent (core concentration) contained in the absorbent body is preferably 30% by mass to 100% by mass, more preferably 40% by mass to 100% by mass, further preferably 50% by mass to 100% by mass, even, more preferably 60% by mass to 100% by mass, particularly preferably 70% by mass to 100% by mass, and most preferably 75% by mass to 95% by mass.

By making the core concentration within the above range, in the case where the absorbent body is used in an upper layer of an absorbent article, the absorbent article can be kept in a white state providing clean feel. Furthermore, the absorbent body is excellent in diffusion property with respect to body fluids such as urine, blood, and the like, and thus an increase in absorption amount can be expected due to efficient liquid distribution.

EXAMPLES

The following will describe the present invention more specifically by means of Examples and Comparative Examples. However, the present invention is not limited to the description thereof, and an Example obtained by appropriately combining technical means that are disclosed in the respective Examples is also included in the technical scope of the present invention.

Unless specifically noted otherwise, a power source of 60 Hz and 200 V or 100 V was used for electric apparatuses (including an apparatus for measuring physical properties of a water-absorbent resin) used in Examples and Comparative Examples. In addition, unless specifically noted otherwise, various physical properties of the water-absorbent resin of the present invention were measured under conditions of room temperature (20° C. to 25° C. and a relative humidity of 50% RH±10%.

Furthermore, for the sake of convenience, "liter" is sometimes represented as "l" or "L", and "% by mass" or "% by weight" is sometimes represented as "wt %", In measurement of a trace component, the detection limit or less is sometimes represented by N. D (Non Detected).

[Methods for Measuring Physical Properties of Hydrous Gel and Water-Absorbent Resin]

(a) CRC (Centrifuge Retention Capacity)

The CRC (centrifuge retention capacity) of a water-absorbent resin was measured according to the EDANA method. (ERT441.2-02). In addition, for the CRC (centrifuge retention capacity) of a hydrous gel, the same operations as in the EDANA method (ERT441.2-02) were performed except the hydrous gel as a sample was changed to 0.4 g and the free swelling time was changed to 24 hours. Furthermore, separately, a solid content rate α of the hydrous gel was measured, a dry mass of the water-absorbent resin in 0.4 g of the hydrous gel was obtained, and the CRC of the hydrous gel was calculated according to the following (formula 2).

$$\text{CRC of hydrous gel (g/g)} = \{(mwi - mb) - msi \times (\alpha/100)\}/\{msi \times (\alpha/100)\} \quad \text{(formula 2)}$$

msi is the mass (unit g) of the water-absorbent resin before measurement, mb is the mass (unit: g) of a Blank (only an unwoven fabric) after free swelling and dehydration, mwi is the mass (unit g) of the hydrous gel after free swelling and dehydration, and a is the solid content rate (unit: by mass) of the water-absorbent resin before measurement.

(b) Ext (Water-Soluble Content)

The Ext (water-soluble content) of a hydrous gel was measured according to the EDANA method (ERT470.2-02). The same operations as in the EDANA method (ERT470.2-02) were performed except the mass of the hydrous gel, which is a sample, was changed to 5.0 g and the stirring time was changed to 24 hours. Furthermore, separately, a solid content rate α of the hydrous gel was measured, a dry mass in 5.0 g of the hydrous gel was obtained, and the Ext of the hydrous gel was calculated according to the following (formula 3).

$$\text{Ext of hydrous gel (\% by mass)} = \{(VHCl.s - VHCl.b) \times CHCl \times Mw \times Fdil \times 100\}/ms \times (\alpha/100) \times 1000 \quad \text{(formula 3)}$$

VHCl.s is the amount of HCl (unit: ml) required to adjust the pH of a filtrate containing a dissolved polymer from pH 10 to pH 2.7, VMCl.b is the amount of HCl (unit: ml) required to adjust the pH of a Blank (a 0.9% by mass sodium chloride aqueous solution) from pH 10 to pH 2.7, CHCl is the concentration of a HCl solution (unit: mole/l), Mw is the average molecular weight (unit: g/mole) of a monomer unit in an acrylic acid (salt) polymer, Fdil is a dilution of the filtrate containing a dissolved polymer, ms is the mass (unit: g) of a water-absorbent resin before measurement, and α is the solid content rate (unit: % by mass) of the water-absorbent resin before measurement.

c) Moisture Content of Water-Absorbent Resin

The moisture content of a dried water-absorbent resin (water-absorbing agent) was measured according to the EDANA method (ERT430.2-02). In the present invention, measurement was taken with its sample amount changed to 1.0 g and its drying temperature changed to 180° C.

d) Particle Size of Water-Absorbent Resin

The particle size (particle size distribution, mass-average particle diameter (D50), and logarithmic standard deviation (σζ) of the particle size distribution) of a water-absorbent resin powder or dried particles was measured according to the method described in Columns 27 and 28 of U.S. Pat. No. 7,638,570.

(e) Polymerization Ratio of Hydrous Gel 1.00 g of a hydrous gel was put into 1000 g of ion-exchanged water, and the mixture was stirred at 300 rpm for 2 hours. Then, the mixture was filtrated to remove insoluble material. The amount of the monomer extracted in the filtrate obtained by the above operation was measured by using liquid chromatography. When the amount of the monomer was used as a residual monomer amount m (g), a polymerization ratio C (% by mass) was obtained according to the following (formula 4).

$$C(\% \text{ by mass}) = 100 \times (1 - m/(\alpha \times M/100)) \quad \text{(formula 4)}$$

In (formula 4), M means a mass (g) of the water-absorbent resin, and α means a solid content rate (% by mass) of the water-absorbent resin. The solid content rate is obtained by the following method.

(f) Moisture Content and Solid Content Rate of Hydrous Gel

The moisture content of a hydrous gel before drying was measured with the hydrous gel being 2.0 g and the drying time being 24 hours in the above (c), 2.00 g of a water-absorbent resin (hydrous gel) was put into an aluminum cup having a bottom surface with a diameter of 50 mm, and then the total mass W1 (g) of the sample (the water-absorbent resin and the aluminum cup) was accurately weighed. Next, the sample was left at rest within an oven whose atmospheric temperature was set to 180° C. After 24 hours elapsed, the sample was taken out of the oven, and the total mass W2 (g) was weighed with precision. When the mass of the water-absorbent resin (hydrous gel) subjected to this measurement was denoted by M (g), the moisture content (100−α) of the water-absorbent resin (hydrous gel) (% by mass) was obtained according to the following (formula 6), α is the solid content rate (% by mass) of the water-absorbent resin (hydrous gel).

$$(100-\alpha)(\% \text{ by mass}) = \{(W1-W2)/M\} \times 100 \quad \text{(formula 5)}$$

(g) Particle Size of Particulate Hydrous Gel

The mass-average particle diameter (D50) and the logarithmic standard deviation (σζ) of the particle size distribution of a particulate hydrous gel were measured according to Patent Literature 35 (WO2016/204302) by the following method.

Specifically, 20 g of a water-absorbent resin (solid content rate: a % by mass) of a temperature of 20 to 25° C. was added to 1000 g of a 20% by mass sodium chloride aqueous solution containing 0.08% by mass of Emal 20C (surfactant, manufactured by Kao Corporation) (hereinafter, referred to as an "Emal aqueous solution") to make a dispersion, liquid, and the dispersion liquid was stirred with a stirrer chip having a length of 50 mm and a diameter of 7 mm at 300 rpm for 16 hours (using a polypropylene container of about 1.4 L having a cylindrical column shape with a height of 21 cm and a diameter of 8 cm).

After the end of the stirring, the dispersion liquid was put into a center portion of JIS standard sieves (diameter: 21 cm, mesh size: 8 mm/4 mm/2 mm/1 mm/0.60 mm/0.30 mm/0.15 mm/0.075 mm) provided on a rotary table. The entire hydrous gel was washed onto the sieve using 100 g of the Emal aqueous solution, and then the hydrous gel was classified by repeating, four times, an operation in which 6000 g of the Emal aqueous solution was uniformly poured from a height of 30 cm on the upper side using a shower (72 holes, liquid volume: 60 [L/min]z, such that the pouring range (50 cm²) covered the entire sieve, while rotating the sieve by hand (20 rpm). The classified hydrous gel on the sieve at the first stage was drained for 2 minutes and then weighed. Also for the sieves at the second and subsequent stages, classification was performed by the same operation, and the hydrous gel remaining on each sieve after draining was weighed. The above sieves can be changed as appropriate depending on the gel particle diameter. For example, when the particle diameter of a hydrous gel is small and clogging occurs in the sieves having a mesh size of 0.15 mm and 0.075 mm, classification may be performed with these sieves replaced with JIS standard sieves having a larger diameter (diameter: 30 cm, mesh size: 0.15 mm, 0.075 mm).

A mass percentage was calculated by the following formula (math. 1) from the mass of the hydrous gel remaining on each sieve. The mesh size of each sieve after draining was plotted as a particle size distribution of the hydrous gel on logarithmic probability paper according to the following formula (math. 2). The particle diameter at which cumulative sieve % R corresponds to 50% by mass was defined as the mass-average particle diameter (D50) of the hydrous gel. In addition, the particle diameter at which cumulative sieve R=84.1% (defined as X1) and the particle diameter at which cumulative sieve % R=15.9% (defined as X2) were obtained from the above plot, and a logarithmic standard deviation (σζ) was obtained by the following formula (math. 3). A smaller σζ value means a narrower particle size distribution.

$$X(\%) = (w/W) * 100 \quad \text{(math. 1)}$$

$$R(\alpha)(\text{mm}) = (20/W)^{1/3} * r \quad \text{(math. 2)}$$

X: the percentage by mass (t) of the hydrous gel remaining on each sieve after classification and draining w: the mass (g) of the hydrous gel remaining on each sieve after classification and draining W: the total mass (g) of the hydrous gels remaining on the respective sieves after classification and draining R(α): the mesh size (mm) of a sieve in terms of a water-absorbent resin having a solid content of α% by mass r: the mesh size (mm) of a sieve with which the cross-linked hydrogel polymer (hydrous gel particles) swollen in the 20% by mass aqueous sodium chloride solution was classified $$\sigma\zeta = 0.5 \times \ln(X2/X1) \quad \text{(math. 3)}$$

(h) Mass-Average Particle Diameter in Terms of Dried Material

The particle diameter (weight-average particle diameter in terms of dried material of hydrous gel particles) after drying was specified below according to Patent Literature 35 on the basis of (f) Moisture Content of Hydrous Gel and (g) Mass-Average Particle Diameter of Particulate Hydrous Gel described above. Specifically, the mass-average particle diameter is defined by the following formula.

$$\text{Solid } D50 = \text{Gel } D50 \times (GS/100)^{1/3} \quad \text{(Formula)}$$

wherein

Gel D50: the mass-average particle diameter (μm) of the hydrous gel particles

GS: the solid content rate (% by mass) of the hydrous gel particles

Solid D50 the mass-average particle diameter (μm) in terms of dried material of the hydrous gel particles (i) Vortex (Absorption Time)

The Vortex (absorption time) of a water-absorbent resin was measured according to the following procedure. First, 0.02 parts by mass of Food Blue No. 1 (brilliant blue), which is a food additive, was added to 1000 parts by mass of a physiological saline solution (0.9% by mass sodium chloride aqueous solution) prepared beforehand, and then the temperature of the solution was adjusted to 30° C.

Subsequently, 50 ml of the physiological saline solution was weighed in a beaker having a capacity of 100 ml, and 2.0 g of the water-absorbent resin was put into the beaker while stirring the physiological saline solution at 600 rpm with a stirrer chip having a length of 40 mm and a diameter of 8 mm. With the time of input of the water-absorbent resin as a start point, a time taken until the water-absorbent resin absorbed the physiological saline solution and covered the stirrer chip was measured as the Vortex (absorption time) (unit: seconds).

(j) Residual Monomer Amount

The residual monomer amount of a water-absorbent resin was measured according to the EDANA method (ERT410.2-02).

(k) AAP (Fluid retention Capacity Under Load) of Water-Absorbent Resin

The AAP (fluid retention capacity under load) of a water-absorbent resin was measured according to the EDANA method (ERT442.2-02) Measurement was taken with its load condition changed to 4.83 kPa (0.7 psi).

Production Example 1

Prepared was a monomer aqueous solution containing 300 parts by mass of acrylic acid, 100 parts by mass of a 48% by mass sodium hydroxide aqueous solution, 0.61 parts by mass of polyethylene glycol diacrylate (average number n: 9), 16.4 parts by mass of a 0.1% by mass trisodium diethylenetriamine pentaacetate aqueous solution, and 273.2 parts by mass of deionized water.

Next, the monomer aqueous solution adjusted to 38° C. was continuously supplied by using a metering pump, and then 150.6 parts by mass of a 48% by mass sodium hydroxide aqueous solution was continuously line-mixed thereinto. At this time, the temperature of the monomer aqueous solution rose to 87° C. due to heat of neutralization.

Furthermore, 14.6 parts by mass of a 4% by mass sodium persulfate aqueous solution was continuously line-mixed, and then the mixture was continuously supplied to a continuous polymerization machine having a flat polymerization belt with weirs at both edges, such that a thickness of the mixture was 10 mm. Thereafter, polymerization (polymerization time: 3 minutes) was continuously carried out, and a belt-shaped hydrous gel (1a) was obtained. A strip-shaped hydrous gel (1b) was obtained by continuously cutting the obtained belt-shaped hydrous gel (1a) in a width direction with respect, to the advancement direction of the polymerization belt at regular intervals such that a cut length was 300 mm.

Gel-crushing was performed while simultaneously supplying the obtained hydrous gel (1b) and a 3.1% by mass lauryl dimethylamino acetic acid betaine aqueous solution to a screw extruder. The supplied amount of the lauryl dimethylamino acetic acid betaine aqueous solution was 0.15% by mass with respect to the solid content of the hydrous gel (1b). As the screw extruder, a meat chopper having a screw shaft outer diameter of 86 mm and provided with a porous plate having a diameter of 100 mm, a pore diameter of 8.0 mm, and a thickness of 10 mm at an end portion, was used. Gel-crushing (first gel-crushing) was performed while supplying water and steam simultaneously with the hydrous gel (1b). Next, the pore diameter of the porous plate was changed to 4.7 mm, and then gel-crushing (second gel-crushing) was further performed on the ground gel obtained by the first gel-crushing, while supplying water and steam. The gel-crushing energy required for two times of grinding was 51 J/g. Regarding an obtained particulate hydrous gel PG(1), the solid content rate was 44% by mass (the moisture content was 56% by mass), the average particle diameter d1 in terms of dry mass was 130 μm, and the proportion of particles having a particle diameter not greater than 150 μm was about 53% by mass. In addition, the polymerization ratio of the particulate hydrous gel was 98.6%, the CRC thereof was 36 g/g, and the soluble content thereof was 6%. The physical properties of the particulate hydrous gel PG(1) are shown in Table 1 below.

Production Example 2

A particulate hydrous gel PG(2) was obtained in the same manner as Production Example 1, except the lauryl dimethylamino acetic acid betaine aqueous solution was not added in the first gel-crushing in Production Example 1. The particulate hydrous gel PG(2) did not contain any surfactant, the moisture content thereof was 44% by mass, the average particle diameter d1 in terms of dry mass was 135 μm, and the proportion of particles having a particle diameter not greater than 150 μm was about 47% by mass. The physical properties of the particulate hydrous gel PG(2) are shown in Table 1 below.

Production Example 3

A particulate hydrous gel PG(3) was obtained in the same manner as Production Example 1, except the first gel-crushing was performed using a porous plate having a pore diameter of 3.2 mm and the second gel-crushing was not performed in Production Example 1. The physical properties of the particulate hydrous gel PG(3) are shown in Table 1 below.

Production Example 4

A particulate hydrous gel PG(4) having a large average particle diameter was obtained in the same manner as Production Example 1, except the supplied amount of the lauryl dimethylamino acetic acid betaine aqueous solution was 0.08% by mass, the first gel-crushing was performed using a porous plate having a pore diameter of 6.4 mm, and the second gel-crushing was not performed in Production Example 1. The physical properties of the particulate hydrous gel PG(4) are shown in Table 1 below.

Production Example 5

A particulate hydrous gel PG(5) having a Larger average particle diameter was obtained in the same manner as Production Example 1, except the supplied amount of the lauryl dimethylamino acetic acid betaine aqueous solution was 0.08% by mass, the first gel-crushing was performed using a porous plate having a pore diameter of 9.5 mm, and the second gel-crushing was not performed in Production Example 1. Various physical properties of the particulate hydrous gel PG(5) are shown in Table 1 below.

Production Example 6

(Soluble Content was Increased)

A particulate hydrous gel PG(6) was obtained in the same manner as Production Example 1, except polymerization was carried out with the amount of polyethylene glycol diacrylate being 0.42 parts by mass and the amount of deionized water being 236 parts by mass, and a porous plate having a pore diameter of 4.0 mm was used for the first gel-crushing and the second gel-crushing in Production Example 1 The physical properties of the particulate hydrous gel PG(6) are shown in Table 1 below.

Production Example 7

A particulate hydrous gel PG(7) was obtained in the same manner as Production Example 1, except a modified silicone (Shin-Etsu Chemical Co., Ltd., trade name: KF-101) was used instead of lauryl dimethylamino acetic acid betaine and the supplied amount thereof was 0.50% by mass in the first gel-crushing in Production Example 1. The physical properties of the particulate hydrous gel PG(7) are shown in Table 1 below.

Production Example 8

A particulate hydrous gel PG(8) was obtained in the same manner as Production Example 1, except polyethylene glycol (weight-average molecular weight: 20000) was used instead of lauryl dimethylamino acetic acid betaine and the supplied amount thereof was 200% by mass in the first gel-crushing in Production Example 1. The physical properties of the particulate hydrous gel PG(8) are shown in Table 1 below.

[Table 1]

TABLE 1

| | | | Properties of Particulate Hydrous Gel | | | | | | | |
|---|---|---|---|---|---|---|---|---|---|---|
| | | | | | Particle size | | | | | |
| | | Solid | Additive | | | | Passed through | Particle | Gel | | |
| | Particulate | content | | | Greater | 850-150 | 150 μm | diameter | polymerization | | |
| Unit | hydrous gel | rate [wt. %] | Type | Amount [wt. %] | than 850 μm [wt. %] | μm [wt. %] | sieve [wt. %] | d1 [μm] | ratio [wt. %] | CRC [g/g] | Ext. [wt. %] |
| Production Example 1 | PG(1) | 44 | Gel fluidizer A | 0.15 | 6 | 41 | 53 | 130 | 98.6 | 36 | 6 |
| Production Example 2 | PG(2) | 44 | — | 0 | 6 | 47 | 47 | 135 | 98.5 | 37 | 8 |
| Production Example 3 | PG(3) | 45 | Gel fluidizer A | 0.15 | 18 | 48 | 34 | 274 | 98.8 | 37 | 9 |
| Production Example 4 | PG(4) | 49 | Gel fluidizer A | 0.08 | 38 | 41 | 21 | 531 | 98.9 | 33 | 6 |
| Production Example 5 | PG(5) | 50 | Gel fluidizer A | 0.08 | 76 | 19 | 5 | 2006 | 98.6 | 34 | 4 |
| Production Example 6 | PG(6) | 47 | Gel fluidizer A | 0.15 | 8 | 42 | 50 | 148 | 98.2 | 40 | 11 |
| Production Example 7 | PG(7) | 44 | Gel fluidizer B | 0.50 | 5 | 41 | 54 | 130 | 98.3 | 35 | 7 |
| Production Example 8 | PG(8) | 44 | Gel fluidizer C | 2.00 | 7 | 46 | 47 | 146 | 98.7 | 36 | 8 |

The details of the compounds shown in Table 1 are as follows.

Gel fluidizer A: a lauryl dimethylamino acetic acid betaine aqueous solution (concentration: 3.1% by mass)

Gel fluidizer B: a modified silicone (trade name "KF-101", manufactured by Shin-Etsu. Chemical Co., Ltd.)

Gel fluidizer C: polyethylene glycol (PEG 20000, Mw: 20000)

Experimental Example 1

The particulate hydrous gel PG(1) (particulate gel) obtained in Production Example 1 was dried using a drying device having a basic configuration shown in FIGS. 1 and 2 (rotary heating device with heating tubes). The drying device includes a cylindrical rotary container (capacity: 100 L) having 10 heating tubes extending in the rotation axis direction thereof and two obstructive walls (donut-shaped partition plates each having one circular opening in a center portion thereof, opening ratio: 50%) therein. The drying device is provided with a downward inclination at 0.6° from an input portion thereof toward a takeout port thereof. Furthermore, a donut-shaped partition plate (also referred to as a discharge weir) having one circular opening in a center portion thereof (opening ratio: 24%) is provided at a takeout port-side end portion within the rotary container. Initially, the interior of the rotary container (specified by a contact thermometer) was heated to a temperature higher than 200° C. in advance by introducing steam of 2.7 Pa (temperature: 228.1° C.) into each heating tube, and then the outer wall of the rotary container was also sufficiently heated by a trace. Next, the particulate hydrous gel PG(1) at 95° C. obtained in Production Example 1 was supplied to the drying device at 15 kg/h, and was continuously dried with an average retention time of 50 minutes, while rotating the rotary container, such that the Froude number Fr was 0.07. During drying, the supplied volume and the discharged volume of air (carrier gas: 140° C.) were adjusted such that the air pressure difference of the interior of the rotary container with respect to the outer air was −20 Pa and the dew point of the discharged air was 90° C. When the hydrous gel within the rotary container was sampled from a plurality of locations on the drying device and the solid content rate thereof was measured, the hydrous gel during drying were divided into three regions with solid content rates of about 90% by mass and about 95% by mass as boundaries by the two donut-shaped obstructive walls (opening ratio: 50%) provided at two intermediate locations in the rotary container. After the drying, the temperature of dried material (1) sampled at the takeout port was 200° C., and a major part thereof was granulated particles. Regarding the dried material (1), the solid content rate was 98.5% by mass, the mass-average particle diameter (d2) was 625 μm (d2/d1=4.8), the proportion of particles having a particle diameter not greater than 850 μm was 68% by mass in terms of dry weight, and the proportion of particles having a particle diameter less than 150 μm was 2.5% by mass. The amount of fine powder (the proportion of particles having a particle diameter less than 150 μm) in the dried material (1) in terms of dry weight was reduced to about ½₁ of 53% by mass that was the amount of fine powder in the particulate hydrous gel PG(1). That is, 65.5% by mass of dried material (dried granulated material) having a target general product particle size (850 to 150 μm) was obtained through only the drying step, and the amount of fine powder was only 2.5% by mass.

Subsequently, the dried material (1) discharged through the takeout port of the heating device was forcedly cooled to 80° C. or lower by cold air, and then the cooled material was supplied to a single-stage roll mill (grinder) and ground, thereby adjusting the particle size thereof, whereby water-absorbent resin powder (1) was obtained. Regarding the water-absorbent resin powder (1), the mass-average particle diameter (d3) was 400 µm (d3/d2=0.64), the proportion of particles having a particle diameter that did not allow the particles to pass through a size of 850 µm was less than 1% by mass, and the proportion of particles having a particle diameter less than 150 µm was 6% by mass. That is, 98% by mass of water-absorbent resin powder having a target product particle size (850 to 150 µm) was obtained through only the grinding step with the single-stage roll mill, and the amount of fine powder was only 6%. Thereafter, when continuous drying was performed for 24 hours, the yield was about 100% (the mass ratio of the obtained water-absorbent resin powder to the added particulate hydrous gel), and the operating state of the device and the physical properties of the water-absorbent resin, were stable. In addition, particularly, adhesion to the interior of the drying device or excessive aggregation of the dried material was also not observed. The physical properties of the obtained water-absorbent resin powder (1) are shown in Tables 2 and 3.

Experimental Example 2 Drying by Through-Flow Band Drying Machine

The particulate hydrous gel PG(1) obtained in Production Example 1 was dried using a band drying machine having a basic configuration shown in FIG. 9. Initially, the particulate hydrous gel PG (1) was spread on a through-flow plate (perforated metal) of the drying machine such that a thickness was about 10 cm, and was dried by hot air at 185° C. for 35 minutes. In dried material (2) obtained at the outlet of the drying machine, hydrous gel particles had been unified and solidified into one plate-like block shape (the width substantially corresponded to the width of the drying belt, the length was endless, and the thickness was several centimeters.). Since the dried material (2) had one plate-like block shape, the yield for the target product particle size (850 to 150 µm) was 0%. Furthermore, a difference in degree of dryness was observed in the thickness direction in which the hot air flowed in the up-down direction.

The unified dried material (2) was air-cooled, coarsely crushed by a crusher (first grinder) including a rotary shaft having a plurality of blades, then supplied to a three-stage roll mill (second grinder), and further ground, to obtain water-absorbent resin powder (2). Regarding the obtained water-absorbent resin powder (2), the mass-average particle diameter (d3) was 400 µm, the proportion of particles having a particle diameter greater than 850 µm was less than 1% by mass, and the proportion of particles having a particle diameter less than 150 µm was 12% by mass. That is, for achieving a target product particle size (850 to 150 µm, an average particle diameter: 400 µm), the first grinder (coarse grinder) and the second grinder (three-stage roll mill) for block-shaped material were needed. Even when the complicated grinding step was performed, water-absorbent resin powder having the target particle size (850 to 150 µm) was 88% by mass, and the amount of fine powder was 12% by mass. Thereafter, when continuous drying was performed for 24 hours, the operating state of the device was stable, but clogging or spill of the dried material was observed at only some of the holes of the perforated metal, and, due to this adhesion or spill, the yield was 99.98% (the mass ratio of the obtained water-absorbent resin powder to the added particulate hydrous gel). The results are shown in Tables 2 and 3.

Experimental Example 3

The block-shaped dried material (2) obtained in Experimental Example 2 was coarsely crushed by the crusher (first grinder), and then grinding was attempted under the same conditions using the single stage roll mill used in Experimental Example 1, but the coarsely crushed material was not caught between the rolls. Therefore, the dried material (2) was not able to be ground by the compact grinding method in Experimental Example 1. The results are shown in Tables 2 and 3.

Experimental Example 4

The block-shaped dried material (2) obtained in Experimental Example 2 was coarsely crushed by the crusher (first grinder), and then around using the single-stage roll mill (second grinder) used in Experimental Example 1, with the interval between the rolls adjusted such that the coarsely crushed material was caught therebetween. Regarding obtained water-absorbent resin powder (4), the mass-average particle diameter d3 was 780 µm, the proportion of particles having a particle diameter greater than 850 µm was 44% by mass, the proportion of particles having a particle diameter less than 150 µm was 5% by mass, and the proportion of particles of 850 to 150 µm was 51% by mass. Water-absorbent resin powder having the target product particle size (850 to 150 µm, average particle diameter 400 µm) was not obtained. The results are shown in Tables 2 and 3.

Experimental Example 5 Influence of Gel Temperature

Water-absorbent resin powder (5) was obtained by performing continuous drying in the same manner as Experimental Example 1, except the particulate hydrous gel PG(1) was cooled from the gel temperature 95° C. to 60° C. and put into the drying device. Aggregation was observed in part of the dried material (5) obtained in the drying step. The results are shown in Tables 2 and 3.

Experimental Example 6

Stirring drying was performed in the same manner as Experimental Example 1, except the particulate hydrous gel PG(2) of Production Example 2 was used instead of the particulate hydrous gel PG(1) in Experimental Example 1. In Experimental Example 6, the hydrous gel adhered to and accumulated on the inner wall of the rotary container and the surfaces of the heating tubes, and an undried gel was discharged. Thus, stable continuous drying was not able to be performed. The results are shown in Tables 2 and 3.

Experimental Example 7 Influence of Gel Temperature

Stirring drying was attempted in the same manner as Experimental Example 1, except the particulate hydrous gel PG(1) was cooled from the gel temperature 9.5° C. to 35° C. and put into the drying device. However, the particulate hydrous gel significantly aggregated and was not able to be continuously supplied to the drying device, and thus stable continuous drying was not able to be performed. The results are shown in Tables 2 and 3.

Experimental Example 8 Influence of Temperature of Inner Wall Temperature at Start-Up Continuous drying was performed in the same manner as Experimental Example 1, except, after the heating tubes were sufficiently heated by steam, the particulate hydrous gel PG(1) was put inside before the inner surface of the rotary container was preheated to 150° C. When the inner surface of the rotary container was not preheated, the hydrous gel adhered to the inner wall of the rotary container and the surface of the heating tubes immediately after start of the drying, and the hydrous gel further aggregated. Thus, for the same drying time, undried material partially occurred. The results are shown in Tables 2 and 3.

Experimental Example 9 Influence of Temperature of Heating Tubes

Water-absorbent resin powder (9) was obtained by performing continuous drying in the same manner as Experimental Example 1, except the steam to be introduced into each heating tube of the drying device was changed from 2.7 MPa (temperature: 228.1° C.) to 1.0 MPa (temperature: 180° C.). The results are shown in Tables 2 and 3.

Experimental Example 10 Influence of Temperature of Heating Tubes

Continuous drying was performed in the same manner as Experimental Example 1, except the steam to be introduced into each heating tube of the drying device was changed from 2.7 MPa (temperature: 228.1° C.) to 0.36 MPa (temperature: 140° C.). When the heat medium temperature was 140° C., the hydrous gel adhered to and accumulated on the inner wall of the rotary container and the surface of the heating tubes, and in addition, an undried gel was discharged. Thus, stable continuous drying was not able to be performed. The results are shown in Tables 2 and 3.

Experimental Example 11

Water-absorbent resin powder (11) was obtained by performing continuous drying in the same manner as Experimental Example 1, except the particulate hydrous gel PG(6) (soluble content: 11%) obtained in Production Example 6 was used instead of the particulate hydrous gel PG(1) (soluble content: 6%) in Experimental Example 1. The results are shown in Tables 2 and 3.

Experimental Example 12 Influence of Shield

Water-absorbent resin powder (12) was obtained by performing continuous drying in the same manner as Experimental Example 1, except a drying device having no donut-shaped partition plate provided therein was used. The results are shown in Tables 2 and 3.

Experimental Example 13 Influence of Shield

Water-absorbent resin powder (13) was obtained by performing continuous drying in the same manner as Experimental Example 1, except only one partition plate close to the input port, of the two donut shaped partition plates of the drying device, was used. The results are shown in Tables 2 and 3.

Experimental Example 14

When continuous drying was performed in the same manner as Experimental Example 1 except a stirring drying machine (paddle dryer) was used instead of the drying device having a basic configuration in FIGS. 1 and 2 and the heat medium temperature was 210° C., the hydrous gel aggregated during drying. In addition, the obtained dried material was not able to be ground, under the same conditions using the single-stage roll mill used in Experimental Example 1. The results are shown in Tables 2 and 3.

Experimental Example 15

Continuous drying was attempted, by hot air at 200° C. using a fluidized bed drying machine instead of the drying device having a basic configuration in FIGS. 1 and 2 in Experimental Example 1, but the hydrous gel aggregated. By merely adjusting the air speed of the drying machine, aggregation of the hydrous gel was not able to be inhibited, and continuous fluidized bed drying was not able to be performed. The results are shown in Tables 2 and 3.

Experimental Example 16 Influence of Froude Number

Water-absorbent resin powder (16) was obtained by performing continuous drying in the same manner as Experimental Example 1, except the Froude number Fr was changed to 0.16. The results are shown in Tables 2 and 3.

Experimental Example 17 Post-Crosslinking (Surface-Crosslinking) Simultaneous with Drying Water-absorbent resin powder (17) was obtained in the same manner as Experimental Example 1, except 2.6% by mass of a surface-crosslinking agent solution containing 0.16% by mass of ethylene glycol diglycidyl ether and 2% by mass of water was added by spraying to the particulate hydrous gel PG(1) during drying in the drying device. At the time of addition of the surface-crosslinking agent, the hydrous gel had a moisture content of 30% by mass and a temperature of 110° C. The results are shown in Tables 2 and 3.

Experimental Example 18 Post-Crosslinking (Surface-Crosslinking) Simultaneous with Drying A water-absorbent resin (18) was obtained in the same manner as Experimental Examples 1 and 17, except 2.6% of the surface-crosslinking agent solution described in Experimental. Example 17 was added by spraying at the point of time when the particulate hydrous gel PG(1) during drying had reached a moisture content of 20% by mass and a temperature of 130° C. The results are shown in Tables 2 and 3.

Experimental Example 19 Post Crosslinking (Surface-Crosslinking) Simultaneous with Drying A water-absorbent resin (19) was obtained in the same manner as Experimental Examples 1 and 17, except 2.6% of the surface-crosslinking agent solution described in Experimental Example 17 was added by spraying at the point of time when the particulate hydrous gel PG(1) during drying had reached a moisture content of 40% by mass and a temperature of 110° C. The results are shown in Tables 2 and 3.

Experimental Example 20 Post-Crosslinking (Surface-Crosslinking) Simultaneous with Drying A water-absorbent resin (20) was obtained in the same manner as Experimental Examples 1 and 17, except 2.6% of the surface crosslinking agent solution described in Experimental Example 17 was added by spraying to the particulate: hydrous gel PG(1) before drying (moisture content: 56% by mass, temperature: 95° C.). The results are shown in Tables 2 and 3.

Experimental Example 21

The water-absorbent resin powder (1) (850 to 150 μm: 94% by mass, less than 150 μm: 6% by mass) obtained in Experimental Example 1 was further classified using a sieve having a mesh size of 150 μm for 10 minutes, and 6% by mass of fine powder was collected. Next, water-absorbent resin powder (21) was obtained in the same manner as Production Example 1 and Experimental Example 1, except the entirety of the collected fine powder was recycled to the polymerization step in Production Example 1. Since 6% by mass of the fine powder was collected, in the monomer solution, the CRC of the water-absorbent resin powder (21) was reduced by 3 g/g as compared, to the CRC of the water-absorbent resin powder (1).

Experimental Example 22

12% by mass of fine powder was collected from the water-absorbent resin powder (2) (850 to 150 μm: 87% by mass, less than 150 μm: 12% by mass) obtained in Experimental Example 2. Next, water-absorbent resin powder (22) was obtained in the same manner as Production Example 1 and Experimental Example 1, except the entirety of the collected fine powder was recycled to the polymerization step in Production Example 1. Since 12% by mass of the fine powder was collected in the monomer solution, the CRC of the water-absorbent resin powder (22) was reduced by 5 g/g as compared to the CRC of the water-absorbent resin powder (1).

Experimental Examples 23 to 25

Water-absorbent resin powder (23) to (25) was obtained by performing drying in the same manner as Experimental Example 1, except the particulate hydrous gels PG(3) to PG(5) obtained in Production Examples 3 to 5 were respectively used instead of the particulate hydrous gel PG(1). The results are shown in Tables 2 and 3.

Experimental Examples 26 and 27

Water-absorbent resin powder (27) and (28) was obtained by performing drying in the same manner as Experimental Example 1, except the particulate hydrous gels PG(7) and PG(8) obtained in Production Examples 7 and 8 were respectively used instead of the particulate hydrous gel PG(1). The results are shown in Tables 2 and 3.

Experimental Example 28 Post-Crosslinking after Drying

Surface-crosslinked water-absorbent resin powder (28) (also referred to as a water-absorbing agent) was obtained by further classifying the water-absorbent resin powder (1) obtained in Experimental Example 1 to collect a sieve fraction of 850 to 160 μm, then spraying a surface-crosslinking agent solution containing 0.2% by mass of ethylene glycol diglycidyl ether and 3% by mass of water, and performing heating at 150° C. for 30 minutes. The CRC of the water-absorbent resin powder (28) was 33 g/g, and the AAP thereof was 24 g/g.

Experimental Example 29

Additional drying was performed by the method in Experimental Example 1 on the water-absorbent resin powder (1) obtained in Experimental Example 1. Similar to Experimental Example 1, adhesion to the interior of the drying device or aggregation of the dried material was not observed.

Experimental Example 30

Additional drying for the inner wall was performed by the method in Experimental Example 8 on the water-absorbent resin powder (1) obtained in Experimental Example 1. Unlike Experimental Example 8, even when the temperature of the inner surface of the rotary container was low, adhesion was not observed.

Experimental Example 31

The moisture content of the water-absorbent resin powder (1) obtained in Experimental Example 1 was adjusted to 10% by mass, and additional drying was performed by the method in Experimental Example 8. Unlike Experimental Example 8, even when the temperature of the inner surface of the rotary container was low, adhesion was not observed.

TABLE 2

| | | Dryer | | | | Evaluation Results | | | | |
| --- | --- | --- | --- | --- | --- | --- | --- | --- | --- | --- |
| | | | | | | Moisture | | | | |
| | | | Number of | | Post-crosslinking | content at time of addition | Gel temperature | Heat medium temperature | | Solid content rate |
| | Unit | Type | shields | Additive | agent | [wt. %] | [° C.] | [° C.] | Pr | [wt. %] |
| | — | — | — | — | — | — | — | — | — | — |
| Experimental Example 1 | | R | 2 | Present | Absent | — | 95 | 228 | 0.07 | 98.5 |
| Experimental Example 2 | | B | — | Present | Absent | — | 95 | 185 | — | 97.1 |
| Experimental Example 3 | | B | — | Present | Absent | — | 95 | 185 | — | — |

TABLE 2-continued

Evaluation Results

| Unit | Dryer Type | Number of shields | Additive | Post-crosslinking agent | Moisture content at time of addition [wt. %] | Gel temperature [° C.] | Heat medium temperature [° C.] | Pr | Solid content rate [wt. %] |
|---|---|---|---|---|---|---|---|---|---|
| Experimental Example 4 | B | — | Present | Absent | — | 95 | 185 | — | — |
| Experimental Example 5 | R | 2 | Present | Absent | — | 60 | 228 | 0.07 | 98.4 |
| Experimental Example 6 | R | 2 | Absent | Absent | — | 95 | 228 | 0.07 | — |
| Experimental Example 7 | R | 2 | Present | Absent | — | 35 | 228 | 0.07 | — |
| Experimental Example 8 | R | 2 | Present | Absent | — | 95 | 228 | 0.07 | — |
| Experimental Example 9 | R | 2 | Present | Absent | — | 95 | 180 | 0.07 | 95.2 |
| Experimental Example 10 | R | 2 | Present | Absent | — | 95 | 140 | 0.07 | — |
| Experimental Example 11 | R | 2 | Present | Absent | — | 95 | 228 | 0.07 | 97.5 |
| Experimental Example 12 | R | 0 | Present | Absent | — | 95 | 228 | 0.07 | 95.6 |
| Experimental Example 13 | R | 1 | Present | Absent | — | 95 | 228 | 0.07 | 97.9 |
| Experimental Example 14 | M | — | Present | Absent | — | 95 | 210 | 0.08 | 92.4 |
| Experimental Example 15 | F | — | Present | Absent | — | 95 | 200 | — | — |
| Experimental Example 16 | R | 2 | Present | Absent | — | 95 | 228 | 0.16 | 98.7 |
| Experimental Example 17 | R | 2 | Present | Present | 30 | 95 | 228 | 0.07 | 98.6 |
| Experimental Example 18 | R | 2 | Present | Present | 20 | 95 | 228 | 0.07 | 98.5 |
| Experimental Example 19 | R | 2 | Present | Present | 40 | 95 | 228 | 0.07 | 98.4 |
| Experimental Example 20 | R | 2 | Present | Present | 44 | 95 | 228 | 0.07 | 98.8 |
| Example 23 | R | 2 | Present | Absent | — | 95 | 228 | 0.07 | 98.3 |
| Example 24 | R | 2 | Present | Absent | — | 95 | 228 | 0.07 | 97.5 |
| Example 25 | R | 2 | Present | Absent | — | 95 | 228 | 0.07 | 92.4 |
| Example 26 | R | 2 | Present | Absent | — | 95 | 228 | 0.07 | 97.0 |
| Example 27 | R | 2 | Present | Absent | — | 95 | 228 | 0.07 | 96.5 |

TABLE 3

Evaluation Results

| Unit | Particle size | | | | | | | Water-absorbent resin powder | | | | | |
|---|---|---|---|---|---|---|---|---|---|---|---|---|---|
| | Particle diameter d2 [μm] | Passed through 850 μm sieve [wt. %] | Passed through 150 μm sieve [wt. %] | d2/d1 | Particle diameter d3 [μm] | d3/d2 | d3/d1 | Greater than 850 μm sieve [wt. %] | Passed through 150 μm sieve [wt. %] | CRC [g/g] | Vortex [seconds] | Residual monomer [ppm] | AAP [g/g] |
| Experimental Example 1 | 625 | 68 | 2.5 | 4.8 | 400 | 0.64 | 3.1 | <1 | 6 | 44 | 27 | 250 | — |
| Experimental Example 2 | *1 | — | — | — | 400 | — | 12 | 1 | 12 | 46 | 28 | 890 | — |
| Experimental Example 3 | *1 | — | — | — | *4 | — | — | — | — | — | — | — | — |
| Experimental Example 4 | *1 | — | — | — | 780 | — | 6.0 | 44 | 5 | — | — | — | — |
| Experimental Example 5 | 650 | 65 | 2.3 | 5.0 | 400 | 0.62 | 3.1 | <1 | 6 | 44 | 28 | 250 | — |
| Experimental Example 6 | *2 | — | — | — | — | — | — | — | — | — | — | — | — |
| Experimental Example 7 | *3 | — | — | — | — | — | — | — | — | — | — | — | — |
| Experimental Example 8 | *2 | — | — | — | — | — | — | — | — | — | — | — | — |
| Experimental Example 9 | 700 | 52 | 6.2 | 5.4 | 400 | 0.57 | 3.1 | <1 | 6 | 42 | 25 | 270 | — |
| Experimental Example 10 | *2 | — | — | — | — | — | — | — | — | — | — | — | — |
| Experimental Example 11 | 730 | 51 | 4.9 | 4.9 | 410 | 0.56 | 2.8 | 1 | 8 | 46 | 29 | 240 | — |
| Experimental Example 12 | 820 | 47 | 4.2 | 6.3 | 415 | 0.51 | 3.2 | 2 | 8 | 40 | 29 | 260 | — |
| Experimental Example 13 | 690 | 52 | 5.5 | 5.3 | 405 | 0.59 | 3.1 | 1 | 8 | 42 | 28 | 250 | — |
| Experimental Example 14 | 2500 | 20 | 0.2 | 19 | *4 | — | — | — | — | — | — | — | — |
| Experimental Example 15 | *3 | — | — | — | *4 | — | — | — | — | — | — | — | — |
| Experimental Example 16 | 605 | 71 | 1.7 | 4.7 | 400 | 0.66 | 3.1 | 1 | 7 | 44 | 27 | 280 | — |
| Experimental Example 17 | 630 | 67 | 1.6 | 4.8 | 405 | 0.64 | 3.1 | 1 | 7 | 32 | 26 | 250 | 24 |
| Experimental Example 18 | 605 | 70 | 1.5 | 4.7 | 400 | 0.66 | 3.1 | 1 | 7 | 33 | 27 | 240 | 24 |
| Experimental Example 19 | 590 | 73 | 1.8 | 4.5 | 400 | 0.68 | 3.1 | 1 | 7 | 30 | 27 | 270 | 22 |
| Experimental Example 20 | 580 | 72 | 1.6 | 4.5 | 395 | 0.68 | 3.0 | 1 | 7 | 30 | 26 | 260 | 19 |
| Example 23 | 680 | 62 | 1.6 | 2.5 | 410 | 0.6 | 1.5 | 1 | 8 | 43 | 35 | 240 | — |
| Example 24 | 800 | 48 | 3.2 | 1.5 | 415 | 0.52 | 0.8 | 2 | 8 | 42 | 40 | 230 | — |
| Example 25 | 2400 | 33 | 0.8 | 1.2 | 405 | 0.17 | 0.2 | 1 | 10 | 41 | 45 | 280 | — |
| Example 26 | 950 | 50 | 2.4 | 7.3 | 420 | 0.44 | 3.2 | 2 | 9 | 42 | 28 | 250 | — |
| Example 27 | 1500 | 26 | 1.2 | 10 | 420 | 0.28 | 2.9 | 3 | 9 | 40 | 33 | 250 | — |

The details of the symbols and the like shown in Tables 2 and 3 are as follows.

R: a drying device (rotary heating device with heating tubes)
B: a through-flow band drying machine
M: a stirring drying machine (paddle dryer)
F: a fluidized bed drying machine (*1) The particulate hydrous gel was dried such that the gel was unified into a block shape.

(*2) Poor drying due to adhesion of the hydrous gel to the interior of the drying machine.

(*3) Poor drying due to aggregation of the particulate hydrous gel.

(*4) Poor grinding due to aggregation of the particulate hydrous gel.

(Conclusion) The evaluation results shown in Tables 2 and 3 above are as follows.

(1) From comparison between Experimental Example 1 (rotary heating device) and Experimental Examples 2 to 4 (through-flow band, drying machine), it is found that, as compared to the conventional through-flow band drying machine, in the production method according to the present invention, due to the use of the rotary heating device, water-absorbent resin powder containing a small amount of fine powder is obtained even when the grinding step and the classification step are omitted or each device is reduced in size. Furthermore, whereas the residual monomer of Experimental Example 2 is 890 ppm, the residual monomer of Experimental Example 1 is 250 ppm, and thus it is found that the residual monomer is also reduced by the production method according to the present invention. In addition, with the rotary heating device used in the production method of the present invention, an undried material problem, a powder spill problem, and a difference in dryness state in the thickness direction, which are observed with the conventional, through flow band drying machine, do not arise, and thus it is found that a water-absorbent resin having excellent physical properties is obtained.

(2) From comparison between Experimental Example 1 (the gel fluidizer was added) and Experimental Example 6 the gel fluidizer was not added), it is found that, unlike the conventional through-flow band drying machine, addition of the gel fluidizer is effective for drying by the rotary heating device.

(3) From comparison between Experimental Example 1 (the inner surface of the rotary container was preheated) and Experimental Example 8 (the inner surface of the rotary container was not preheated), it is found that, unlike the conventional through-flow band drying machine, preheating of the inner surface of the rotary container is effective in the production method according to the present invention (further, the drying start method). Furthermore, from Experimental Examples 29 to 31, it is also found that preheating of the inner surface of the rotary container is effective for drying a hydrous gel of a water-absorbent resin but is particularly unnecessary for a water-absorbent resin having a certain moisture content or less.

(4) From comparison between Experimental Example 1 (gel temperature: 95° C.), Experimental Example 5 (gel temperature: 60° C.), and Experimental Example 7 (gel temperature 35° C.), it is found that, unlike the conventional through-flow band drying machine, the gel temperature of the particulate hydrous gel to be put into the rotary heating device is important in the production method according to the present invention.

(5) From comparison between: Experimental Example 1 (heat medium temperature 228° C.), Experimental Example 9 (heat medium temperatures 10° C.) and Experimental Example 10 (140° C.) with the rotary heating device; and Experimental Example 2 (heat medium temperature: 185° C.) with the through-flow band drying machine, it is found that, unlike the conventional through-flow band drying machine, adjustment of the heat medium temperature in the rotary heating device is effective in the production method according to the present invention.

(6) From comparison between Experimental Example 1 (Fr=0.07) and Experimental. Example 16 (Fr=0.16), it is found that, in the production method according to the present invention, it is possible to further control the particle size by adjusting the Froude number Fr of the rotary heating device.

(7) From comparison between Experimental Example 1 (rotary heating device), Experimental Example 14 (paddle dryer), Experimental Example 2 (through-flow band drying machine), and Experimental Example 15 (fluidized bed drying machine), it is found that, in continuous drying of the same particulate hydrous gel PG(1), continuous drying is difficult due to progress of aggregation with the stirring drying machine (paddle dryer) and the fluidized bed drying machine, and block-shaped dried material is obtained with the through-flow band drying machine. As shown in Experimental Examples 2 to 4, when bulky dried material or block-shaped dried material is generated, the grinding device and the classifying device after drying are increased in size, and the amount of fine powder caused by grinding is also increased. The increase in amount of fine powder means a decrease in performance after surface crosslinking in the case of subsequently carrying out surface-crosslinking without any change, or means an increase in scale of fine powder classification or recycling step in the case of recycling fine powder, and further decreases the fluid retention performance depending on the recycling method.

(8) From comparison between. Experimental Example 1 (the surface crosslinking agent was not added to the hydrous gel), Experimental Examples 17 to 19 (during drying, the gel moisture content at the time of addition of the surface-crosslinking agent was 30%, 20%, and 40%, respectively), and Experimental. Example 20 (the surface-crosslinking agent was added to the hydrous gel before drying), by adding the surface-crosslinking agent to the particulate hydrous gel (particularly, when the moisture content is 20 to 40%) during drying, aggregation during drying is inhibited, and furthermore the fluid retention capacity under load is also improved to be not less than 20 g/g. The fluid retention capacity under load is at the same level as that of conventional water-absorbent resin powder obtained by surface-crosslinking ground classified material after drying. That is, it is found that, in the production method according to the present invention, a conventional, surface crosslinked structure is formed simultaneously with drying by adding the surface-crosslinking agent to the particulate hydrous gel during drying using the rotary heating device. In other words, in the method of the present invention, it is also possible to carry out surface-crosslinking simultaneously with drying, so that, as described above in Experimental Example 1, in addition to: the grinding and classification steps after drying being made compact (FIG. 9); the amount of fine powder being reduced; and the fine powder collection step being omitted or made compact, the surface-crosslinking step for the ground classified material after drying and the classification step after surface-crosslinking can be completely omitted (FIG. 10). Namely, it is found that, in the production method according to the present invention, it is also possible to perform a very compact process in which the conventional steps after the surface-crosslinking step are completely omitted and the number of steps is small (whereas there are 13 steps and a step of collecting a large amount of fine powder in FIG. 9 by the production method of the conventional art, there are 6 steps and, a step of collecting a small amount of fine powder in FIG. 10 by the production method of the present invention).

(9) From comparison between Experimental Example 1 (betaine-based surfactant), Experimental Example 26 (silicone-based), and Experimental Example 27 (PEG), it is found that use of various surfactants and the polymer lubricant (PEG) as a gel fluidizer is effective in the production method according to the present invention.

(10) From comparison between Experimental Example 1 (soluble content: 6%) and Experimental Example 11 (soluble content: 11%), it is found that, in the production method according to the present invention, the particle size of the obtained water-absorbent resin powder can be controlled on the basis of the soluble content of the particulate hydrous gel.

(11) From comparison between Experimental Example 1 and Experimental Example 8 by stirring drying of the particulate hydrous gel and from comparison between Experimental Examples 29 to 31 of re-drying by stirring drying of the water-absorbent resin powder, it is found that the influence of the temperature of the inner surface of the rotary container on adhesion is significant for a water-absorbent resin (hydrous gel) having a high moisture content before drying, and taking into consideration the temperature other than the temperature of the heating tubes is important at the start of drying of the particulate hydrous gel of the water-absorbent resin (Start-up).

(12) From comparison between Experimental Example 21 and Experimental Example 22, it is found that the fluid retention capacity (CRC) further decreases when the amount of fine powder collected into the monomer at the time of polymerization increases.

(13) From comparison between Experimental Example 1 (shields at two locations), Experimental Example 13 (shield at one location), and Experimental Example 12 (no shield), it is found that it is preferable to provide a shield.

As described above, in the production method according to the present invention, as compared to the conventional drying method (representatively, through-flow band drying), dried material is not made into a block during drying, and thus excessive grinding after drying is unnecessary, so that the amount of fine powder is reduced. Therefore, the grinding step and the fine powder collection step after the drying step can be made compact (simplified) or partially omitted. In addition, in the production method according to the present invention, the residual monomer is also easily reduced. Additionally, as compared to normal hot air drying, the volume of waste gas is small, and thus the volume of waste gas to be treated is also small, so that energy-saving is also achieved. Furthermore, even, a hydrous gel in fine particle form, which is difficult to dry through through-flow band drying due to spill from a drying machine, clogging, or the like, can be dried, without any problem, in the production method according to the present invention. Moreover, due to drying of the fine particle gel, the water absorption speed of the obtained water-absorbent resin also improves.

In addition, in the production, method according to the present invention, it is possible to post-crosslink (surface-crosslink) the water-absorbent resin simultaneously with drying, and a water-absorbent resin having a high fluid retention capacity under load can be obtained in a simple manner, so that the production process can be significantly simplified. This process simplification leads to a reduction in process damage after drying, and thus fine powder generation after drying and performance decrease can be also inhibited. In the production method according to the present invention, stable continuous operation and drying start can be achieved also in stirring drying, and thus continuous drying can be performed.

INDUSTRIAL APPLICABILITY

The water-absorbent resin powder obtained by the present invention is suitable for application as an absorbent body for sanitary articles such as disposable diapers and the like.

DESCRIPTION OF THE REFERENCE CHARACTERS

2 . . . rotary heating device
4 . . . main portion
6 . . . input portion
8 . . . takeout portion
10 . . . rotary container
11, 11a, 11b . . . obstructive wall
12 . . . heating tube
14 . . . first gear
16 . . . second gear
18 . . . packing
20 . . . main tube
22 . . . hopper
26 . . . pipe
28 . . . inner space
36 . . . nozzle
40 . . . takeout port
44 . . . steam inlet
46 . . . drain
48 . . . additive
100 . . . through-flow band drying machine
102 . . . drying belt
104 . . . hydrous gel
106 . . . air-flow direction
108 . . . movement direction of drying belt
110 . . . dried polymer

The invention claimed is:

1. A method for producing water-absorbent resin powder, the method comprising
a drying step of drying a particulate crosslinked hydrogel polymer obtained by polymerizing a monomer aqueous solution containing a monomer, which is a material of a water-absorbent resin, using a heating device to obtain dried particles, wherein
the heating device includes: a rotary container that contains the particulate crosslinked hydrogel polymer therein and rotates; and a plurality of heating tubes that are located within the rotary container, extend in an axial direction of the rotary container, and rotate together with the rotary container, and
a gel temperature of the particulate crosslinked hydrogel polymer to be subjected to the drying step, the gel temperature being measured by a contact thermometer, is not lower than 50° C.

2. The method according to claim 1, wherein a heat medium of 150° C. or higher is supplied to the heating tubes.

3. The method according to claim 1, wherein a temperature of an inner surface of the rotary container is not lower than 150° C.

4. The method according to claim 1, wherein a temperature of an inner surface of the rotary container is set to be not lower than 150° C. before the particulate crosslinked hydrogel polymer is put inside.

5. The method according to claim 1, wherein a gas is introduced as a heat medium into the rotary container, and a temperature of an inner surface of the rotary container is higher than a temperature of the gas.

6. The method according to claim 5, wherein the temperature of the gas to be introduced into the rotary container is not lower than 100° C.

7. The method according to claim 1, further comprising a cooling step of cooling the dried particles.

8. The method according to claim 1, wherein, in the drying step, an additive is added during heating drying of the particulate crosslinked hydrogel polymer contained in the rotary container.

9. The method according to claim 8, wherein the additive is a surface-crosslinking agent.

10. The method according to claim 1, wherein the particulate crosslinked hydrogel polymer contains a gel fluidizer.

11. The method according to claim 1, wherein the gel temperature of the particulate crosslinked hydrogel polymer to be subjected to the drying step is 60 to 120° C.

12. The method according to claim 1, wherein a particle diameter d1 of the particulate crosslinked hydrogel polymer to be subjected to the drying step is not greater than 800 μm.

13. The method according to claim 1, wherein steam of 0.49 MPa or greater is introduced into the plurality of heating tubes.

14. The method according to claim 1, wherein a Froude number Fr of the heating device is 0.001 to 1.

15. The method of claim 1, wherein the heating device comprises not less than five of the heating tubes.

16. The method of claim 1, wherein the heating device comprises a heating means or a thermal insulating means on an outer peripheral surface of the rotary container.

17. The method of claim 1, wherein the rotary container is inclined from one end toward another end of the rotary container.

18. The method of claim 1, wherein the rotary container comprises at least one obstructive wall within the rotary container.

19. The method of claim 1, wherein the heating device has a ratio of a heat transfer area to an effective capacity of the rotary container (heat transfer area/effective capacity) of not less than 10 $m^{-1}$, wherein the heat transfer area is a sum of surface areas of outer peripheral surfaces of the heating tubes and an area of an inner peripheral surface of the rotary container.

* * * * *